US012732038B2

(12) United States Patent
Honma

(10) Patent No.: US 12,732,038 B2
(45) Date of Patent: Sep. 8, 2026

(54) ROTOR CORE, ROTOR, AND ROTARY ELECTRIC MACHINE

(71) Applicant: NIPPON STEEL CORPORATION, Tokyo (JP)

(72) Inventor: Rei Honma, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 295 days.

(21) Appl. No.: 18/689,719

(22) PCT Filed: Sep. 29, 2022

(86) PCT No.: PCT/JP2022/036391
§ 371 (c)(1),
(2) Date: Mar. 6, 2024

(87) PCT Pub. No.: WO2023/084937
PCT Pub. Date: May 19, 2023

(65) Prior Publication Data

US 2025/0132619 A1 Apr. 24, 2025

(30) Foreign Application Priority Data

Nov. 15, 2021 (JP) ................................ 2021-185697

(51) Int. Cl.
*H02K 1/276* (2022.01)

(52) U.S. Cl.
CPC ....... *H02K 1/2766* (2013.01); *H02K 2213/03* (2013.01)

(58) Field of Classification Search
CPC .. H02K 1/2766; H02K 2213/03; H02K 1/276; H02K 1/24; H02K 21/14; Y02T 10/64
See application file for complete search history.

(56) References Cited

U.S. PATENT DOCUMENTS

| | | | | |
|---|---|---|---|---|
| 11,190,069 | B2 * | 11/2021 | Oikawa | H02K 1/146 |
| 2009/0261679 | A1 * | 10/2009 | Sakai | H02K 29/03 310/156.53 |
| 2012/0091845 | A1 * | 4/2012 | Takemoto | H02K 1/276 310/156.01 |
| 2012/0248915 | A1 | 10/2012 | Kagami et al. | |
| 2013/0043757 | A1 | 2/2013 | Kagami et al. | |
| 2016/0301271 | A1 | 10/2016 | Saito et al. | |

(Continued)

FOREIGN PATENT DOCUMENTS

| | | |
|---|---|---|
| JP | 2012-50274 A | 3/2012 |
| JP | 2012-60773 A | 3/2012 |
| JP | 2012-205472 A | 10/2012 |

(Continued)

OTHER PUBLICATIONS

"Metallic materials-Tensile testing-Method of test at room temperature", JIS (Japanese Industrial Standards) Z 2241:2011, Feb. 21, 2011, pp. 1-29, total 110 pages.

*Primary Examiner* — Christopher M Koehler
*Assistant Examiner* — Riley Owen Stout
(74) *Attorney, Agent, or Firm* — Birch, Stewart, Kolasch & Birch, LLP

(57) ABSTRACT

In a rotor core cross section, positions of open-end front-side corner portions (1131*a*, 1131*c*) are on a rear side in a rotation direction of a rotor core (811) further than reference positions (831*a*, 831*b*).

18 Claims, 22 Drawing Sheets

(56) References Cited

U.S. PATENT DOCUMENTS

| | | | |
|---|---|---|---|
| 2022/0209600 | A1 | 6/2022 | Hisada et al. |

FOREIGN PATENT DOCUMENTS

| | | | |
|---|---|---|---|
| JP | 2012-228072 | A | 11/2012 |
| JP | 2013-46421 | A | 3/2013 |
| JP | 2014-108025 | A | 6/2014 |
| JP | 2014-128116 | A | 7/2014 |
| JP | 2019-57984 | A | 4/2019 |
| JP | 2021-114099 | A | 8/2021 |
| WO | WO 2015/076045 | A1 | 5/2015 |
| WO | WO 2021/060209 | A1 | 4/2021 |

* cited by examiner

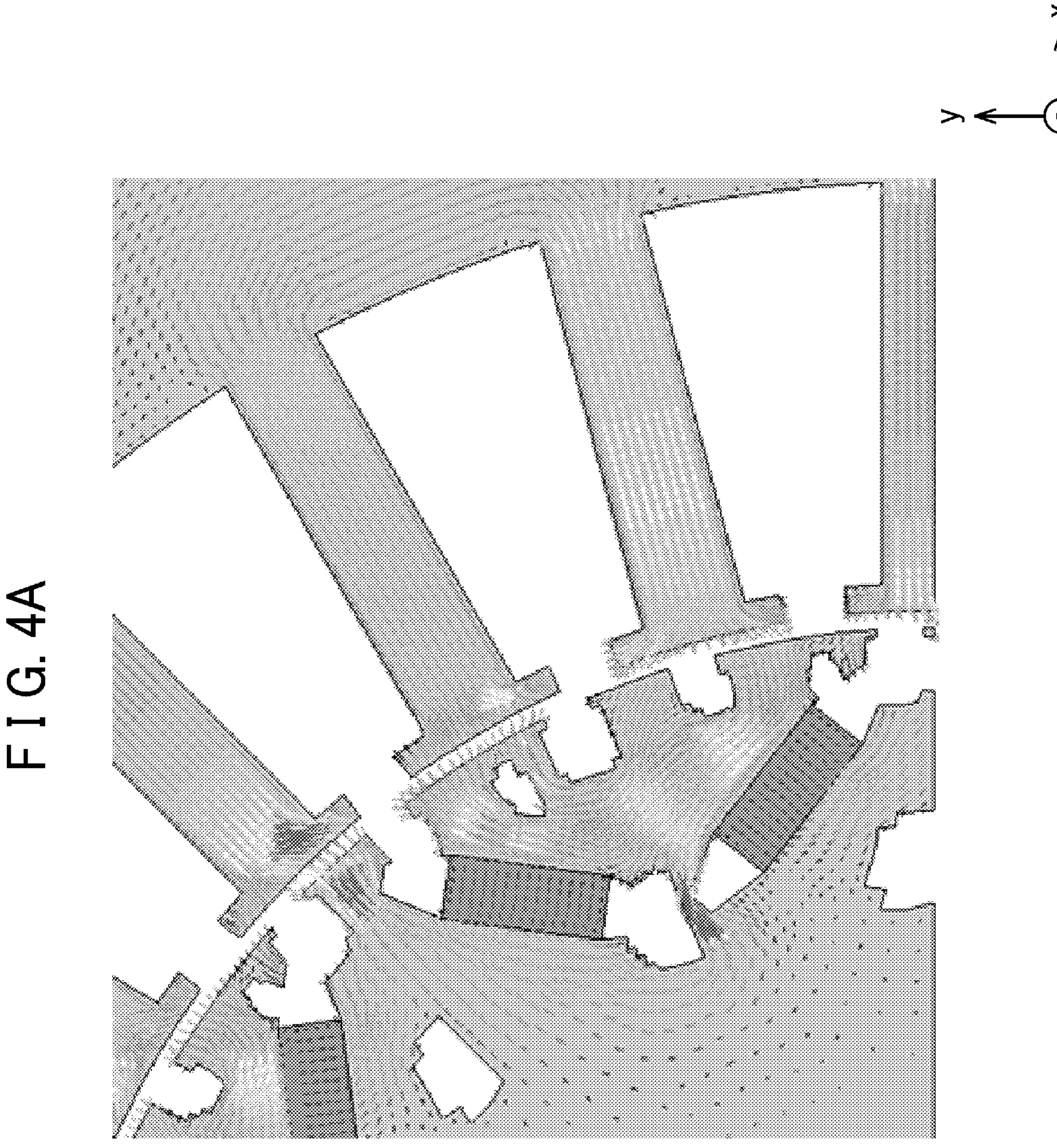
F I G. 4A

Figure 4B:
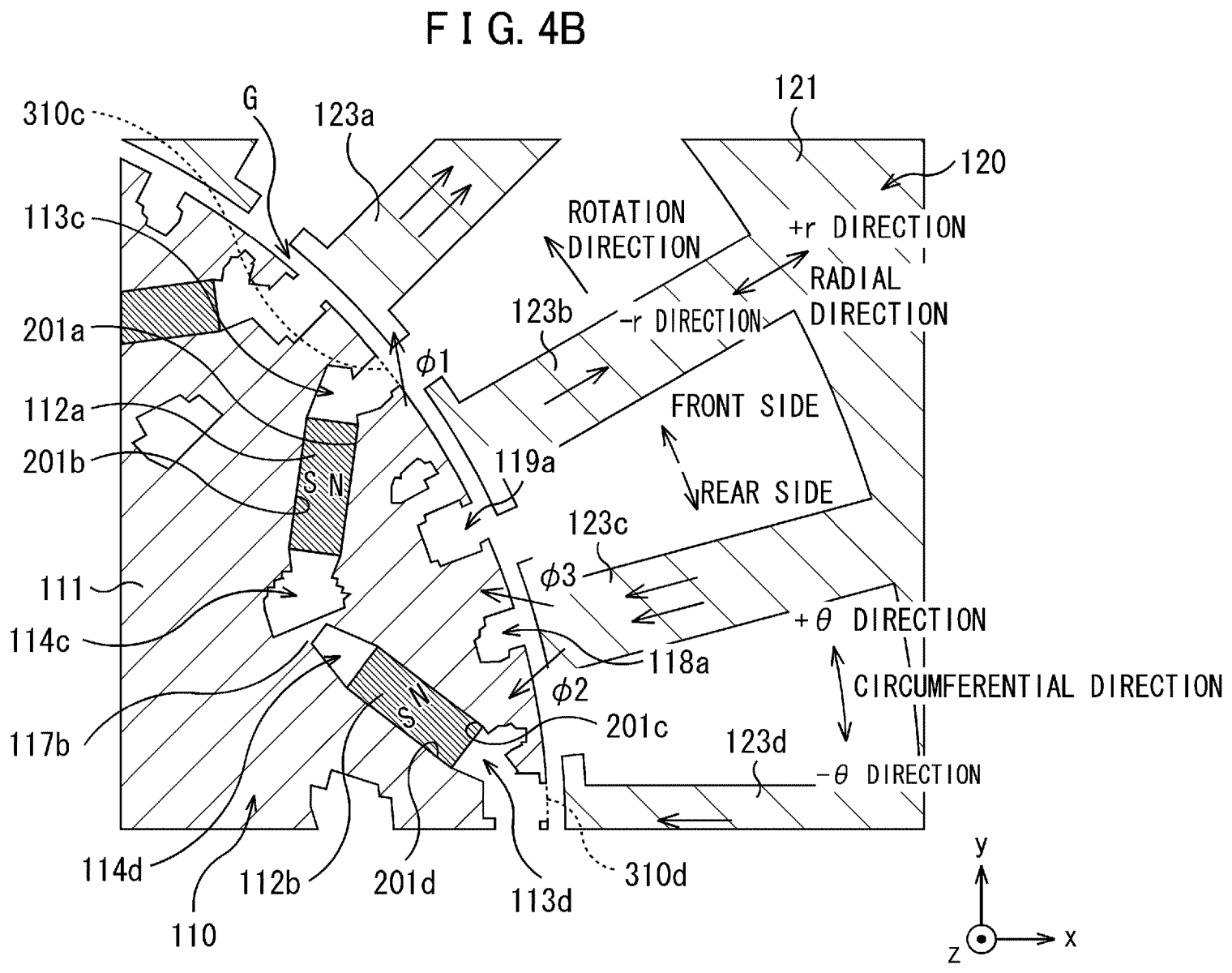

FIG. 4B 120
121
+r DIRECTION
RADIAL DIRECTION
-r DIRECTION
ROTATION DIRECTION
FRONT SIDE
REAR SIDE
+θ DIRECTION
CIRCUMFERENTIAL DIRECTION
-θ DIRECTION
123a
123b
123c
123d
118a
119a
201c
310d
φ1
φ2
φ3
113d
201d
112b
110
114d
117b
114c
111
201b
112a
201a
113c
310c
G
x
y
z

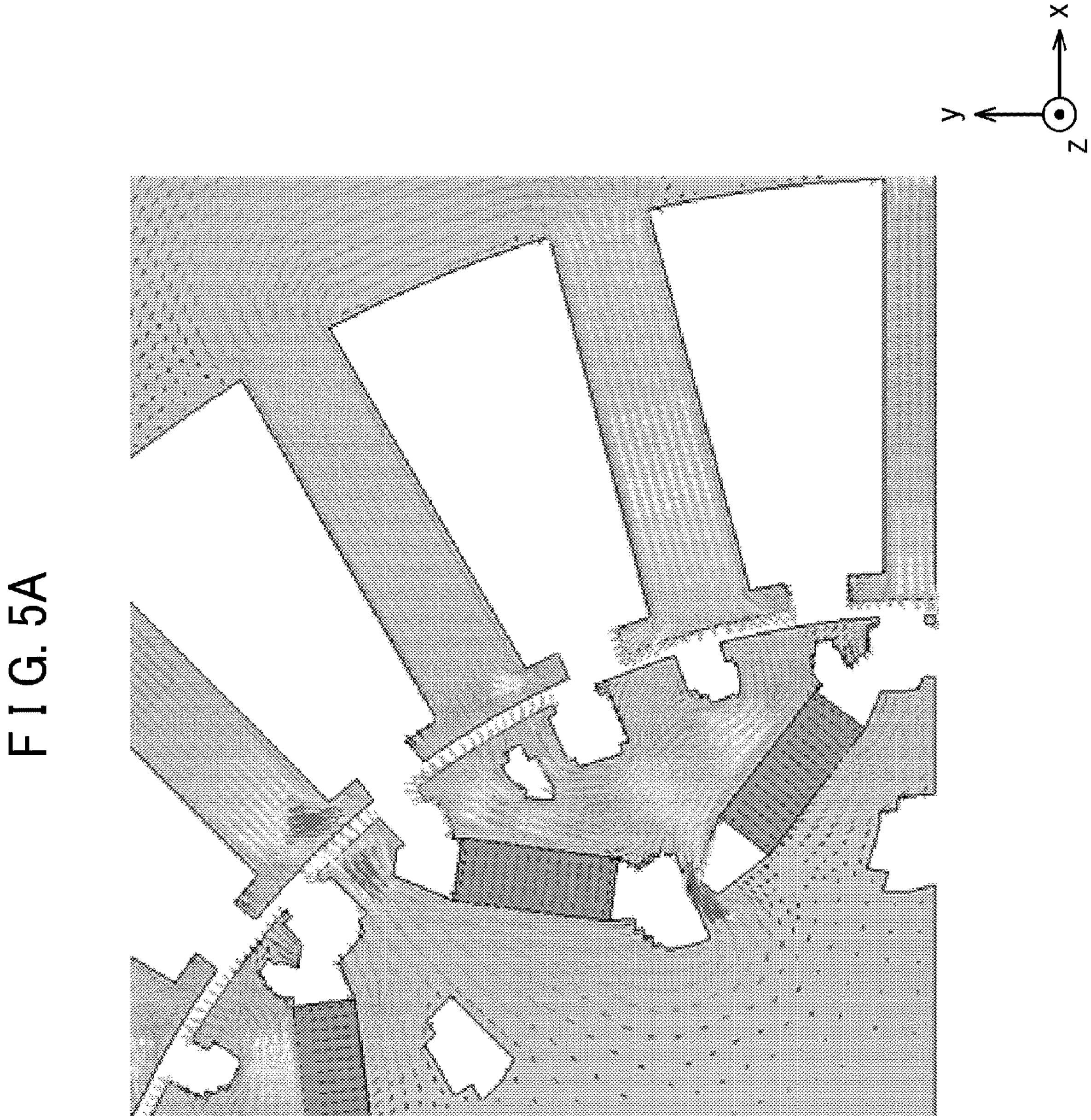
F I G. 5A

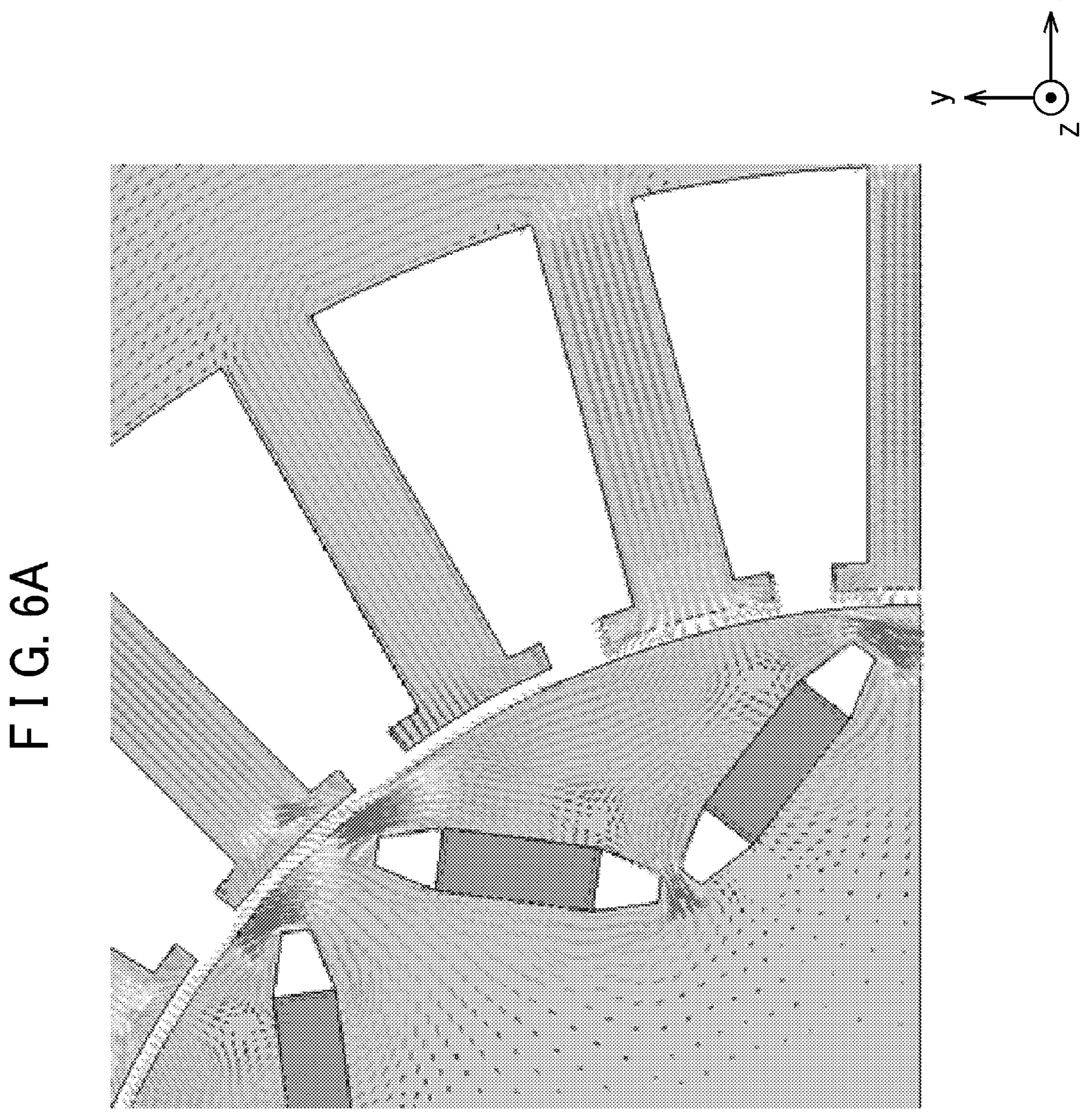
F I G. 6A

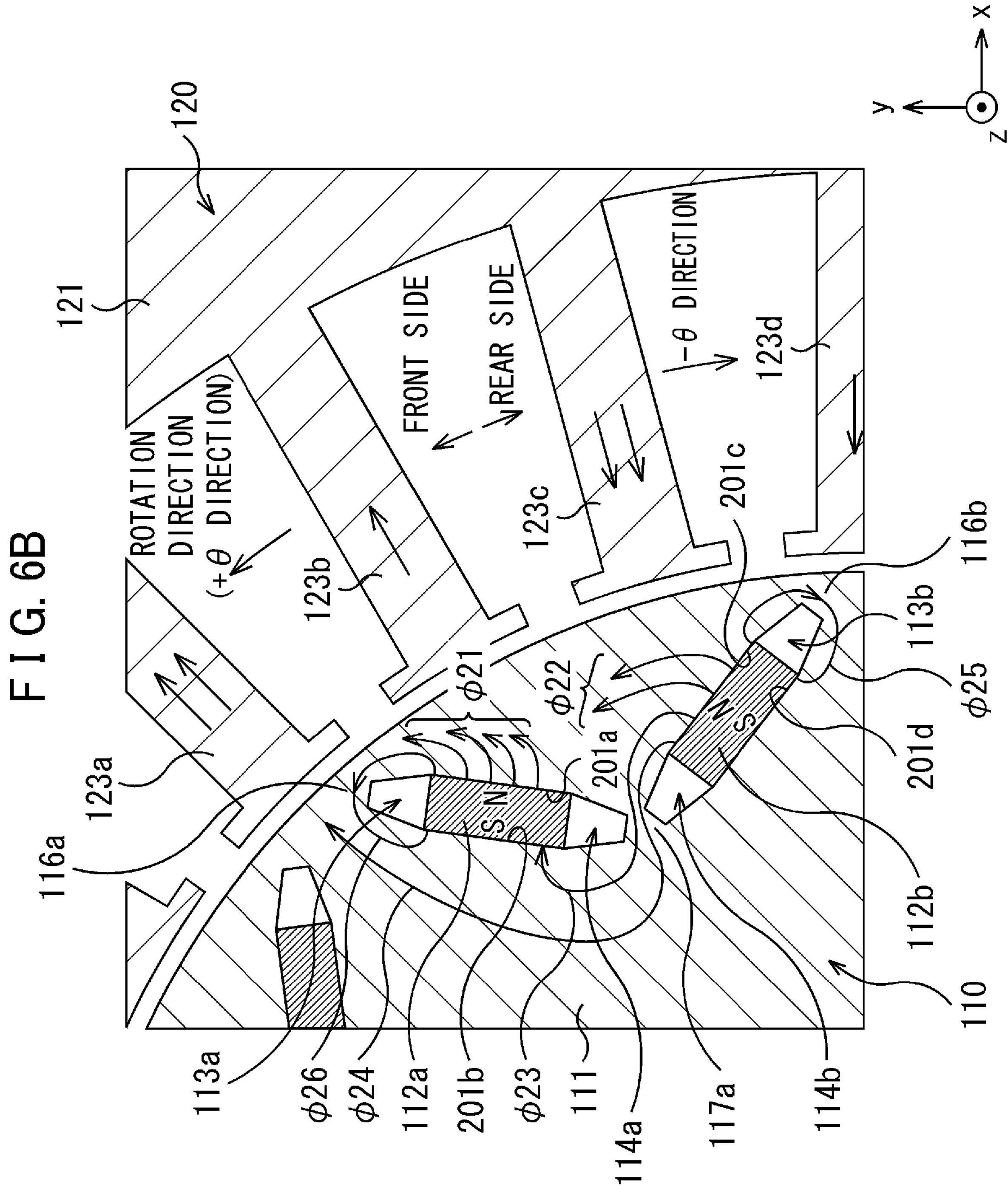
F I G. 6B
120
121
ROTATION DIRECTION (+θ DIRECTION)
FRONT SIDE
REAR SIDE
−θ DIRECTION
123a
123b
123c
123d
201a
201b
201c
201d
116a
116b
113a
113b
112a
112b
114a
114b
117a
111
110
φ21
φ22
φ23
φ24
φ25
φ26
S
N
x
y
z

FRONT SIDE CIRCUMFERENTIAL DIRECTION REAR SIDE

ROTATION DIRECTION

CIRCUMFERENTIAL DIRECTION
FRONT SIDE
REAR SIDE
ROTATION DIRECTION

CIRCUMFERENTIAL DIRECTION

FRONT SIDE

REAR SIDE

ROTATION DIRECTION 820 818 G 815a 822j, 832c 1151a 1161a 1161b 1142c 1141f, 1141f Cd θc θa θb L1 831b 1131d 823c, 833c 1111b 1131c 1123b 841b 1113f 1114f 1121b 817f 1173 1174 1175 1176 1177 1178 1121f 1122f 1112f 1132m 1132n 1132k 821j, 831c 1141h 1141g W $r_g$ 1112e 1113e 1131b 824c 1111a L1 θf 1131a 831a 1123a 841a 1114e 1121a 1122e 1132l 817e 1171 1172 Dm Ds L2 0 x y z

NUMBER 9

NUMBER 19

F I G. 12C
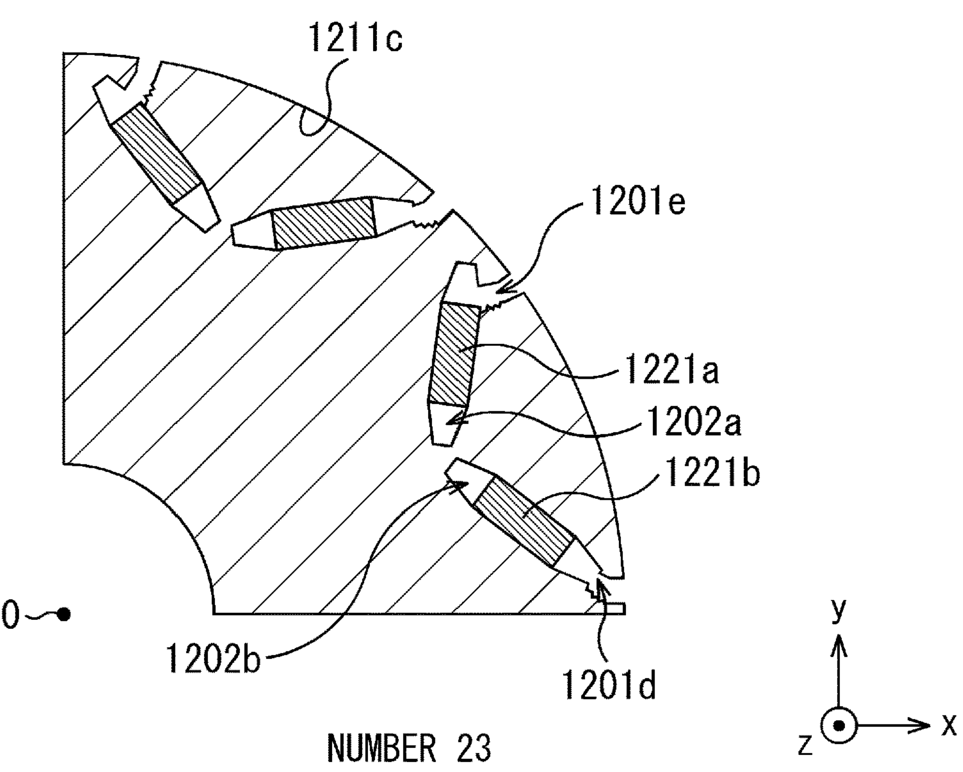
NUMBER 23
F I G. 12D
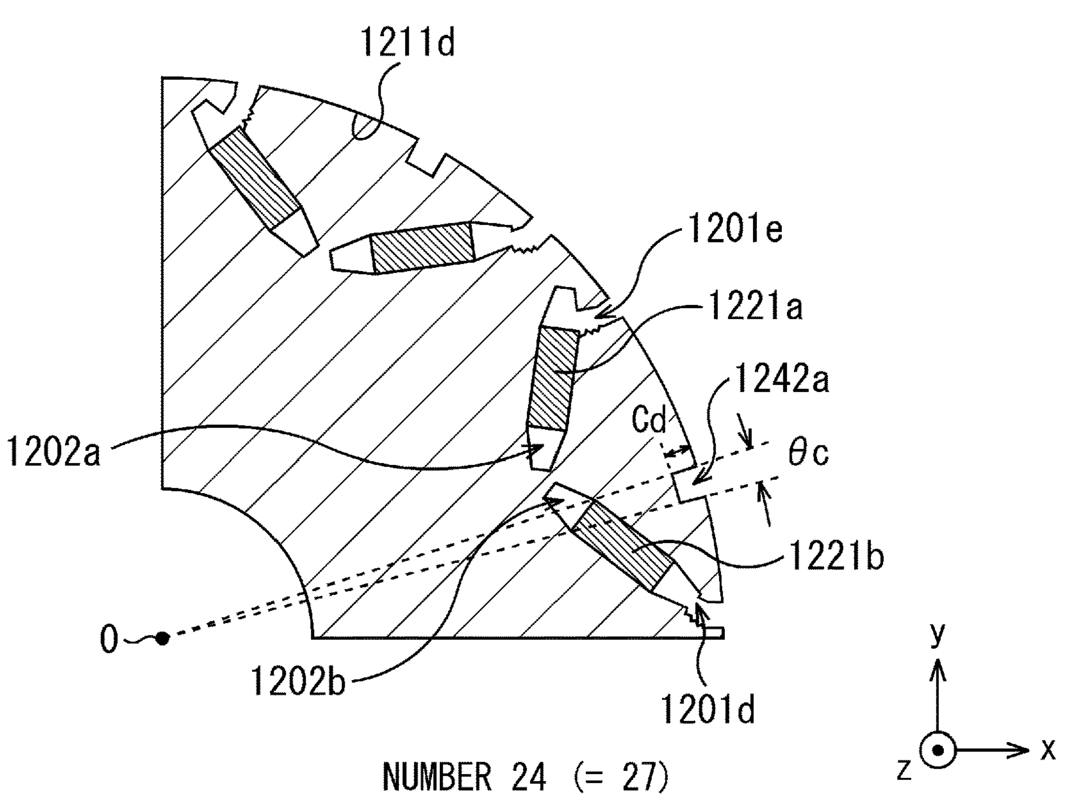
NUMBER 24 (= 27)

NUMBER 36

F I G. 12F
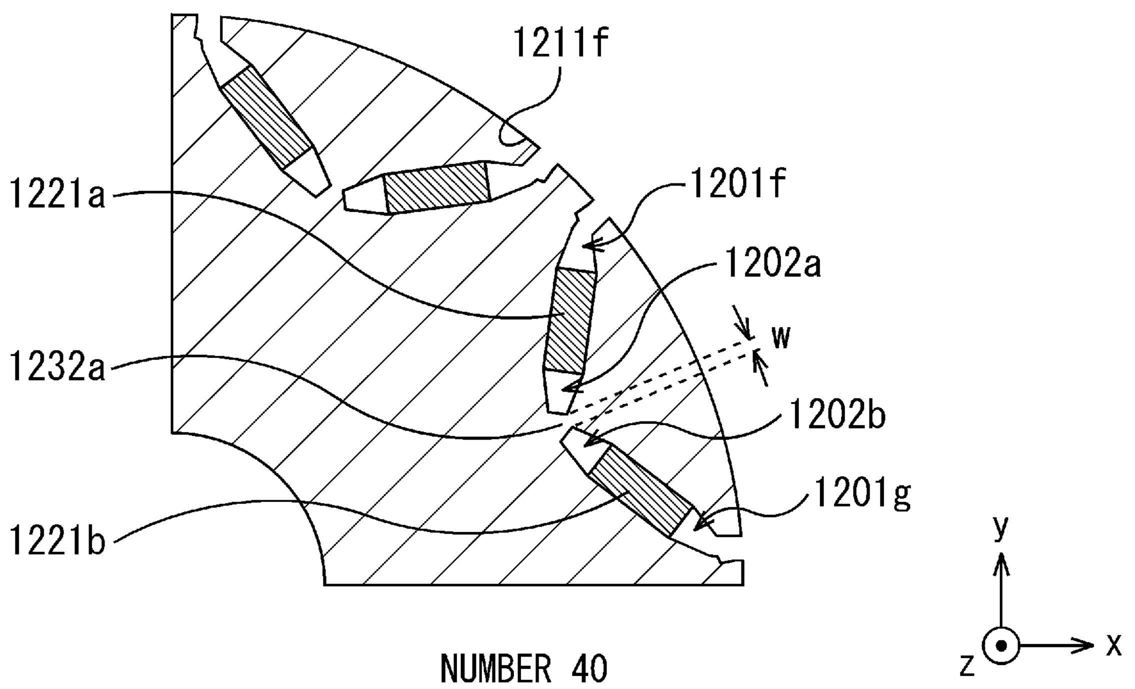
NUMBER 40
F I G. 12G
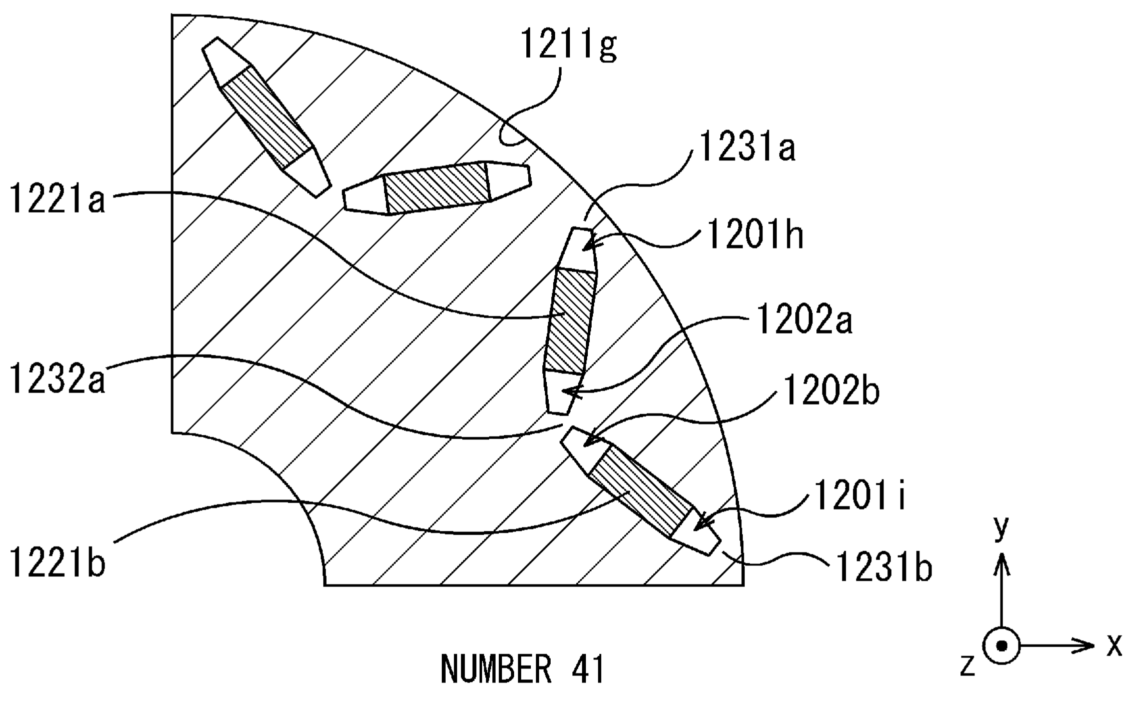
NUMBER 41

F I G. 12H
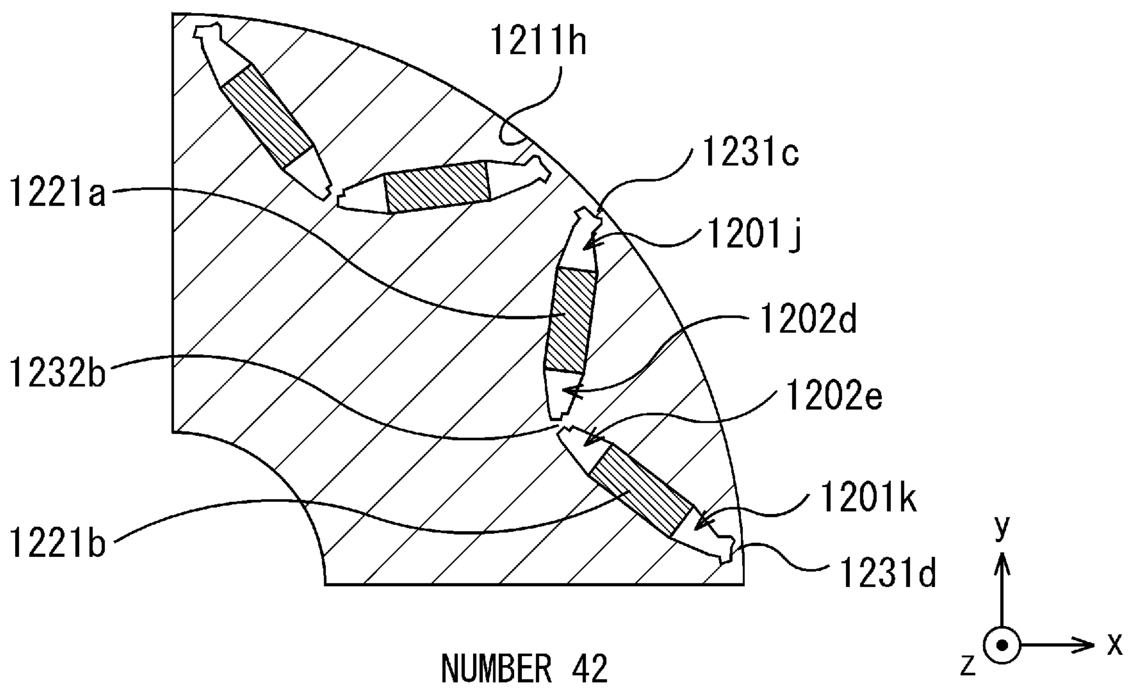
F I G. 12I
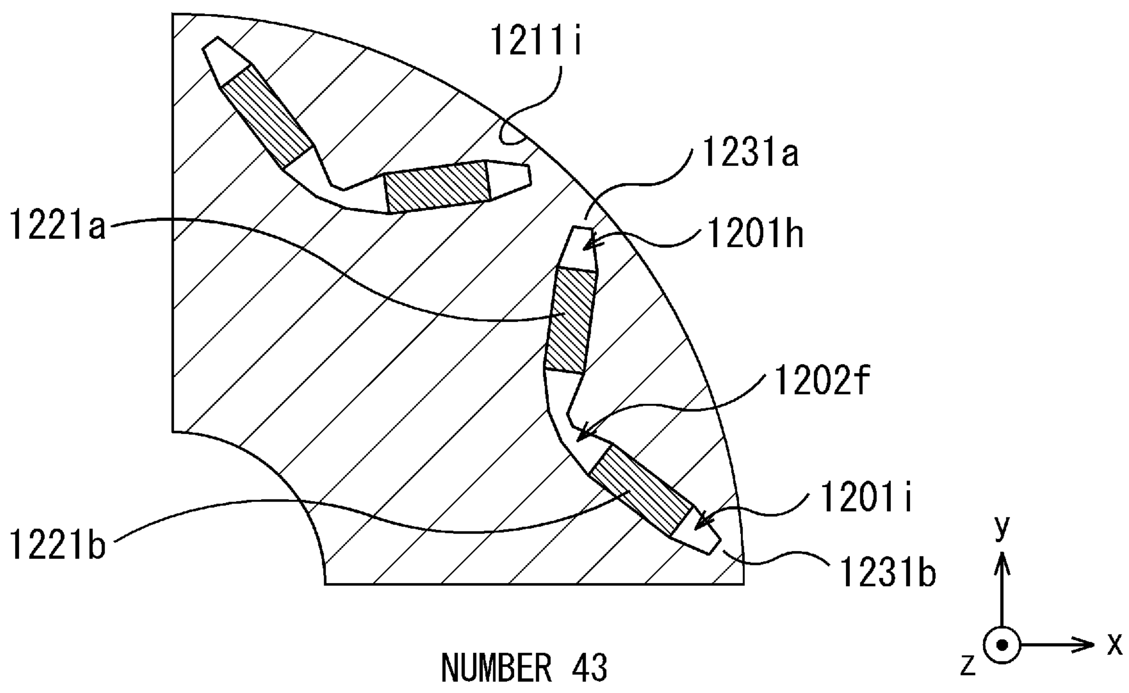

ROTOR CORE, ROTOR, AND ROTARY ELECTRIC MACHINE

TECHNICAL FIELD

The present invention relates to a rotor core, a rotor, and a rotary electric machine. This application is based upon and claims the benefit of priority of the prior Japanese Patent Application No. 2021-185697 filed on Nov. 15, 2021, the entire contents of which are incorporated herein by reference.

BACKGROUND ART

In a permanent magnet-embedded rotary electric machine such as an IPMSM (Interior Permanent Magnet Synchronous Motor), permanent magnets are embedded in a rotor core, and flux barriers are formed near the permanent magnets. The flux barrier is formed to control a flow of a magnetic flux in the rotary electric machine. The flux barrier allows improvement in characteristics of the rotary electric machine. Patent Literature 1 describes that magnet holes through which permanent magnets are installed are each provided with flux barriers. This flux barrier is provided on each of an outer peripheral side and an inner peripheral side further than the permanent magnet. Further, Patent Literature 1 describes that the flux barrier on the outer peripheral side is opened in an outer peripheral side of a rotor core. In addition, Patent Literature 1 describes that a curvature of the flux barrier on the inner peripheral side is defined to reduce stress of an inter-magnet bridge portion between the flux barriers on the inner peripheral side.

CITATION LIST

Patent Literature

Patent Literature 1: Japanese Laid-open Patent Publication No. 2019-57984

SUMMARY OF INVENTION

Technical Problem

However, the technique described in Patent Literature 1 defines the configuration of the flux barrier on the outer peripheral side only from the viewpoint of suppressing a short circuit of a magnetic flux via the outer peripheral side of the rotor core. This prevents a sufficient improvement in torque of a rotor.

The present invention has been made in view of the problems as described above, and an object thereof is to increase the torque of the rotor.

Solution to Problem

A rotor core of the present invention includes a soft magnetic material portion formed using a soft magnetic material, and having at least one magnet hole per one pole, wherein: the magnet hole has, relative to a permanent magnet installed through the magnet hole, a space serving as a front-side flux barrier and a space serving as a rear-side flux barrier on both sides in a left-right direction perpendicular to a magnetization direction of the permanent magnet and a direction parallel to a rotation axis line serving as a center of rotation; the space serving as at least one flux barrier, of the space serving as the front-side flux barrier and the space serving as the rear-side flux barrier, has an open end portion opened in an outer peripheral surface of the rotor core; in a cross section perpendicular to the rotation axis line, a position of an open-end front-side corner portion of at least one of the open end portions provided in a same pole of a rotor is on a rear side in a rotation direction of the rotor core further than a reference position relative to the magnet hole having the open end portion; in the cross section, the open-end front-side corner portion is a corner portion on a front side in the rotation direction of the rotor core, of two corner portions in a circumferential direction of the rotor core, of at least one of the open end portions installed in the same pole of the rotor; in the cross section, the reference position relative to the magnet hole having the open end portion is a position at an intersection point of a straight line passing through a permanent-magnet reference end portion which is one of end portions of the permanent magnet at a position closest to the open end portion, in the permanent magnet installed through the magnet hole, and the rotation axis line, and, the outer peripheral surface of the rotor core; and in the cross section, the permanent-magnet reference end portion of the permanent magnet at the position closest to the open end portion is, of end portions of the permanent magnet, an end portion at a position at the farthest distance in the circumferential direction from a straight line passing through a central position in the circumferential direction of a region of one pole including the permanent magnet, and the rotation axis line, and the distance in the circumferential direction from a straight line passing through the central position in the circumferential direction of the region of one pole including the permanent magnet, at the position closest to the open end portion, and the rotation axis line is a distance defined on a side, of the front side and the rear side in the rotation direction of the rotor core, in which the open end portion is present.

A rotor of the present invention includes the rotor core, and a plurality of permanent magnets installed in the rotor core.

A rotary electric machine of the present invention includes the rotor, and a stator.

BRIEF DESCRIPTION OF DRAWINGS

FIG. 4A is a view illustrating a first analysis result of a magnetic flux density vector in the IPMSM in the optimum shape.

FIG. 4B is a view for explaining one example of an outline of flows of magnetic fluxes in the first analysis result.

FIG. 5A is a view illustrating a second analysis result of a magnetic flux density vector in the IPMSM in the optimum shape.

FIG. 6A is a view illustrating one example of a magnetic flux density vector in the IPMSM in the basic shape when a residual magnetic flux density of permanent magnets is 0.4 T.

FIG. 6B is a view for explaining one example of an outline of flows of magnetic fluxes in the IPMSM in the basic shape when the residual magnetic flux density of the permanent magnets is 0.4 T.

FIG. 7B is a view for explaining one example of an outline of flows of magnetic fluxes in the IPMSM in the basic shape when the residual magnetic flux density of the permanent magnets is 1.0 T.

FIG. 11A is a view enlarging and illustrating a part of the rotor core illustrated in FIG. 10.

FIG. 11B is a view illustrating a first modified example of the configuration of the rotor core.

FIG. 11C is a view illustrating a second modified example of the configuration of the rotor core.

FIG. 12C is a view illustrating a third example of a configuration of a rotor targeted for being analyzed.

FIG. 12D is a view illustrating a fourth example of a configuration of a rotor targeted for being analyzed.

FIG. 12F is a view illustrating a sixth example of a configuration of a rotor targeted for being analyzed.

FIG. 12G is a view illustrating a seventh example of a configuration of a rotor targeted for being analyzed.

FIG. 12H is a view illustrating an eighth example of a configuration of a rotor targeted for being analyzed.

FIG. 12I is a view illustrating a ninth example of a configuration of a rotor targeted for being analyzed.

DESCRIPTION OF EMBODIMENTS

Figure 1:
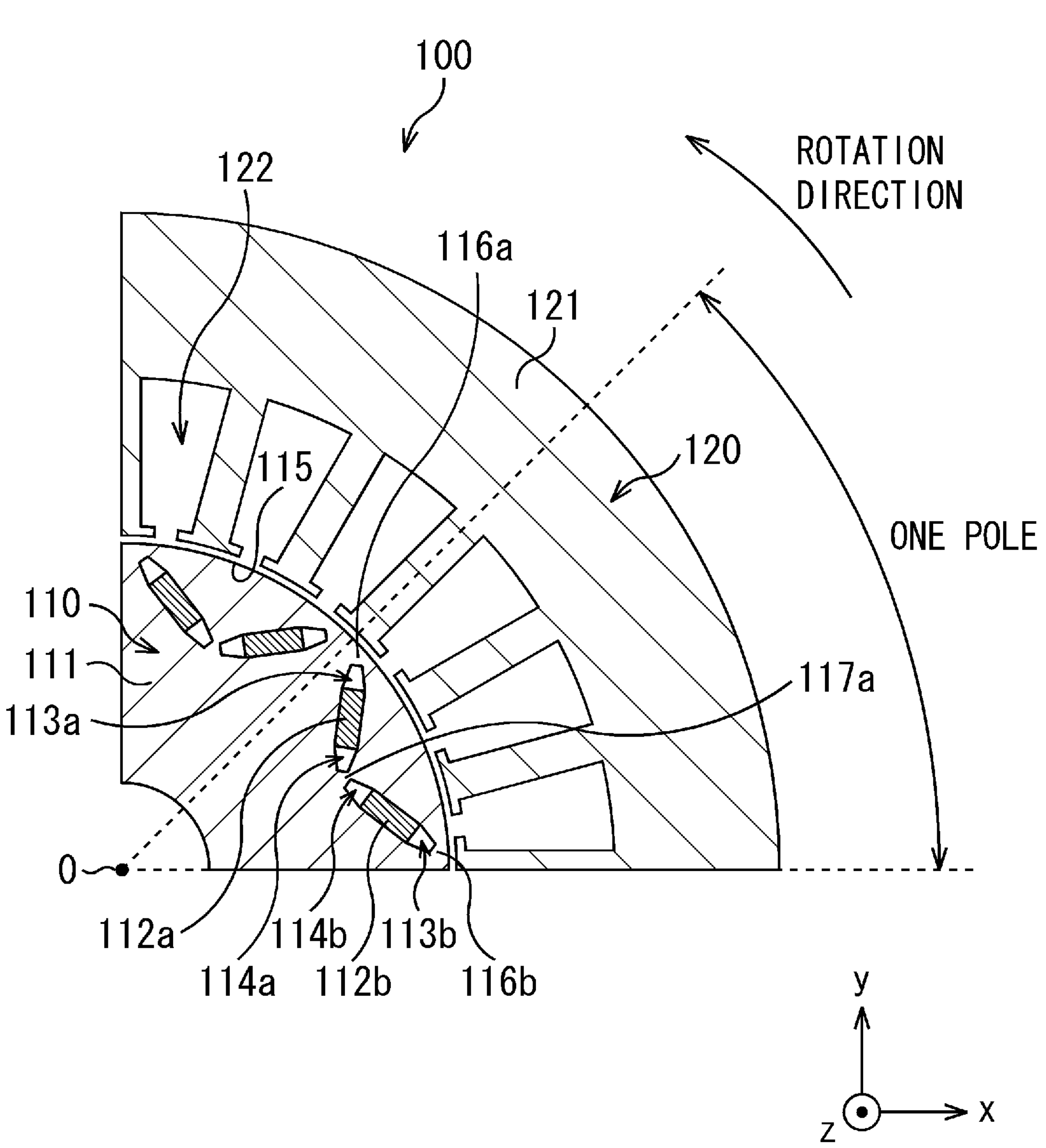
FIG. 1 is a view illustrating one example of a basic shape of an IPMSM.

Hereinafter, one embodiment of the present invention will be explained while referring to the drawings.

Note that a thing that comparison objects such as a length, a position, a size, and an interval are the same includes not only a thing that the comparison objects are strictly the same but also a thing that the comparison objects differ within a range that does not depart from the gist of the invention. For example, the thing that the comparison objects are the same also includes a thing that the comparison objects differ within a tolerance range defined when designed. Further, in each drawing, x-y-z coordinates indicate a relation of directions in the drawing. In the x-y-z coordinates, a symbol of white circle (○) with black circle (●) given therein indicates an arrow having a direction from a far side toward a near side of the paper sheet as a positive direction. Further, in each drawing, for the convenience of notation, for a plurality of the same components, the illustration of a reference sign of a partial component of the plurality of components will be omitted. In addition, in the following, the plurality of components are explained using the component given a reference sign thereto of the plurality of components as necessary.

(Circumstances)

The present inventors proposed a technique of designing shapes of various cores including a rotor core of an IPMSM in Japanese Laid-open Patent Publication No. 2021-114099. Thus, the present inventors found a shape contributing to improvement in torque as a shape of the rotor core by using the technique. The later-described embodiment of the present invention has been made based on the result. The following will explain the result, and explain the circumstances that have led to the later-described embodiment of the present invention.

The technique described in the specification of Japanese Laid-open Patent Publication No. 2021-114099 requires setting of a basic shape of elements targeted for design. This section exemplifies a case of setting shapes of flux barriers 113*a* to 113*b*, 114*a* to 114*b* in a rotor 110 included in an IPMSM 100 illustrated in FIG. 1 as the basic shape of the elements targeted for design. Thus, first, the IPMSM 100 illustrated in FIG. 1 will be explained.

FIG. 1 exemplifies a case where the number of poles of the IPMSM 100 are eight. In FIG. 1, a range of a double arrow indicated as "one pole" is a section forming one pole of the IPMSM 100. Note that when the number of poles of the IPMSM 100 are n, the IPMSM 100 has, on the whole, a relation of rotational symmetry of n-time symmetry in which a rotation axis line 0 of the IPMSM 100 is set as a rotation symmetry axis. n is an integer of two or more, and n is eight in the example illustrated in FIG. 1 (n=eight). FIG. 1 illustrates one of four regions obtained by dividing a cross section cut perpendicularly to the rotation axis line 0 of the IPMSM 100 into quarters, and illustrates a region forming two poles of the rotor 110 in a region of the IPMSM 100. These four regions have, on the whole, a relation of four (=eight poles÷two)-time symmetry in which the rotation axis line 0 of the IPMSM 100 is set as the rotation symmetry axis. Accordingly, in FIG. 1, rotating the region illustrated in FIG. 1 by 90° with a center line of the IPMSM 100 set as the rotation axis line 0 provides the entire configuration of the cross section of the IPMSM 100 when the IPMSM 100 is cut perpendicularly to the rotation axis line 0.

As illustrated in FIG. 1, the IPMSM 100 includes the rotor 110 and a stator 120.

The stator 120 includes a stator core 121 and a not-illustrated stator coil, and aims to generate a rotating magnetic field. Note that in FIG. 1, the illustration of the stator coil included in the stator 120 is omitted. However, the non-illustrated stator coil is disposed in each of slots 122 of the stator core 121 (as described previously, for the convenience of notation, a reference sign is given to only one slot in FIG. 1).

The rotor 110 rotates with the rotation axis line 0 of the IPMSM 100 set as a rotation axis line. In this section, FIG. 1 exemplifies a case where the rotor 110 rotates in a direction of an arrow given on the side of "rotation direction" (a counterclockwise direction opposite to the paper sheet). Note that the rotation axis line 0 of the rotor 110 and the rotation axis line 0 of the IPMSM 100 coincide.

The rotor 110 includes a rotor core 111 and a plurality of permanent magnets per one pole (two permanent magnets 112*a* to 112*b* in the example illustrated in FIG. 1). The rotor core 111 is formed using a soft magnetic material.

Here, the case of installing the plurality of permanent magnets 112 per one pole in the rotor core 111 is exemplified. Accordingly, in the rotor core 111, along a direction parallel to the rotation axis line 0 of the rotor core 111, a plurality of magnet holes are formed per one pole (in the following explanation, the direction parallel to the rotation axis line 0 is referred to as a z-axis direction as necessary). The magnet hole is a through hole penetrating in the z-axis direction. A plurality of the permanent magnets 112*a* to 112*b* are each inserted into the magnet hole formed in the rotor core 111, thereby being installed (embedded) in the rotor core 111. FIG. 1 illustrates the region forming the two poles of the rotor 110 in the region of the IPMSM 100 as previously described. In FIG. 1, the two permanent magnets 112*a* to 112*b* are embedded per one pole. Consequently, a total of 16 permanent magnets are embedded in the rotor core 111. Note that as previously described, in FIG. 1, for the convenience of notation, reference signs are given to only the section forming one pole of the rotor 110, and reference signs in sections forming the other seven poles of the rotor 110 are omitted.

In the magnet holes formed in the rotor core 111, spaces in the absence of the permanent magnets 112*a* to 112*b* serve as the flux barriers 113*a* to 113*b*, 114*a* to 114*b*. The flux barriers 113*a* to 113*b*, 114*a* to 114*b* are regions through which no magnetic flux passes, or regions which make it more difficult for the magnetic flux to pass through than regions around the flux barriers 113*a* to 113*b*, 114*a* to 114*b*. Here, a case of the absence of a material object in the flux barriers 113*a* to 113*b*, 114*a* to 114*b* is exemplified (that is, a case where the flux barriers 113*a* to 113*b*, 114*a* to 114*b* are gap portions (regions of air) is exemplified). However, even the installation of a nonmagnetic material in the flux barriers 113*a* to 113*b*, 114*a* to 114*b* yields results similar to later-described results illustrated in FIG. 4A to FIG. 7B.

Figure 2:
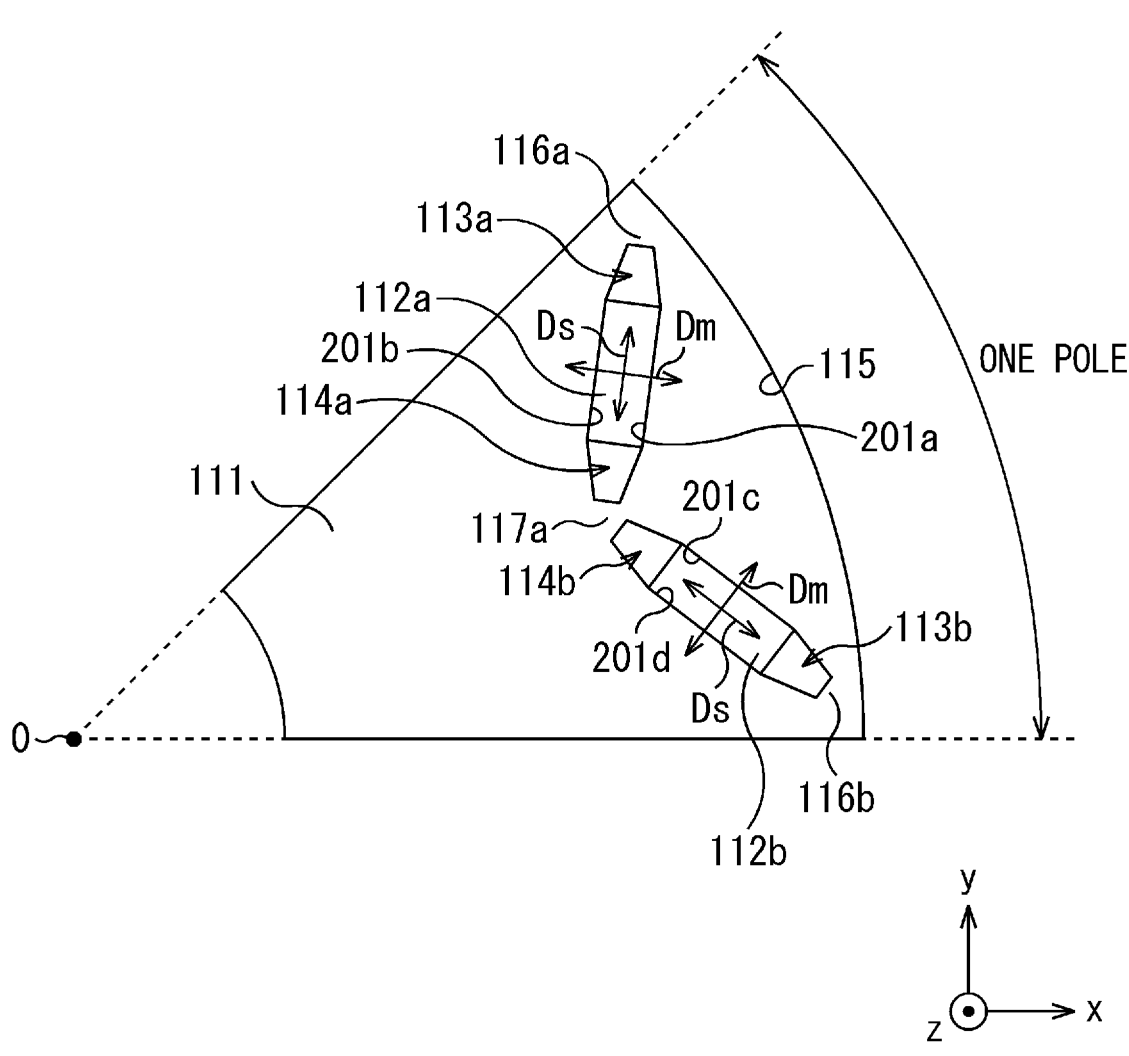
FIG. 2 is a view illustrating a rotor cross section of the IPMSM illustrated in FIG. 1.

In the following explanation, a cross section of the rotor 110 when cut perpendicularly to the rotation axis line 0 of the IPMSM 100 (rotor 110) is referred to as a rotor cross section as necessary. FIG. 2 is a view illustrating the rotor cross section corresponding to one pole of the IPMSM 100 illustrated in FIG. 1. Incidentally, in FIG. 2, to avoid making positions pointed by reference signs unclear, hatching indicating the cross section is omitted.

In FIG. 2, the magnetic flux flows in and out from pole faces 201*a* to 201*b*, 201*c* to 201*d* of the permanent magnets 112*a* to 112*b*. Further, in FIG. 2, directions orthogonal to the pole faces 201*a* to 201*b*, 201*c* to 201*d* are magnetization directions Dm of the permanent magnets 112*a* to 112*b*. In the following explanation, in the rotor cross section, both left and right directions relative to the magnetization direction Dm of the permanent magnet 112 at the center of each of the permanent magnets 112*a* to 112*b* are referred to as a left-right direction Ds as necessary. The left-right direction Ds is a direction perpendicular to the magnetization direction Dm of the permanent magnet 112 and a direction parallel to the rotation axis line 0 of the IPMSM 100. The flux barriers 113*a* and 114*a* are formed on both sides of the left-right direction Ds of the permanent magnet 112*a*, and the flux barriers 113*b* and 114*b* are formed on both sides of the left-right direction Ds of the permanent magnet 112*b*.

In the following explanation, of the flux barriers 113*a* to 113*b*, 114*a* to 114*b*, the flux barriers positioned on an outer peripheral side in the left-right direction Ds further than the permanent magnets 112*a* to 112*b* are referred to as the outer-peripheral-side flux barriers 113*a* to 113*b* as necessary. Further, of the flux barriers 113*a* to 113*b*, 114*a* to 114*b*, the flux barriers positioned on an inner peripheral side in the left-right direction Ds further than the permanent magnets 112*a* to 112*b* are referred to as the inter-magnet flux barriers 114*a* to 114*b* as necessary.

Bridge portions 116*a* to 116*b* are (small) regions connecting a region of the soft magnetic material of the rotor core 111 in a circumferential direction. The circumferential direction is a direction going around an outer peripheral surface 115 of the rotor 110 (rotor core 111) (a direction parallel to and a direction antiparallel to the rotation direction of the rotor 110 (rotor core 111)) A bridge portion 117*a* is a (small) region connecting the region of the soft magnetic material of the rotor core 111 in a radial direction of the IPMSM 100. In the following explanation, of the bridge portions 116*a* to 116*b*, 117*a*, the bridge portions 116*a* to 116*b* positioned on the outer peripheral side (the outer peripheral side in the radial direction of the IPMSM 100) in the left-right direction Ds further than the permanent magnets 112*a* to 112*b* are referred to as the outer-peripheral-side bridge portions as necessary. Further, of the bridge portions 116*a* to 116*b*, 117*a*, the bridge portion 117*a* positioned on the inner peripheral side (the inner peripheral side in the radial direction of the IPMSM 100) in the left-right direction Ds further than the permanent magnets 112*a* to 112*b* is referred to as the inter-magnet bridge portion 117*a* as necessary. In the example illustrated in FIG. 2, the outer-peripheral-side bridge portions 116*a* to 116*b* are the regions of the soft magnetic material positioned between the outer-peripheral-side flux barriers 113*a* to 113*b* and the outer peripheral surface 115 of the rotor core 111. Further, the inter-magnet bridge portion 117*a* is the region of the soft magnetic material positioned between the inter-magnet flux barriers 114*a* and 114*b*.

The bridge portions 116*a* to 116*b*, 117*a* are ones for suppressing a return of the magnetic flux flowing out from the permanent magnets 112*a* to 112*b* to the permanent magnets 112. In the bridge portions 116*a* to 116*b*, 117*a*, an area of a cross section perpendicular to a traveling direction of the magnetic flux is smaller than that of the other region. Accordingly, magnetic resistances of the bridge portions 116*a* to 116*b*, 117*a* are larger than a magnetic resistance of the other region of the soft magnetic material forming the rotor core 111. Thus, providing the bridge portions 116*a* to 116*b*, 117*a* allows the suppression of the return of the magnetic flux flowing out from the permanent magnets 112*a* to 112*b* to the permanent magnets 112. The bridge portions 116*a* to 116*b*, 117*a* are present for securing mechanical strength of the rotor core 111. The magnetic flux passing through the bridge portions 116*a* to 116*b*, 117*a* flows back to the permanent magnets 112*a* to 112*b*, which has given a common general technical knowledge of hardly contributing to torque of the rotor 110 to a person skilled in the art so far. In the following explanation, a magnetic flux flowing out from one pole face of the permanent magnet, passing through the bridge portion, and returning (flowing back) to the other pole face of the permanent magnet is referred to as a reflux magnetic flux as necessary.

Figure 3:
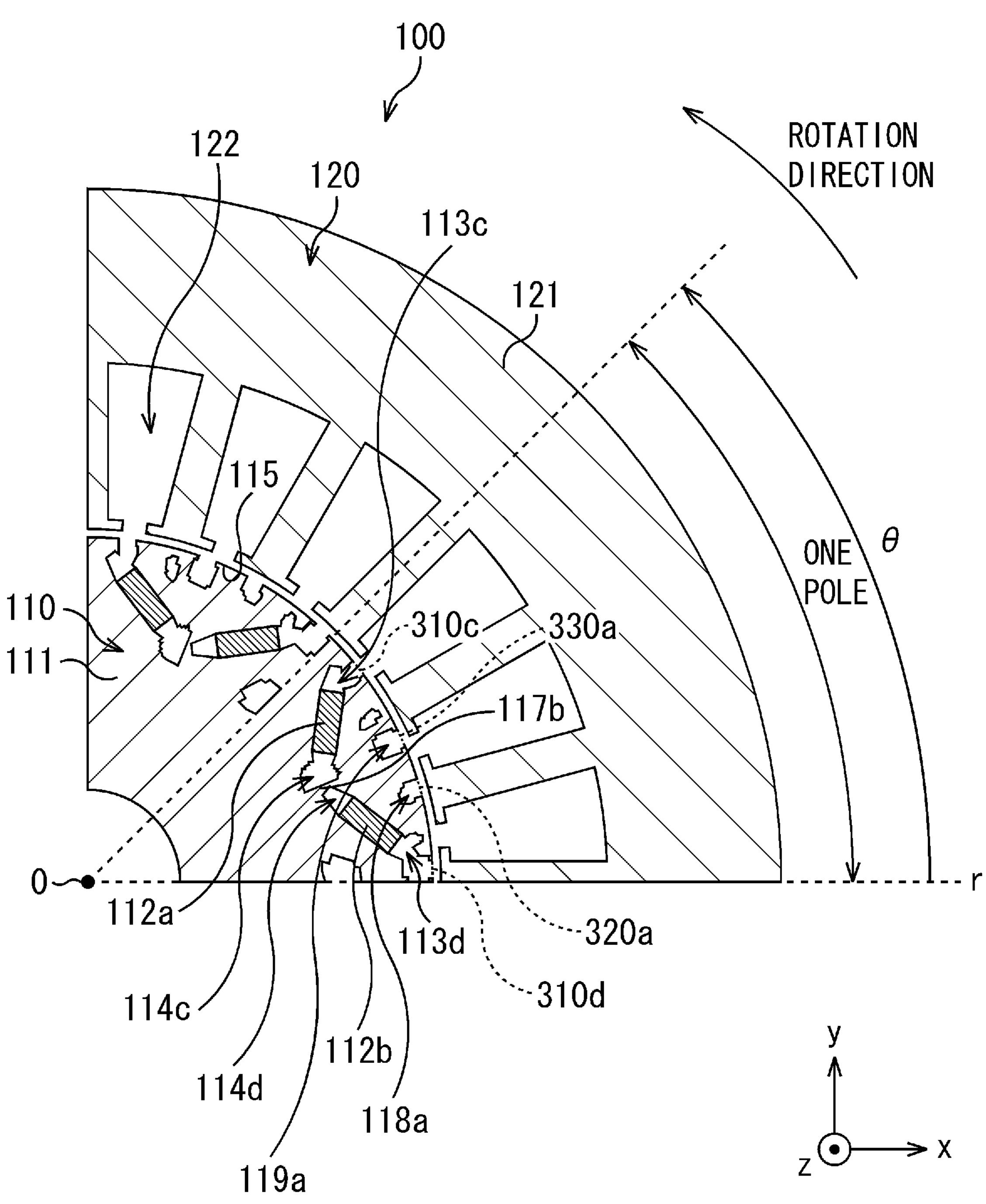
FIG. 3 is a view illustrating one example of an optimum shape of the IPMSM.

The present inventors designed a shape of the rotor core 111 according to the technique described in the specification of Japanese Laid-open Patent Publication No. 2021-114099. At that time, the flux barriers 113*a* to 113*b*, 114*a* to 114*b* illustrated in FIG. 1 and FIG. 2 were set as the elements targeted for design (elements whose shapes were changed from the basic shape). Further, the permanent magnet 112 was set as a predetermined core element (an element whose shape was not changed) except for the elements targeted for design. Further, a residual magnetic flux density of the permanent magnet 112 was set to 0.4 T. Note that the residual magnetic flux density of the permanent magnet 112 is defined in advance by specifications of the permanent magnet 112, for example. Further, an exciting current flowing through the non-illustrated stator coil was set as a three-phase alternating current having a peak value of 20 A and a frequency of 50 Hz. Further, a lead angle was set to 30°. In addition, with a stress produced in the rotor core 111 by centrifugal force applied to the rotor 110 with rotation of the rotor 110 ignored, the maximization of a value of the average torque of the rotor 110 was set as an optimization condition in an algorithm for an optimization problem. That is, a shape illustrated in FIG. 3 is an optimum shape in a case of permitting the stress produced in the rotor core 111 to become excessive. Accordingly, as long as the optimization condition is satisfied, the shape illustrated in FIG. 3 is a shape in no consideration of whether or not a shape of the rotor core 111 is feasible. In the following explanation, to be distinguished from an IPMSM in the shape designed in this manner, the IPMSM 100 illustrated in FIG. 1 is referred to as the IPMSM 100 in the basic shape as necessary. FIG. 3 is a view illustrating one example of a configuration of the IPMSM 100 optimized to maximize the value of the average torque of the rotor 110 according to the technique described in the specification of Japanese Laid-open Patent Publication No. 2021-114099 from the IPMSM 100 in the basic shape. In the following explanation, the IPMSM 100 illustrated in FIG. 3 is referred to as the IPMSM 100 in the optimum shape as necessary. Hereinafter, the findings in which the IPMSM 100 illustrated in FIG. 3 has been obtained from the IPMSM 100 in the optimum shape by the present inventors will be explained.

((First Finding))

As previously described, the optimum shape illustrated in FIG. 3 is the shape in the case of permitting the stress produced in the rotor core 111 to become excessive. The outer-peripheral-side bridge portions 116*a* to 116*b* are composed of the soft magnetic material. Accordingly, air is smaller in magnetic permeability than the outer-peripheral-side bridge portions 116*a* to 116*b*, and thus air is larger in magnetic resistance than the outer-peripheral-side bridge portions 116*a* to 116*b*. Thus, in the IPMSM 100 in the optimum shape illustrated in FIG. 3, outer-peripheral-side flux barriers 113*c* to 113*d* are formed in such a manner that (a part of) the outer-peripheral-side flux barriers 113*a* to 113*b* illustrated in FIG. 1 and FIG. 2 reach (reaches) the outer peripheral surface 115 of the rotor core 111 to be open to (communicate with) an outer portion. In other words, in the outer peripheral surface 115 of the rotor core 111 (soft magnetic material portion), open end portions are formed by the outer-peripheral-side flux barriers 113*c* to 113*d*. A long side direction of the open end portions is a direction parallel to the z-axis direction, a short side direction of the open end portions is the circumferential direction, and the open end portions communicate with the outer portion. Note that the open end portion is an opened end portion, and is not an actual surface but a virtual surface. In the IPMSM 100 in the basic shape illustrated in FIG. 2, the outer-peripheral-side bridge portions 116*a* to 116*b* are present. Accordingly, the outer-peripheral-side flux barriers 113*a* to 113*b* do not reach the outer peripheral surface 115, and are closed. FIG. 2 and FIG. 3 are different in this point. On the other hand, in the IPMSM 100 in the optimum shape illustrated in FIG. 3, the outer-peripheral-side flux barriers 113*c* to 113*d* reach the outer peripheral surface 115 of the rotor core 111 to be open. Therefore, most of the magnetic flux passing through the bridge portions 116*a* to 116*b* illustrated in FIG. 1 and FIG. 2 can be said to be a reflux magnetic flux.

The outer-peripheral-side flux barriers 113*c* to 113*d* illustrated in FIG. 3 reduce the reflux magnetic flux. In addition to this, the present inventors gave attention to a displacement of open end portions 310*c* to 310*d* of the outer-peripheral-side flux barriers 113*c* to 113*d* to a rear side in the rotation direction of the rotor core 111 (a side opposite to the rotation direction) as illustrated in FIG. 3. Then, the present inventors considered that the outer-peripheral-side flux barriers 113*c* to 113*d* play a role other than the reduction in reflux magnetic flux known as the common general technical knowledge so far.

Thus, the present inventors reviewed, of results of electromagnetic field analysis (magnetic flux density vector) in the IPMSM 100 in the optimum shape illustrated in FIG. 3, the result near the outer-peripheral-side flux barriers 113*c* to 113*d*. Note that in FIG. 3, r, θ represent a moving radius and an argument in polar coordinates (circular coordinates), respectively. In FIG. 3, a position of the rotation axis line 0 in a cross section of the rotor core 111 when cut perpendicularly to the rotation axis line 0 of the rotor core 111 is set as the origin 0 of the polar coordinates. Further, a direction from the origin 0 toward an outer side is a positive direction of a moving radius direction (a radial direction of the IPMSM 100), and a counterclockwise direction opposite to the sheet paper (rotation direction) is set as a positive direction of the argument. Incidentally, the outer side is a side where the outer peripheral surface 115 of the rotor core 111 is present.

FIG. 4A to FIG. 4B are views for explaining a first result of the electromagnetic field analysis in the IPMSM 100 in the optimum shape. FIG. 4A is the view illustrating one example of the magnetic flux density vector in the IPMSM 100 in the optimum shape. FIG. 4B is the view for explaining one example of an outline of flows, of magnetic fluxes in the IPMSM 100 in the optimum shape, of magnetic fluxes near the outer peripheral surface 115 of the rotor core 111. In FIG. 4A, the magnetic flux density vector is represented by arrows each having a density corresponding to the magnitude thereof. However, for the convenience of notation, FIG. 4A cannot clearly illustrate characteristics of the magnetic flux density vector. Thus, for the convenience of explanation, FIG. 4B illustrates the outline of the flows, of the magnetic fluxes in the IPMSM 100 in the optimum shape, of magnetic fluxes necessary for the explanation. In FIG. 4B, "N" and "S" indicated in the permanent magnets 112*a* to 112*b* indicate magnetic poles (N pole and S pole) of the rotor 110. Accordingly, the pole faces 201*a*, 201*c* of the permanent magnets 112*a*, 112*b* are the pole faces of N pole, and the pole face 201*b*, 201*d* thereof are the pole faces of S pole.

Further, in FIG. 4B, arrows illustrated in teeth 123*a* to 123*d* of the stator core 121 indicate magnetic fluxes generated in the teeth 123*a* to 123*d* of the stator core 121 at the time when a positional relationship between the rotor 110 and the stator 120 is a positional relationship illustrated in FIG. 4A and FIG. 4B. Specifically, the arrows illustrated in the teeth 123*a* to 123*b* of the stator core 121 indicate that the magnetic fluxes in a direction from the rotation axis line 0 of the IPMSM 100 toward the outer side along the radial direction of the IPMSM 100 are generated in the teeth 123*a* to 123*b* of the stator core 121. On the other hand, the arrows illustrated in the teeth 123*c* to 123*d* of the stator core 121 indicate that the magnetic fluxes in a direction toward the rotation axis line 0 of the IPMSM 100 along the radial direction of the IPMSM 100 are generated in the teeth 123*c* to 123*d* of the stator core 121. Further, the number of arrows represents a relative magnitude relation of magnetic flux quanta (magnetic flux densities) in the teeth 123*c* to 123*d* of the stator core 121. Note that a larger number of arrows indicates a larger flux quantum (an increase in magnetic flux density). However, a ratio of the magnetic flux quanta (magnetic flux densities) does not necessarily correspond to a ratio of the numbers of arrows. Further, an instantaneous value of torque of the rotor 110 varies while the rotor 110 is rotating once. The time when the positional relationship between the rotor 110 and the stator 120 is the positional relationship illustrated in FIG. 4A and FIG. 4B is the time when the instantaneous value of the torque of the rotor 110 is maximum.

Further, in FIG. 4B, an arrow extending from the rotor 110 (rotor core 111) toward the stator 120 (stator core 121) indicates a direction of a magnetic flux flowing from the rotor 110 (rotor core 111) toward the stator 120 (stator core 121). Further, an arrow extending from the stator 120 (stator core 121) toward the rotor 110 (rotor core 111) indicates a direction of a magnetic flux flowing from the stator 120 (stator core 121) toward the rotor 110 (rotor core 111). In FIG. 4B, for the convenience of notation, any of magnetic fluxes $\phi$1, $\phi$2, $\phi$3 represented by these arrows is represented by one arrow. However, magnetic flux quanta of the magnetic fluxes $\phi$1, $\phi$2, $\phi$3 are not necessarily the same.

The result illustrated in FIG. 4A to FIG. 4B is a result when the rotor core 111 rotates in the counterclockwise direction opposite to the paper sheet. Accordingly, of the two permanent magnets 112*a* to 112*b* in the same pole, the permanent magnet positioned on a front side in the rotation direction (rotation direction side) is the permanent magnet 112*a*, and the permanent magnet positioned on the rear side is the permanent magnet 112*b* (refer to the arrows marked on sides of "front side" and "rear side" in FIG. 4B). In the following explanation, the permanent magnet 112*a* positioned on the front side in the rotation direction is referred to as the permanent magnet 112*a* on the front side as necessary. Further, the permanent magnet 112*b* positioned on the rear side in the rotation rear direction is referred to as the permanent magnet 112*b* on the rear side as necessary.

The outer-peripheral-side flux barrier 113*c* reduces the reflux magnetic flux flowing back from one pole face (for example, N pole) of the permanent magnet 112*a* on the front side via the outer-peripheral-side bridge portion 116*a* illustrated in FIG. 2 to the other pole face (for example, S pole). Similarly, the outer-peripheral-side flux barrier 113*d* reduces the reflux magnetic flux flowing back from one pole face (for example, N pole) of the permanent magnet 112*b* on the rear side via the outer-peripheral-side bridge portion 116*b* illustrated in FIG. 2 to the other pole face (for example, S pole).

Meanwhile, the torque of the rotor 110 is proportional to the inner product of a moving radius direction (the radial direction of the IPMSM 100) component $B_r$ and a circumferential direction component Be of the magnetic flux density vector in a gap G between the rotor 110 (rotor core 111) and the stator 120 (stator core 121). In the following explanation, the moving radius direction (the radial direction of the IPMSM 100) component is referred to as a radial direction component as necessary. Accordingly, when a polar coordinate system is defined as illustrated in FIG. 3, in a case where both the radial direction component $B_r$ and the circumferential direction component $B_\theta$ of the magnetic flux density vector in a direction from the rotor 110 toward the stator 120 are positive, and a direction of this magnetic flux density vector is a direction greatly inclining to the radial direction of the IPMSM 100, the torque of the rotor 110 increases.

In FIG. 4B, the magnetic flux $\phi$1 from a region on the rear side in the rotation direction of the IPMSM 100 further than the outer-peripheral-side flux barrier 113*c* in a region of the outer peripheral surface 115 of the rotor core 111 toward the teeth 123*a* of the stator core 121 greatly inclines to the radial direction of the IPMSM 100. This is considered because the open end portion 310*c* of the outer-peripheral-side flux barrier 113*c* is displaced to the rear side in the rotation direction (the side opposite to the rotation direction) of the rotor core 111.

From the above, the present inventors obtained the first finding that displacing the open end portion 310 of the outer-peripheral-side flux barrier 113 to the rear side in the rotation direction (the side opposite to the rotation direction) of the rotor core 111 allows an increase in the torque of the rotor 110. In the following explanation, the magnetic flux $\phi$1 from the region on the rear side in the rotation direction of the IPMSM 100 further than the outer-peripheral-side flux barrier 113*c* in the region of the outer peripheral surface 115 of the rotor core 111 toward the teeth 123*a* of the stator core 121 is referred to as the magnetic flux $\phi$1 on the rear side of the outer-peripheral-side flux barrier 113*c* as necessary.

Note that in FIG. 4B, a magnetic flux in a direction opposite to the magnetic flux $\phi$1 on the rear side of the outer-peripheral-side flux barrier 113*c* also contributes to the increase in the torque of the rotor 110. This is because both the radial direction component $B_r$ and the circumferential direction component $B_\theta$ of the magnetic flux density vector become negative.

((Second Finding))

Further, the present inventors gave attention to the formation of recess portions 118*a*, 119*a* in positions different from those of the outer-peripheral-side flux barriers 113*c* to 113*d* in the IPMSM 100 in the optimum shape illustrated in FIG. 3. Thus, the present inventors reviewed, of the results of the electromagnetic field analysis (magnetic flux density vector) in the IPMSM 100 in the optimum shape illustrated in FIG. 3, the result near the recess portions 118*a*, 119*a*.

When the polar coordinate system is defined as illustrated in FIG. 3, in a case where both the radial direction component $B_r$ and the circumferential direction component $B_\theta$ of the magnetic flux density vector from the stator 120 toward the rotor 110 are negative, and a direction of this magnetic flux density vector is a direction greatly inclining to the radial direction of the IPMSM 100, the torque of the rotor 110 increases.

Further, as previously described, the result of the electromagnetic field analysis illustrated in FIG. 4A is the result when the exciting current flowing through the non-illustrated stator coil is the three-phase alternating current. Accordingly, the rotating magnetic field is generated in the IPMSM 100. A rotation period of the rotor 110 (rotor core 111) and a rotation period of the rotating magnetic field generated in the stator core 121 (teeth 123) are the same. Thus, a positional relationship between the rotor core 111 and the rotating magnetic field has no change even though the rotor core 111 rotates. Incidentally, the exciting current used in the present application is not limited to the three-phase alternating current.

Thus, in FIG. 4B, the recess portion 118*a* faces the teeth 123*a*, 123*c* with a high magnetic flux density (the teeth 123*a*, 123*c* in each of which the number of arrows are two) even though the rotor core 111 rotates. The magnetic flux $\phi$2 from the teeth 123*c* of the stator core 121 toward the region on the rear side in the rotation direction of the IPMSM 100 further than the recess portion 118*a* in the region of the outer peripheral surface 115 of the rotor core 111 inclines to the radial direction of the IPMSM 100, and both the radial direction component $B_r$ and the circumferential direction component $B_\theta$ of the magnetic flux density vector caused by the magnetic flux $\phi$2 are negative.

Accordingly, the magnetic flux $\phi$2 from the teeth 123*c* of the stator core 121 toward the region on the rear side in the rotation direction of the IPMSM 100 further than the recess portion 118*a* in the region of the cuter peripheral surface 115 of the rotor core 111 contributes to the increase in the torque of the rotor 110. In the following explanation, the magnetic flux ϕ2 from the teeth 123*c* of the stator core 121 toward the region on the rear side in the rotation direction of the IPMSM 100 further than the recess portion 118*a* in the region of the outer peripheral surface 115 of the rotor core 111 is referred to as the magnetic flux ϕ2 on the rear side of the recess portion 118*a* as necessary.

On the other hand, the magnetic flux ϕ3 from the teeth 123*c* of the stator core 121 toward a region on the front side in the rotation direction of the IPMSM 100 further than the recess portion 118*a* in the region of the outer peripheral surface 115 of the rotor core 111 inclines to the radial direction of the IPMSM 100, and the radial direction component $B_r$ and the circumferential direction component $B_\theta$ of the magnetic flux density vector caused by the magnetic flux ϕ3 are negative and positive, respectively. Accordingly, the magnetic flux ϕ3 from the teeth 123*c* of the stator core 121 toward the region on the front side in the rotation direction of the IPMSM 100 further than the recess portion 118*a* in the region of the outer peripheral surface 115 of the rotor core 111 does not contribute to the increase in the torque of the rotor 110. In the following explanation, the magnetic flux ϕ3 from the teeth 123*c* of the stator core 121 toward the region on the front side in the rotation direction of the IPMSM 100 further than the recess portion 118*a* in the region of the outer peripheral surface 115 of the rotor core 111 is referred to as the magnetic flux ϕ3 on the front side of the recess portion 118*a* as necessary.

Consequently, defining a size and a position of the recess portion 118*a* in such a manner that the magnetic flux ϕ2 on the rear side of the recess portion 118*a* is larger than the magnetic flux ϕ3 on the front side of the recess portion 118*a* allows the increase in the torque of the rotor 110.

Meanwhile, in FIG. 4B, the recess portion 119*a* faces the teeth 123*a*, 123*b* with a low magnetic flux density (the teeth 123*a*, 123*b* in each of which the number of arrows are two) even though the rotor core 111 rotates. Accordingly, the recess portion 119*a* contributes less to the increase in the torque of the rotor 110 than the recess portion 118*a*. Further, a larger number of recess portions causes the possibility of a decrease in mechanical strength of the rotor 110 (rotor core 111).

From the above, the present inventors obtained the second finding that providing the recess portion 118*a* in the position facing the teeth 123*a*, 123*b* with a higher magnetic flux density than the lowest magnetic flux density in the region of the outer peripheral surface 115 of the rotor core 111 allows the increase in the torque of the rotor 110.

Note that which piece of teeth of the teeth 123*a* to 123*d* of the stator core 121 has the lowest magnetic flux density is specified from such a result of the electromagnetic field analysis as exemplified in FIG. 4A, for example.

Further, in FIG. 4B, similarly to the magnetic flux ϕ2 on the rear side of the recess portion 118*a*, a magnetic flux in a direction opposite to the magnetic flux ϕ2 on the rear side of the recess portion 118*a* also contributes to the increase in the torque of the rotor 110. This is because both the radial direction component $B_r$ and the circumferential direction component $B_\theta$ of the magnetic flux density vector become positive. Further, similarly to the magnetic flux ϕ3 on the front side of the recess portion 118*a*, a magnetic flux in a direction opposite to the magnetic flux ϕ3 on the front side of the recess portion 118*a* does not contribute to the increase in the torque of the rotor 110 either. This is because the radial direction component $B_r$ and the circumferential direction component $B_\theta$ of the magnetic flux density vector become negative and positive, respectively.

((Third Finding))

In FIG. 1 and FIG. 2, the inter-magnet bridge portion 117 is composed of the soft magnetic material. Accordingly, air is smaller in magnetic permeability than the inter-magnet bridge portion 117. Thus, air is larger in magnetic resistance than the inter-magnet bridge portion 117. Accordingly, if all inter-magnet bridge portions including the inter-magnet bridge portion 117*a* illustrated in FIG. 1 and FIG. 2 are flux barriers (gap portions), the region of the magnetic substance material composing the inter-magnet bridge portions is replaced with the gap portion. This replacement reduces the magnetic permeability in this region. Accordingly, the magnetic resistance in this region increases. According to the previously-described common general technical knowledge, the reflux magnetic flux is considered to be reduced. Therefore, the present inventors predicted that not only the outer-peripheral-side bridge portions 116*a* to 116*b* illustrated in FIG. 1 and FIG. 2 but also the inter-magnet bridge portion 117*a* becomes the flux barrier (gap portion). However, as a result, the IPMSM 100 in the optimum shape illustrated in FIG. 3 is different from this prediction. However, in the IPMSM 100 in the optimum shape illustrated in FIG. 3, as illustrated by the inter-magnet flux barriers 114*c* to 114*d*, the inter-magnet flux barriers 114*a* to 114*b* illustrated in FIG. 1 and FIG. 2 are not coupled. That is, in the IPMSM 100 in the optimum shape illustrated in FIG. 3, as illustrated by the inter-magnet bridge portion 117*b*, a part of the inter-magnet bridge portion 117*a* illustrated in FIG. 1 and FIG. 2 remains. The IPMSM 100 in the optimum shape illustrated in FIG. 3 thus results in having the shape different from the previously-described prediction.

Further, in FIG. 1 and FIG. 2, the outer-peripheral-side bridge portions 116*a* to 116*b* are in positions closer to the stator 120 than the inter-magnet bridge portion 117*a*. Accordingly, the magnetic flux passing through the outer-peripheral-side bridge portions 116*a* to 116*b* heads for the stator 120 side more easily than the magnetic flux passing through the inter-magnet bridge portion 117*a*. Thus, the magnetic flux passing through the outer-periphery-side bridge portions 116*a* to 116*b* is considered to be less likely to become the reflux magnetic flux than the magnetic flux passing through the inter-magnet bridge portion 117*a*. Therefore, the coupled inter-magnet flux barriers 114*a* to 114*b* are considered to allow the magnetic flux heading for the stator 120 side to be increased more than the outer-peripheral-side flux barriers 113*a* to 113*b* reaching the outer peripheral surface 115 of the rotor core 111. However, as previously described, the IPMSM 100 in the optimum shape illustrated in FIG. 3 has a shape yielding the result opposite to this.

Thus, the present inventors reviewed, of the results of the electromagnetic field analysis (magnetic flux density vector) in the IPMSM 100 in the optimum shape illustrated in FIG. 3, the result near the permanent magnets 112*a* to 112*b*.

Figure 5B:
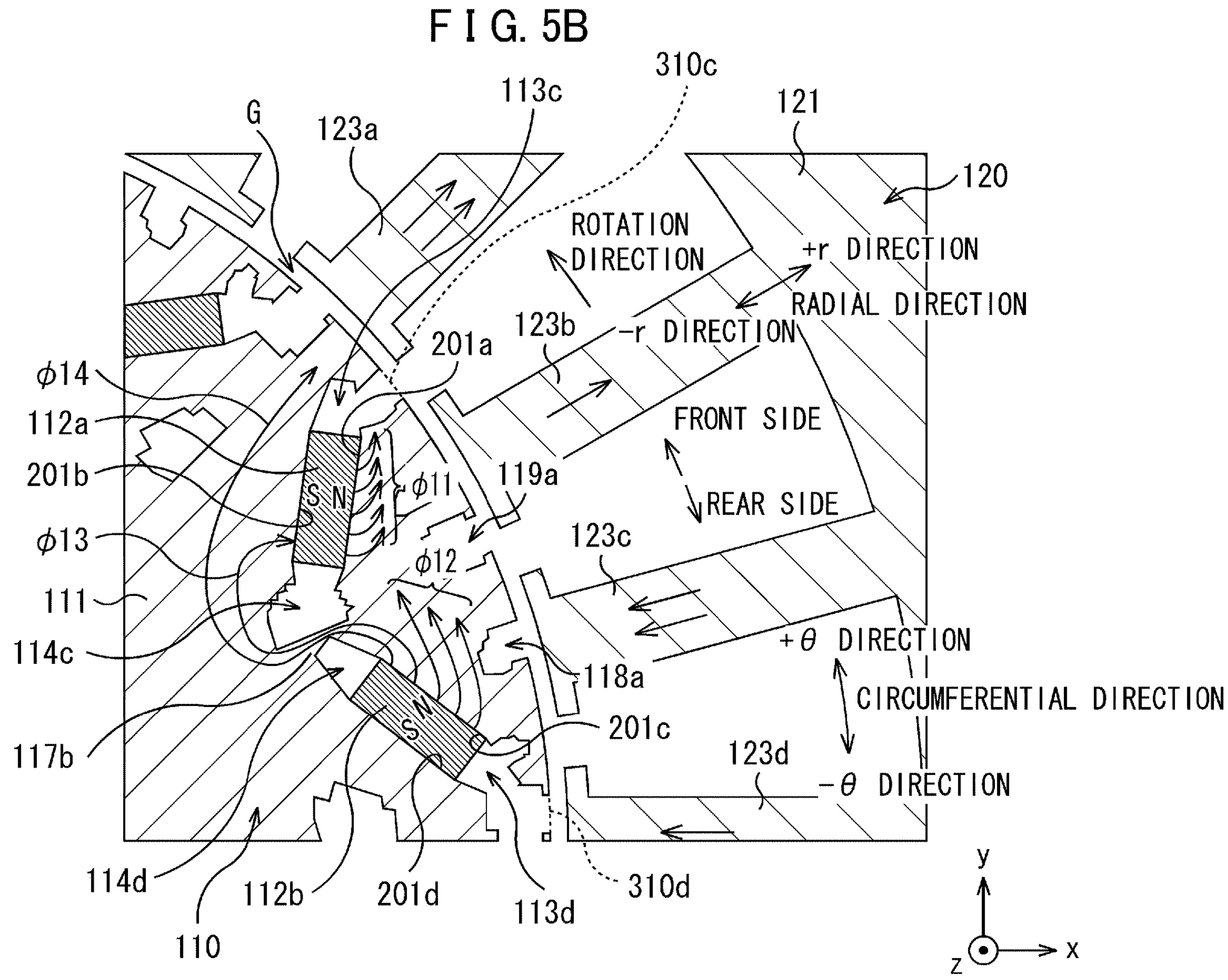
FIG. 5B is a view for explaining one example of an outline of flows of magnetic fluxes in the second analysis result.

FIG. 5A to FIG. 5B are views for explaining a second result of the electromagnetic field analysis in the IPMSM 100 in the optimum shape. FIG. 5A is the view illustrating one example of the magnetic flux density vector in the IPMSM 100 in the optimum shape, and is the same as FIG. 4A. FIG. 5B is the view for explaining one example of an outline of flows, of magnetic fluxes in the IPMSM 100 in the optimum shape, of magnetic fluxes near the permanent magnets 112*a* to 112*b*.

The notation in FIG. 5B is the same as the notation in FIG. 4B. FIG. 5B illustrates directions of the magnetic fluxes flowing out from the permanent magnets 112*a* to 112*b*. Arrows extending from the permanent magnets 112*a* to 112*b* have a similar meaning to the arrows indicated in the teeth 123*c* to 123*d* of the stator core 121. That is, the number of arrows extending from the permanent magnets 112*a* to 112*b* represents a relative magnitude relation of magnetic flux quanta (magnetic flux densities) flowing out from the permanent magnets 112*a* to 112*b*. Note that lengths of the arrows extending from the permanent magnets 112*a* to 112*b* have nothing to do with the magnitude of the magnetic fluxes.

In FIG. 5B, most of the magnetic flux flowing out from the permanent magnet 112*a* on the front side does not head for the inter-magnet bridge portion 117*b* (the region which is not replaced with the flux barrier in the inter-magnet bridge portion 117*a* illustrated in FIG. 2) between the permanent magnets 112*a* and 112*b*, but heads for the stator 120 side (refer to a magnetic flux ϕ11). On the other hand, the magnetic fluxes flowing out from the permanent magnet 112*b* on the rear side include magnetic fluxes passing through the inter-magnet bridge portion between the permanent magnets 112*a* and 112*b* (refer to magnetic fluxes ϕ13, ϕ14) other than a magnetic flux heading for the stator 120 side (refer to a magnetic flux ϕ12). However, the magnetic fluxes flowing out from the permanent magnet 112*b* on the rear side and passing through the bridge portion between the permanent magnets 112*a* and 112*b* do not return to the permanent magnet 112*b* on the rear side, but one of them heads for the permanent magnet 112*a* on the front side (refer to the magnetic flux 413), and the other passes through a region on the inner peripheral side of the IPMSM 100 further than the permanent magnet 112*a* on the front side and heads for the stator 120 (refer to the magnetic flux 414).

Thus, when the inter-magnet flux barriers 114*c* to 114*d* are provided between the permanent magnets 112*a* and 112*b*, of the magnetic fluxes passing through the inter-magnet bridge portion between the permanent magnets 112*a* and 112*b*, the magnetic fluxes ϕ13, ϕ14 contributing to the torque of the rotor 110 without becoming the reflux magnetic flux are present. Accordingly, providing the inter-magnet bridge portion 117*a* allows the magnetic flux contributing to the torque of the rotor 110 to be generated (refer to the magnetic flux ϕ13 illustrated in FIG. 5B). Further, the outer-peripheral-side bridge portions 116*a* to 116*b* reach the outer peripheral surface 115 to be opened, thereby allowing a decrease in the ref-lux magnetic flux and an increase in the magnetic flux heading for the stator 120 side (refer to the magnetic flux ϕ11 illustrated in FIG. 5B). That is, the present inventors obtained the third finding that actively providing the inter-magnet bridge portion 117*a* and extending the outer-peripheral-side flux barriers 113*a* to 113*b* to the outer peripheral surface 115 of the rotor core 111 to be opened allow the increase in the torque of the IPMSM 100 without dividing the rotor core 111.

Note that here, a case where the cross section of the rotor 110 in a direction perpendicular to the z-axis direction (the direction in which the rotation axis line extends) (x-y cross section) is the same in any position in the z-axis direction is exemplified. However, this need not necessarily be adopted. For example, a so-called skew may be performed on the rotor core 111. Specifically, the skew is achieved by stacking a plurality of soft magnetic material blocks in the z-axis direction in a state of rotating them by a predetermined angle in the same direction with the z axis set as an axis. For this manner, the permanent magnets are installed in each soft magnetic material block. Accordingly, for example, as many permanent magnets as the product of the number of magnet holes of each soft magnetic material block and the number of the soft magnetic material blocks are required. Performing such a skew allows suppression of vibrations of a rotary electric machine.

Here, the soft magnetic material block is produced by stacking a plurality of soft magnetic material plates having the same size and shape in such a manner that their contours (an inner edge and an outer edge) coincide, for example. The soft magnetic material plates used for each soft magnetic material block may have the same shape and size or different shapes and sizes. However, when the plurality of soft magnetic material blocks are stacked, outer edges of the soft magnetic material blocks coincide. Further, the soft magnetic material blocks may have the same predetermined angle or different predetermined angles. Further, the soft magnetic material block may be formed without using the plate-shaped soft magnetic material.

((Fourth Finding))

Figure 7A:
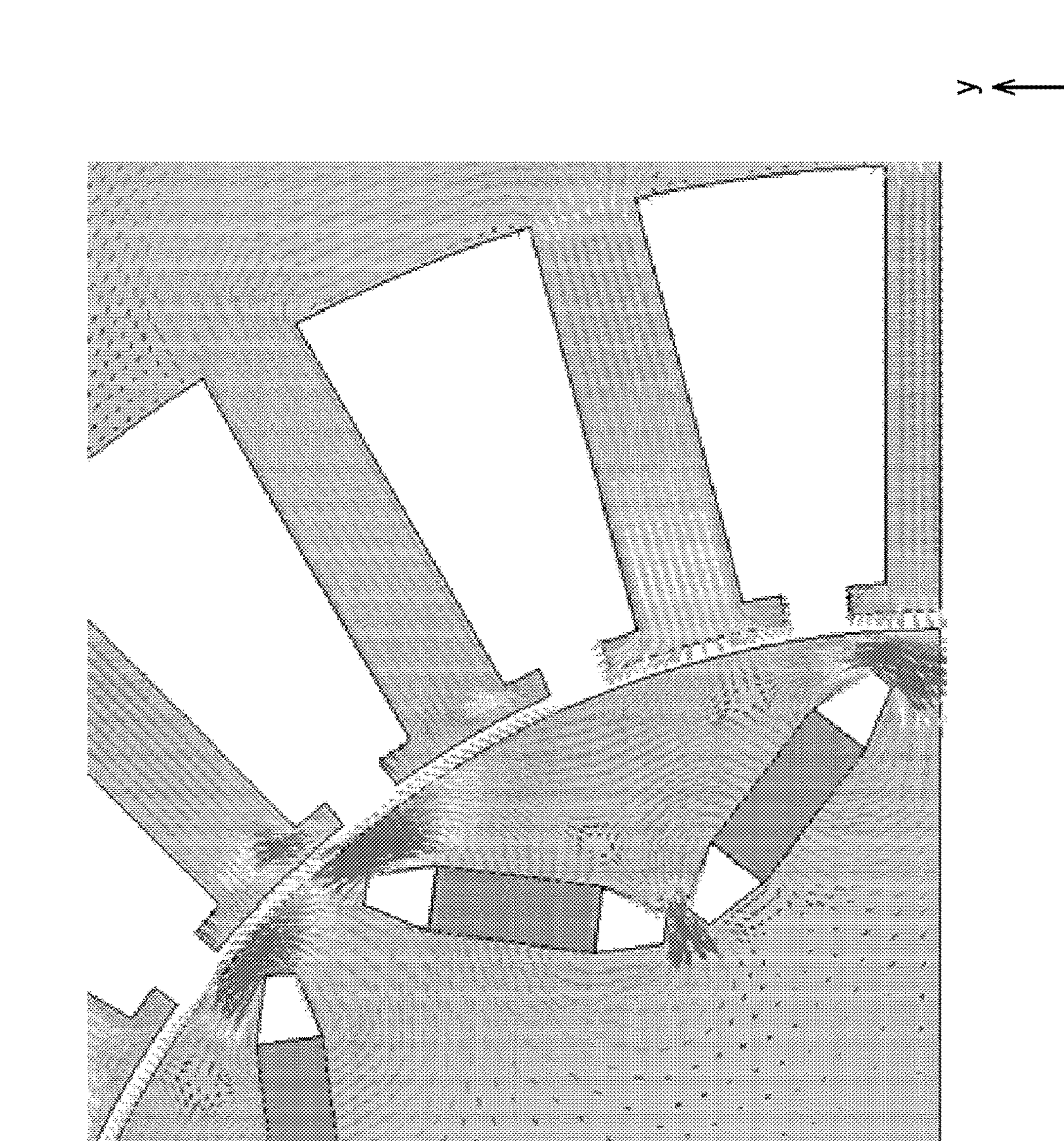
FIG. 7A is a view illustrating one example of a magnetic flux density vector in the IPMSM in the basic shape when a residual magnetic flux density of the permanent magnets is 1.0 T.
Figure 7B:
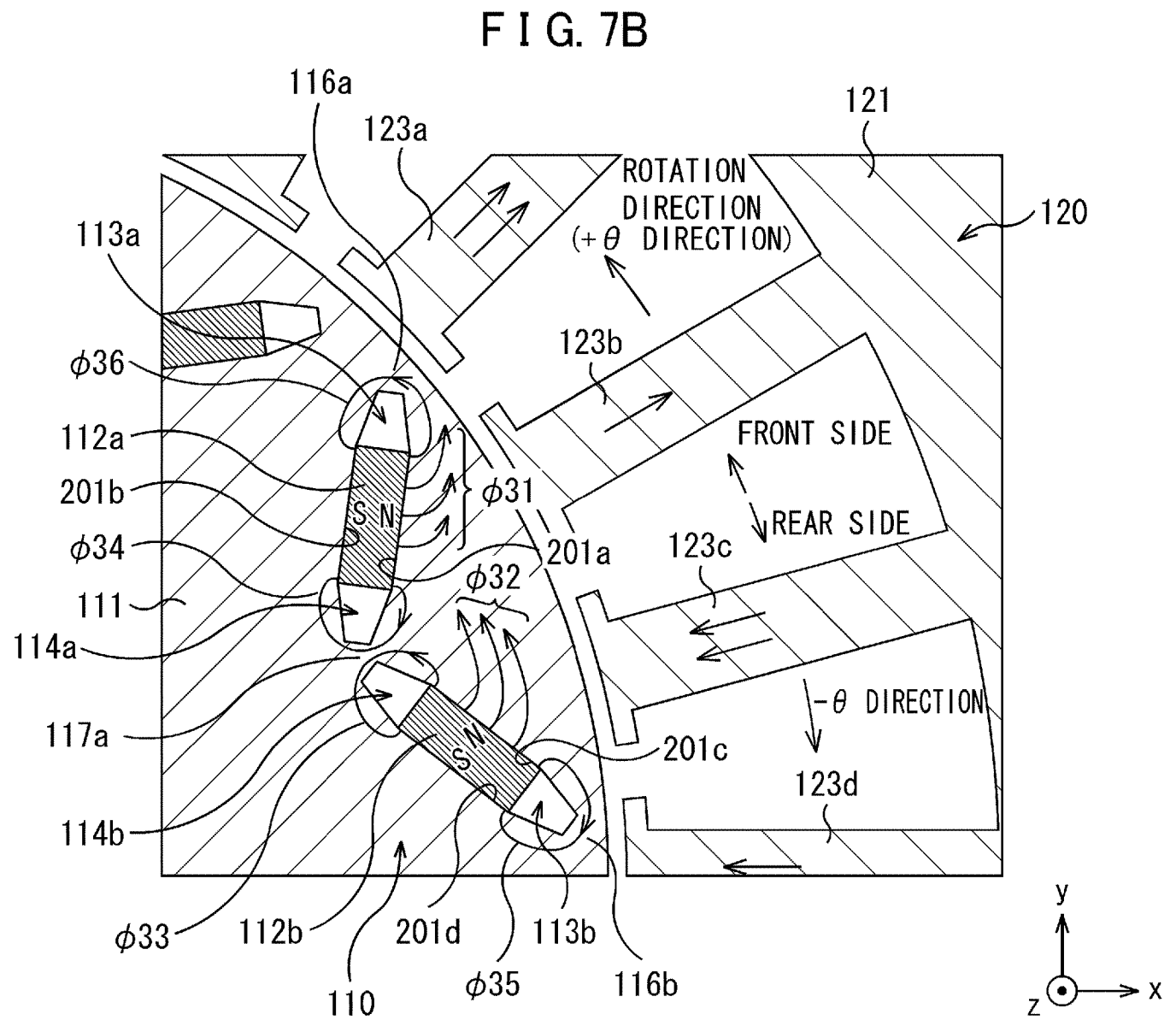

Moreover, the present inventors considered that a low residual magnetic flux density of the permanent magnets 112*a* to 112*b* reduces a flux quantum generated in the permanent magnets 112*a* to 112*b* (the magnetic flux density becomes low), which makes the magnetic flux less likely to flow back. Thus, the electromagnetic field analysis in each of a case of setting a residual magnetic flux density of the permanent magnets 112*a* to 112*b* to 0.4 T and a case of setting a residual magnetic flux density thereof to 1.0 T was performed on the IPMSM 100 in the basic shape illustrated in FIG. 1. FIG. 6A to FIG. 6B are views illustrating one example of the result of the electromagnetic field analysis in the IPMSM 100 in the basic shape when the residual magnetic flux density of the permanent magnets 112*a* to 112*b* is 0.4 T. FIG. 7A to FIG. 7B are views illustrating one example of the result of the electromagnetic field analysis in the IPMSM 100 in the basic shape when the residual magnetic flux density of the permanent magnets 112*a* to 112*b* is 1.0 T. Note that in FIG. 4A to FIG. 7B, conditions except for the residual magnetic flux densities of the permanent magnets 112*a* to 112*b* and the shapes of the rotor core 111 are the same.

FIG. 6A, FIG. 7A are the views illustrating examples of magnetic flux density vectors in the IPMSM 100 in the basic shape when the residual magnetic flux densities of the permanent magnets 112*a* to 112*b* are 0.4 T, 1.0 T, respectively. FIG. 6B, FIG. 7B are the views for explaining examples of outlines of flows of magnetic fluxes in the IPMSM 100 in the basic shape when the residual magnetic flux densities of the permanent magnets 112*a* to 112*b* are 0.4 T, 1.0 T, respectively. FIG. 6B and FIG. 7B illustrate the outlines of the flows of the magnetic fluxes necessary for the explanation of magnetic fluxes in the IPMSM 100 in the basic shape, for convenience of the explanation, similarly to FIG. 4B and FIG. 5B. Incidentally, the meaning of arrows in FIG. 6B and FIG. 7B is the same as the meaning of the arrows in FIG. 5B.

In FIG. 6B, when the residual magnetic flux density of the permanent magnets 112*a* to 112*b* is 0.4 T, most of the magnetic fluxes flowing out from the permanent magnets 112*a* to 112*b* are reflux magnetic fluxes passing through the outer-peripheral-side bridge portions 116*a* to 116*b* (refer to magnetic fluxes ϕ25, ϕ26). This corresponds to the fact that in the IPMSM 100 in the optimum shape illustrated in FIG. 3, the result that (a part of) the outer-peripheral-side flux barriers 113*a* to 113*b* illustrated in FIG. 1 and FIG. 2 reach (reaches) the outer peripheral surface 115 of the rotor core 111 to be open can be obtained. Further, in FIG. 6B, most of the magnetic fluxes passing through the inter-magnet bridge portion 117*a* are magnetic fluxes becoming no reflux magnetic flux similarly to the magnetic fluxes ϕ13 to ϕ14 illustrated in FIG. 5B (refer to the magnetic fluxes ϕ13 to ϕ14 illustrated in FIG. 5B and magnetic fluxes ϕ23 to ϕ24 illustrated in FIG. 6B).

On the other hand, in FIG. 7B, when the residual magnetic flux density of the permanent magnets 112*a* to 112*b* is 1.0 T, most of the magnetic fluxes flowing out from the permanent magnets 112*a* to 112*b* and passing through the inter-magnet bridge portion 117*a* become reflux magnetic fluxes (refer to magnetic fluxes ϕ33, ϕ34). As a result illustrated in FIG. 7A, the reflux magnetic flux is dominant in the magnetic flux passing through the inter-magnet bridge portion 117*a*. This demonstrates that a high residual magnetic flux density of the permanent magnets 112*a* to 112*b* reduces the magnetic fluxes ϕ13 to ϕ14, ϕ23 to ϕ24 becoming no reflux magnetic flux illustrated in FIG. 5B and FIG. 6B. Note that also in FIG. 7B, similarly to FIG. 6B, reflux magnetic fluxes flowing out from the permanent magnets 112*a* to 112*b* and passing through the outer-peripheral-side bridge portions 116*a* to 116*b* are present (refer to magnetic fluxes ϕ35, ϕ36). Further, also in FIG. 7B, similarly to FIG. 6B, magnetic fluxes heading for the stator 120 side from the permanent magnets 112*a* to 112*b* are present (refer to magnetic fluxes ϕ31, ϕ32).

As described above, the present inventors obtained the fourth finding that by using the permanent magnets 112*a* to 112*b* having a low residual magnetic flux density, the magnetic flux passing through the inter-magnet bridge portion 117*a* includes a lot of magnetic flux becoming no reflux magnetic flux and contributing to the torque of the rotor 110. This causes the consideration that under the same conditions except for the residual magnetic flux density of the permanent magnets 112*a* to 112*b*, the use of the permanent magnets 112*a* to 112*b* having a low residual magnetic flux density increases an improvement effect of the torque of the rotor 110 caused by providing the inter-magnet bridge portion 117*a* more than the use of the permanent magnets 112*a* to 112*b* having a high residual magnetic flux density. Accordingly, installing the permanent magnets 112*a* to 112*b* having a low residual magnetic flux density in the rotor core 111 allows the increase in the improvement effect of the torque of the rotor 110. Thus, for example, the torque of the rotor 110 can be improved even without using a permanent magnet containing rare earth. For example, even the use of a ferrite magnet or the like as a permanent magnet containing no rare earth allows the improvement in the torque of the rotor 110.

An embodiment of the present invention explained below has been made based on the above circumstances.

Note that as previously described, in this section, FIG. 1 exemplifies the case where the rotor 110 rotates in the direction of the arrow given on the side of "rotation direction" (the counterclockwise direction opposite to the paper sheet). However, the explanation in this section does not change depending on the direction in which the rotor 110 rotates. Note that when the rotor 110 rotates in a direction opposite to the direction of this arrow illustrated in FIG. 1, the permanent magnet 112 on the front side and the permanent magnet 112 on the rear side are the permanent magnets 112*b*, 112*a*, respectively, in the explanation in this section. Further, directions of magnetic fluxes and a magnitude relation between magnetic flux quanta (magnetic flux densities) in the teeth 123*a* to 123*d* of the stator core 121 are replaced with ones illustrated in FIG. 4A to FIG. 7B. That is, in FIG. 4B, FIG. 5B, FIG. 6B, and FIG. 7B, the arrows pointing outward and the arrows pointing inward indicated in the teeth 123*a* to 123*d* of the stator core 121 point inward and outward, respectively. Further, in FIG. 4B, FIG. 5B, FIG. 6B, and FIG. 7B, the two arrows and the one arrow change into one arrow and two arrows, respectively.

EMBODIMENT

Figure 8:
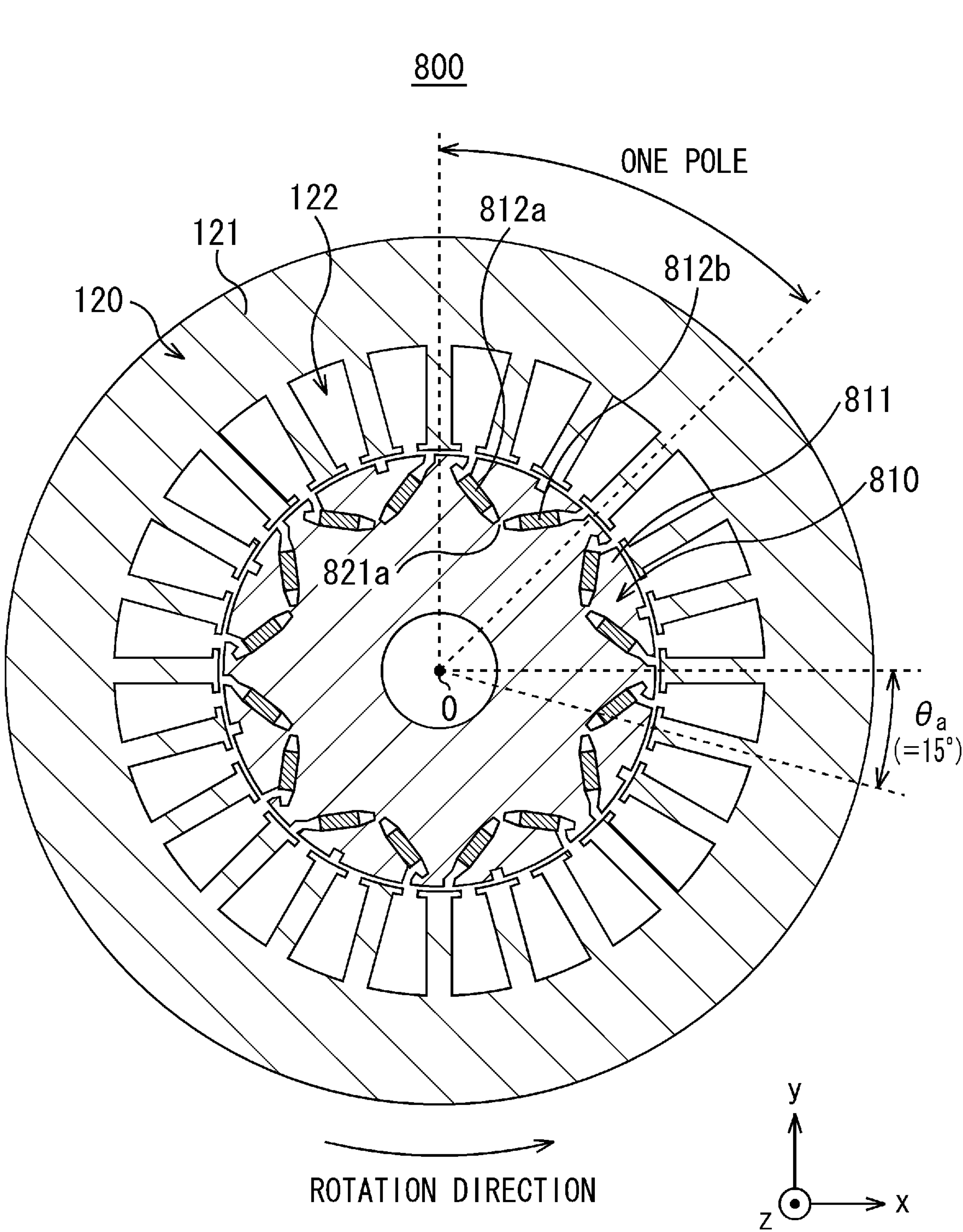
FIG. 8 is a view illustrating one example of a configuration of an IPMSM of an embodiment.

Hereinafter, one embodiment of the present invention will be explained. This embodiment exemplifies a case where the rotary electric machine is an inner rotor-type IPMSM. FIG. 8 is a view illustrating one example of a configuration of an IPMSM 800. FIG. 8 is a sectional view of the IPMSM 800 when cut perpendicularly to a rotation axis line 0 of the IPMSM 800 (rotor 810). Similarly to FIG. 1, in FIG. 8, a range of a double arrow indicated as "one pole" is a section forming one pole of the IPMSM 800. This embodiment exemplifies a case where the IPMSM 800 has eight poles. However, the number of poles of the IPMSM 800 is not limited to eight. As previously described, when the number of poles of the IPMSM 800 is n, the IPMSM 800 has, on the whole, a relation of rotational symmetry of n-time symmetry in which the rotation axis line 0 of the IPMSM 800 is set as a rotation symmetry axis. n is an integer of two or more, and n is eight in the example illustrated in FIG. 8 (n=eight).

In FIG. 8, the IPMSM 800 includes a rotor 810 and the stator 120. The stator 120 is the same as the stator 120 illustrated in FIG. 1. Accordingly, here, the same reference sign as the reference sign given in FIG. 1 is given, and a detailed explanation of the stator 120 is omitted. The IPMSM 800 includes the stator 120 (the non-illustrated stator coil and the stator core 121) defined as follows, for example. The stator core 121 is formed of a yoke portion having a fixed width and 24 teeth portions, for example. The width of the yoke portion and a length of the teeth portion are each a length in a radial length of the IPMSM 800. A shape of the yoke portion is circular, for example. The 24 teeth portions are installed at regular intervals on an inner peripheral surface of the yoke portion, for example. The width of the yoke portion is half a difference between an inside diameter and an outside diameter of the stator 120, for example. The length of the teeth portion is 0.4 times the difference between the inside diameter and the outside diameter of the stator 120, for example. A projecting portion is formed at a tip (an end on the rotation axis line 0 side) of the teeth portion. The projecting portion is formed to project to both sides in the circumferential direction. A length and a width in the circumferential direction of the projecting portion are each 0.3 times the length of the teeth portion, for example. However, as long as a configuration of the stator 120 is a configuration adopted typically as a stator of an IPMSM, the previously-described findings are not changed by the configuration of the stator 120.

This embodiment exemplifies a case where the exciting current flowing through the non-illustrated stator coil included in the stator 120 is the three-phase alternating current. Accordingly, a rotating magnetic field with a period in response to a frequency of the three-phase alternating current is generated in the stator core 121 (teeth 123). Note that as previously described, also in FIG. 8 similarly to FIG. 1, reference signs are given to only a section forming one pole of the rotor 810, and reference signs in sections forming the other seven poles of the rotor 810 are omitted.

Figure 9:
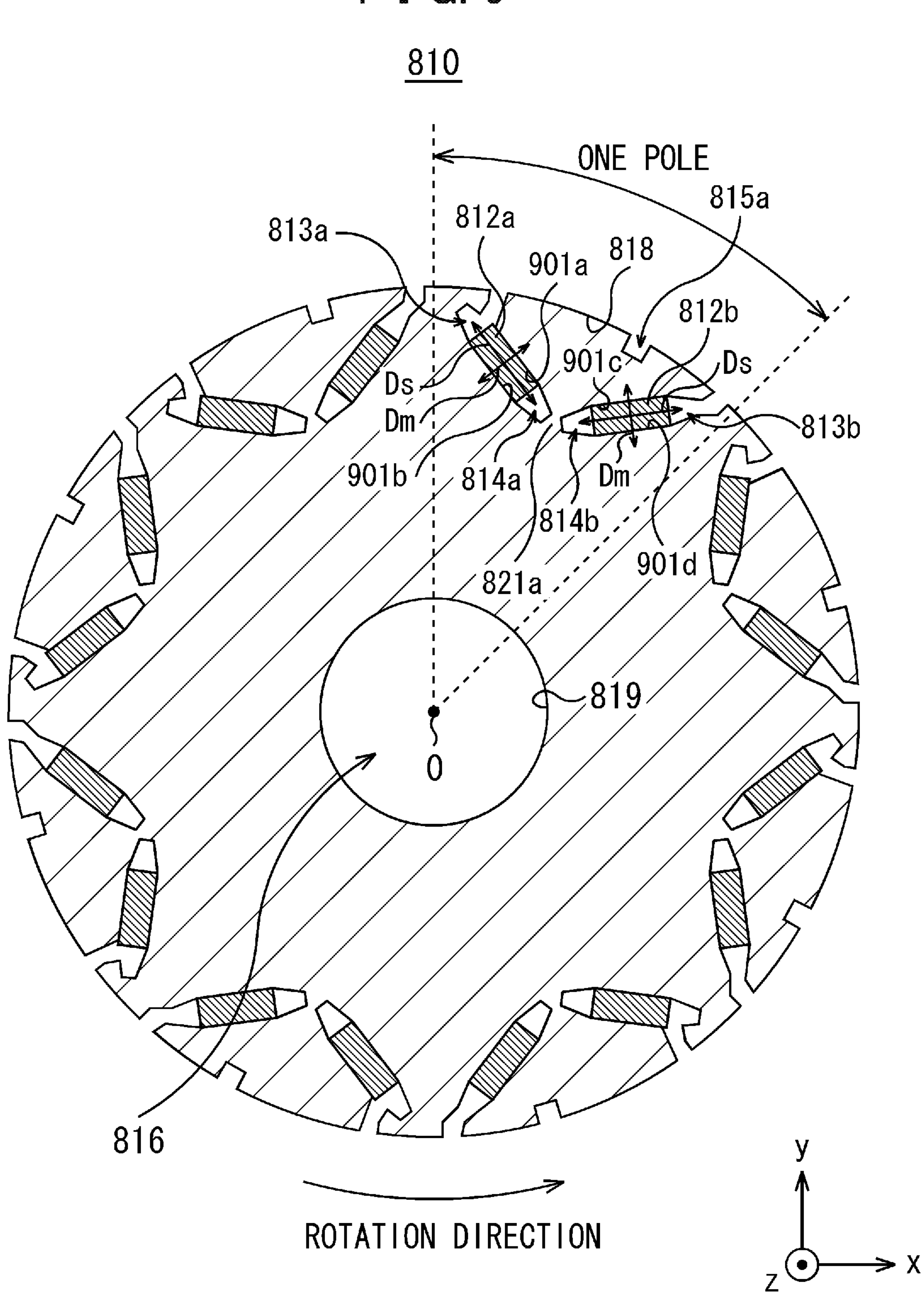
FIG. 9 is a view illustrating one example of a rotor cross section in the embodiment.

The rotor 810 rotates with the rotation axis line 0 of the IPMSM 800 set as a rotation axis line. The rotor 810 rotates in only one direction of a counterclockwise direction and a clockwise direction opposite to the paper sheet of FIG. 8. This embodiment exemplifies a case where the rotor 810 rotates in the counterclockwise direction opposite to the paper sheet of FIG. 8 (refer to an arrow given on the side of “rotation direction” in FIG. 8). FIG. 9 is a view illustrating one example of a configuration of the rotor 810 (rotor cross section). In the following explanation, a rotation direction of the rotor 810 is abbreviated as a rotation direction as necessary. Note that as previously described, also in FIG. 9 similarly to FIG. 8, reference signs are given to only a section forming one pole of the rotor 810, and reference signs in sections forming the other seven poles of the rotor 810 are omitted.

In FIG. 8 and FIG. 9, this embodiment exemplifies a case where the rotor 810 includes a rotor core 811 and a plurality of permanent magnets 812*a* to 812*b* per one pole. Specifically, this embodiment exemplifies a case where the rotor 810 includes a rotor core 811 and the two permanent magnets 812*a* to 812*b* per one pole. The rotor core 811 is formed using a soft magnetic material. The rotor core 811 is produced using a plurality of electromagnetic steel sheets stacked along the rotation axis line 0 of the rotor 810, for example. However, the rotor core 811 need not necessarily be produced using the electromagnetic steel sheets stacked in plurality. The rotor core 811 may be, for example, a powder magnetic core, an amorphous core, and a nanocrystal core. Note that when the rotor core 811 is the powder magnetic core, the amorphous core, and the nanocrystal core, each soft magnetic material forming the rotor core 811 is produced using insulator-coated soft magnetic particles, an amorphous alloy, and a nanocrystalline alloy.

Figure 10:
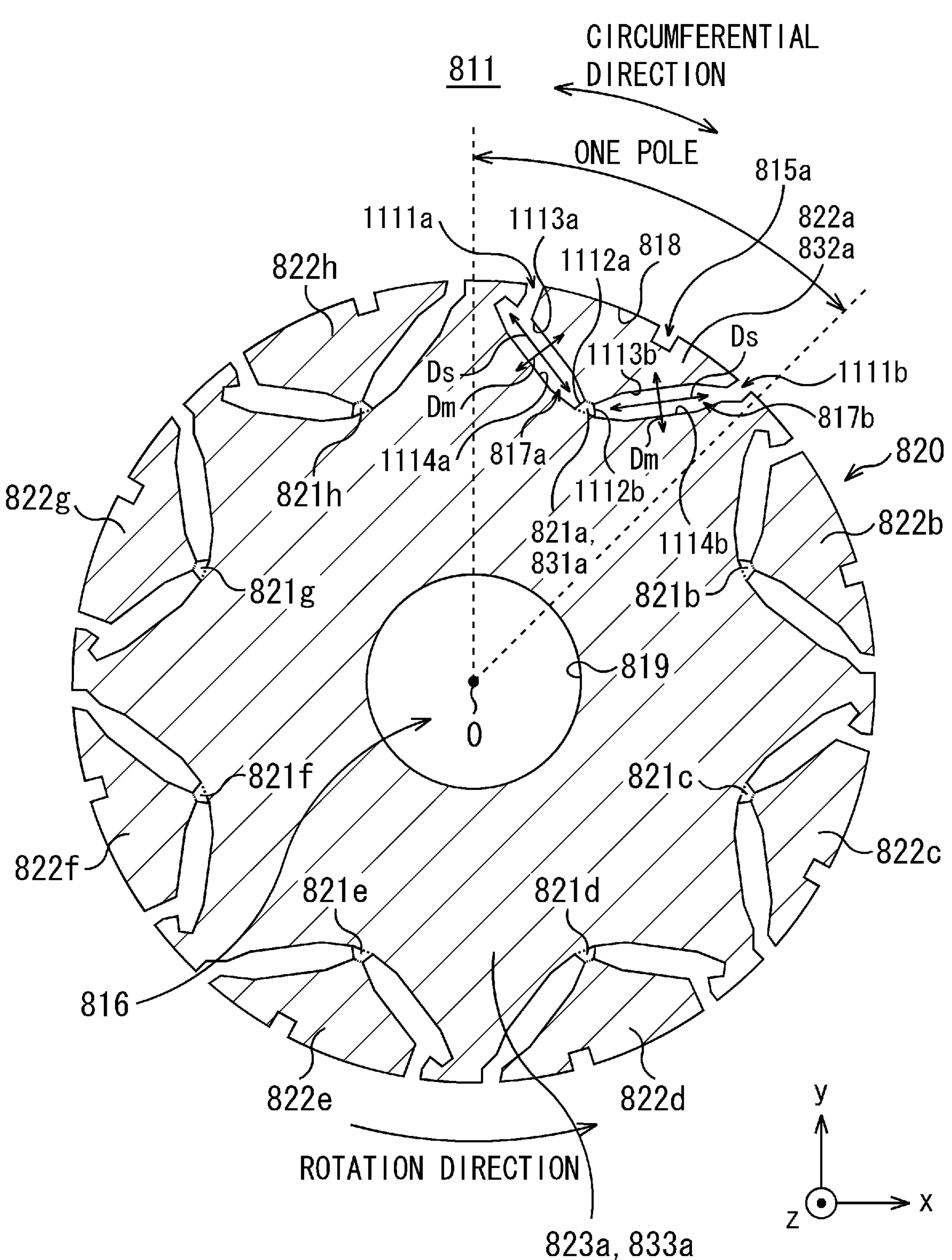
FIG. 10 is a view illustrating one example of a configuration of a rotor core of the embodiment.

FIG. 10 is a view illustrating one example of a configuration of the rotor core 811. Similarly to FIG. 8 and FIG. 9, FIG. 10 is also a sectional view of the rotor core 811 when cut perpendicularly to a rotation axis line 0 of the rotor core 811. In the following explanation, the cross section of the rotor core 811 when cut perpendicularly to the rotation axis line 0 of the rotor core 811 is referred to as a rotor core cross section as necessary. Note that the rotation axis line 0 of the rotor core 811 coincides with the rotation axis line 0 of the IPMSM 800 and the rotation axis line 0 of the rotor 810. Further, as previously described, also in FIG. 10, similarly to FIG. 8 and FIG. 9, reference signs are given to only a section forming one pole of the rotor core 811, and reference signs in sections forming the other seven poles of the rotor core 811 are omitted.

As illustrated in FIG. 10, this embodiment exemplifies a case where a plurality of magnet holes 817*a* to 817*b* are formed per one pole in the rotor core 811. Specifically, this embodiment exemplifies a case where the two magnet holes 817*a* to 817*b* are formed per one pole in the rotor core 811. Further, this embodiment exemplifies a case where the plurality of magnet holes 817*a* to 817*b* are each a through hole penetrating in the z-axis direction. In FIG. 8 to FIG. 10, the plurality of permanent magnets 812*a*, 812*b* are respectively inserted into the magnet holes 817*a*, 817*b* formed through the rotor core 811, thereby being installed (embedded) in the rotor core 811. In this manner, in this embodiment, the rotor core 811 includes the plurality of magnet holes 817*a* to 817*b* per one pole as the magnet holes through which the permanent magnets 812*a* to 812*b* are installed. Accordingly, in the example illustrated in FIG. 10, the magnet hole 817*a* is, of the plurality of magnet holes installed in the same pole, the magnet hole on the front side in the rotation direction. Further, in the example illustrated in FIG. 10, the magnet hole 817*b* is the magnet hole on the rear side in the rotation direction of the rotor 810 (the rotor core 811). In the following explanation, the magnet hole 817*a* on the front side in the rotation direction of the rotor 810 (the rotor core 811) is referred to as the front-side magnet hole 817*a* as necessary. Further, in the following explanation, the magnet hole 817*b* on the rear side in the rotation direction of the rotor 810 (the rotor core 811) is referred to as the rear-side magnet hole 817*b* as necessary.

Further, through the rotor core 811, a hole 816 through which the permanent magnets 812*a* to 812*b* are not installed is formed. The hole 816 is a through hole penetrating in the z-axis direction, and a non-illustrated shaft or the like is installed therethrough. Note that holes other than the hole 816 and the magnet holes 817*a* to 817*b* may be formed through the rotor core 811. Through these holes, the permanent magnets 812*a* to 812*b* may be installed or need not be installed.

In FIG. 9, this embodiment exemplifies a case where a magnetic flux flows in and out from pole faces 901*a* to 901*d* of the permanent magnets 812*a* to 812*b*. Directions orthogonal to the pole faces 901*a* to 901*d* are magnetization directions Dm of the permanent magnets 812*a* to 812*b*. As illustrated in FIG. 9, the magnetization directions Dm of the permanent magnets 812*a* to 812*b* are directions of double arrows indicated to run across the permanent magnets 812*a* to 812*b*. In FIG. 8 to FIG. 10, the magnet holes 817*a* to 817*b* through which the permanent magnets 812*a* to 812*b* are installed are formed in such a manner that the pole faces 901*a* to 901*d* of the permanent magnets 812*a* to 812*b* installed through the magnet holes 817*a* to 817*b* are inclined to an outer peripheral surface 818 of the rotor core 811. As illustrated in FIG. 8 to FIG. 10, this embodiment exemplifies a case where the magnet holes 817*a* to 817*b* are formed in such a manner that the closer to the outer peripheral surface 818 of the rotor core 811 the magnet holes 817*a* to 817*b* are, the wider an interval in a circumferential direction between the permanent magnets 812*a* and 812*b* installed through the magnet holes 817*a* to 817*b* is. Thus, this embodiment exemplifies a case where the permanent magnets 812*a* to 812*b* are disposed in a so-called V-shape.

As explained in the section of ((Fourth finding)) in the section of (Circumstances), from the viewpoint of reducing a reflux magnetic flux due to the permanent magnets 812*a* to 812*b*, a residual magnetic flux density of the permanent magnets 812*a* to 812*b* is preferably lower in a range of exhibiting a function as the permanent magnet in the IPMSM 800. Note that exhibiting the function as the permanent magnet in the IPMSM 800 means that at least a part of the magnetic flux generated by the permanent magnet reaches the stator 120, thereby becoming a magnetic flux contributing to torque of the rotor. When the residual magnetic flux density at room temperature of the permanent magnets 812*a* to 812*b* exceeds 0.4 T, an increase in a flux quantum generated by the permanent magnets 812*a* to 812*b* increases the reflux magnetic flux included in the magnetic flux passing through an inter-magnet bridge portion 821*a*. Thus, an effect of an increase in torque of the rotor 810 caused by the magnetic fluxes becoming no reflux magnetic flux (refer to the magnetic fluxes $\phi$13, $\phi$14 illustrated in FIG. 5B) decreases. Moreover, when the residual magnetic flux density at room temperature of the permanent magnets 812*a* to 812*b* exceeds 0.8 T, such a decrease in the effect of the increase in the torque of the rotor 810 is significant. Further, the residual magnetic flux density at room temperature of the permanent magnets 812*a* to 812*b* exceeding 0.4 T causes a case of requiring the use of the permanent magnets 812*a* to 812*b* containing rare earth. Further, the residual magnetic flux density at room temperature of the permanent magnets

812*a* to 812*b* exceeding 0.8 T causes a case of requiring the use of the permanent magnets 812*a* to 812*b* containing a large amount of rare earth.

From the above viewpoint, the residual magnetic flux density at room temperature of the permanent magnets 812*a* to 812*b* is preferably 0.8 T or less, and more preferably 0.4 T or less. Further, a smaller amount of rare earth is preferably contained in the permanent magnets 812*a* to 812*b*, and no rare earth is more preferably contained in the permanent magnets 812*a* to 812*b*. However, the residual magnetic flux density at room temperature of the permanent magnets 812*a* to 812*b* need not be in the previously-described range as long as the function as the permanent magnet in the IPMSM can be exhibited.

In FIG. 9, flux barriers 813*a* to 813*b*, 814*a* to 814*b* are, in the magnet holes 817*a* to 817*b* illustrated in FIG. 10 through which the permanent magnets 812*a* to 812*b* are installed, spaces where the permanent magnets 812*a* to 812*b* are absent. A material object is absent in the flux barriers 813*a* to 813*b*, 814*a* to 814*b*. That is, the flux barriers 813*a* to 813*b*, 814*a* to 814*b* are gap portions (regions of air). The flux barriers 813*a* to 813*b*, 814*a* to 814*b* are each a region through which no magnetic flux passes, or a region which makes it more difficult for the magnetic flux to pass through than a region around the flux barriers 813*a* to 813*b*, 814*a* to 814*b*. This embodiment exemplifies a case where the material object is absent in the flux barriers 813*a* to 813*b*, 814*a* to 814*b* as described above. However, this need not necessarily be adopted. For example, the flux barriers 813*a* to 813*b*, 814*a* to 814*b* may be formed by installing a nonmagnetic material in, in the magnet holes 817*a* to 817*b* illustrated in FIG. 10 through which the permanent magnets 812*a* to 812*b* are installed, the spaces where the permanent magnets 812*a* to 812*b* are absent.

In FIG. 9, the flux barriers 813*a* to 813*b* positioned on the outer peripheral side in the left-right direction Ds further than the permanent magnets 812*a* to 812*b* are outer-peripheral-side flux barriers. The outer-peripheral-side flux barriers 813*a* to 813*b* reach the outer peripheral surface 818 of the rotor 810 (the rotor core 811) to be open in the rotor cross section. On the other hand, the flux barriers 814*a* to 814*b* positioned on the inner peripheral side in the left-right direction Ds further than the permanent magnets 812*a* to 812*b* are inter-magnet flux barriers. The inter-magnet flux barriers 814*a* to 814*b* are not each open except for end portions in the z-axis direction. Incidentally, the outer peripheral side indicates the outer peripheral surface 818 side of the rotor core 811, and the inner peripheral side indicates an inner peripheral surface 819 side of the rotor core 811.

As previously described, the permanent magnet 812*a* is the front-side permanent magnet 812*a* on the front side further than the permanent magnet 812*b*, and the permanent magnet 812*b* is the rear-side permanent magnet 812*b*. The outer-peripheral-side flux barrier 813*a* positioned on the outer peripheral side further than the front-side permanent magnet 812*a* is positioned on the front side in the rotation direction further than the front-side permanent magnet 812*a*. On the other hand, the outer-peripheral-side flux barrier 813*b* positioned on the outer peripheral side further than the rear-side permanent magnet 812*b* is positioned on the rear side in the rotation direction further than the rear-side permanent magnet 812*b*.

Further, as illustrated in FIG. 10, in the outer peripheral surface 818 of the rotor core 811, a recess portion 815*a* is formed. The recess portion 815*a* is formed in a position opposite apart from the teeth 123*a*, 123*b* different from the teeth 123*b*, 123*d* having the lowest magnetic flux density of the teeth 123 of the stator core 121 installed in a position opposite apart from the outer peripheral surface 818 of the rotor core 811. As explained in the section of (Circumstances), a rotation period of the rotor core 811 and a rotation period of a rotating magnetic field generated in the stator core 121 (teeth 123) are the same. Accordingly, even though the rotor core 811 rotates, magnetic flux densities of the teeth 123 at the position facing the recess portion 815*a* are the same. This embodiment exemplifies a case where the one recess portion 815*a* is formed per one pole. However, the number of the recess portions 815 per one pole may be two or more. The magnetic flux density of the teeth 123*a*, 123*c* of the stator core 121 installed at the position opposite apart from the recess portion 815*a* is preferably high, and is more preferably the highest magnetic flux density. This is because the torque of the rotor 810 is allowed to increase.

Figure 11A:
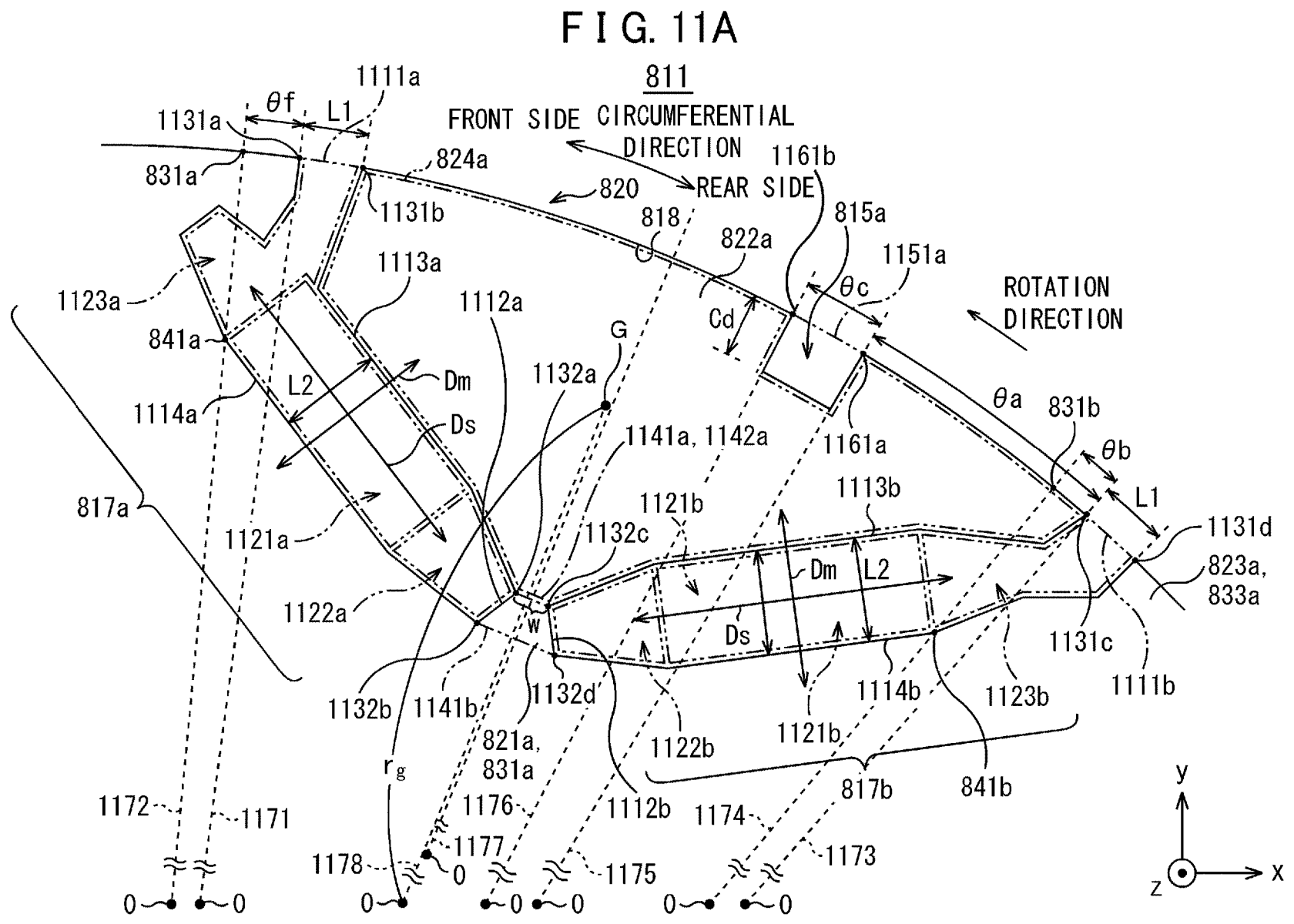
Figure 11B:
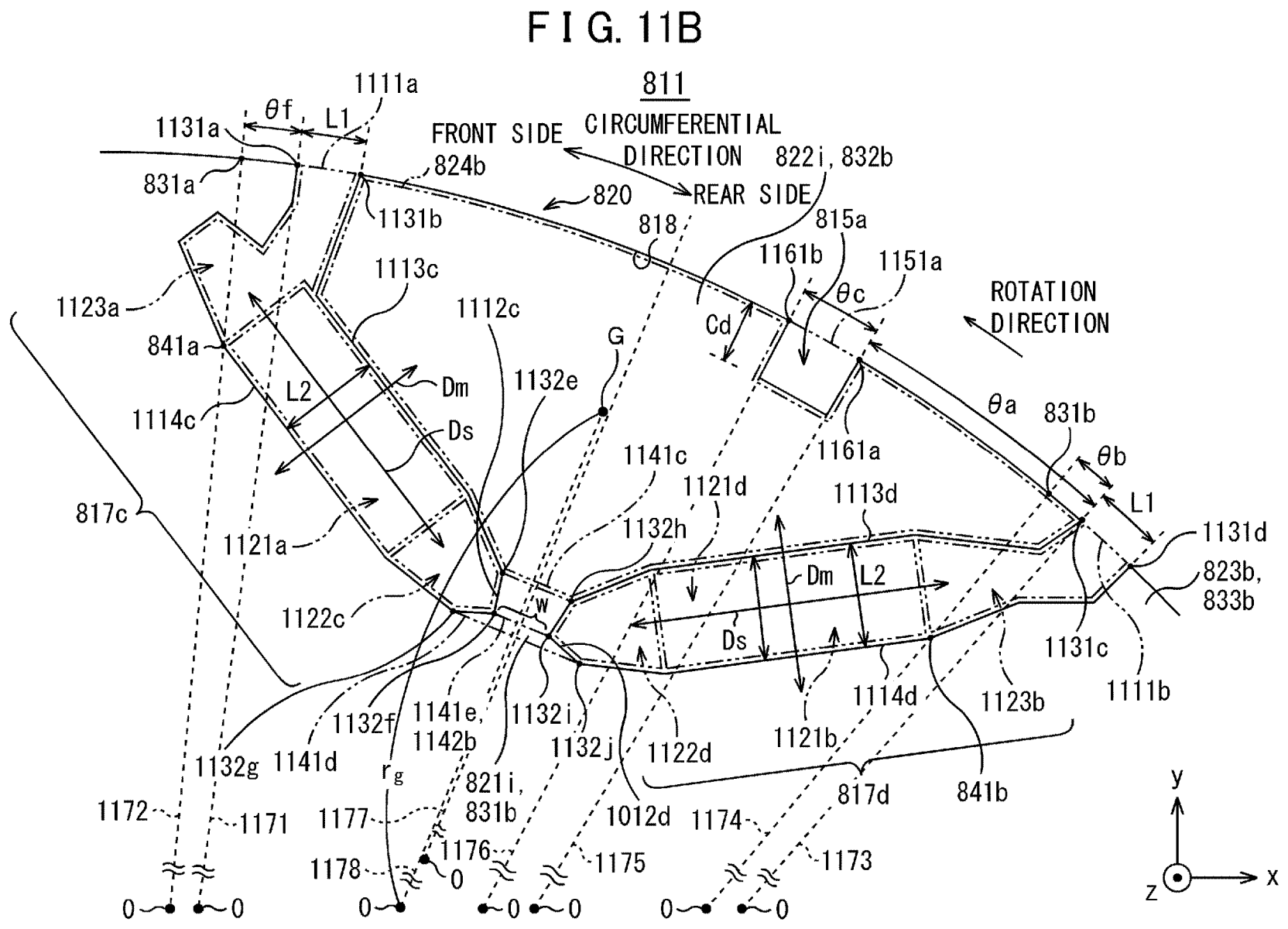
Figure 11C:
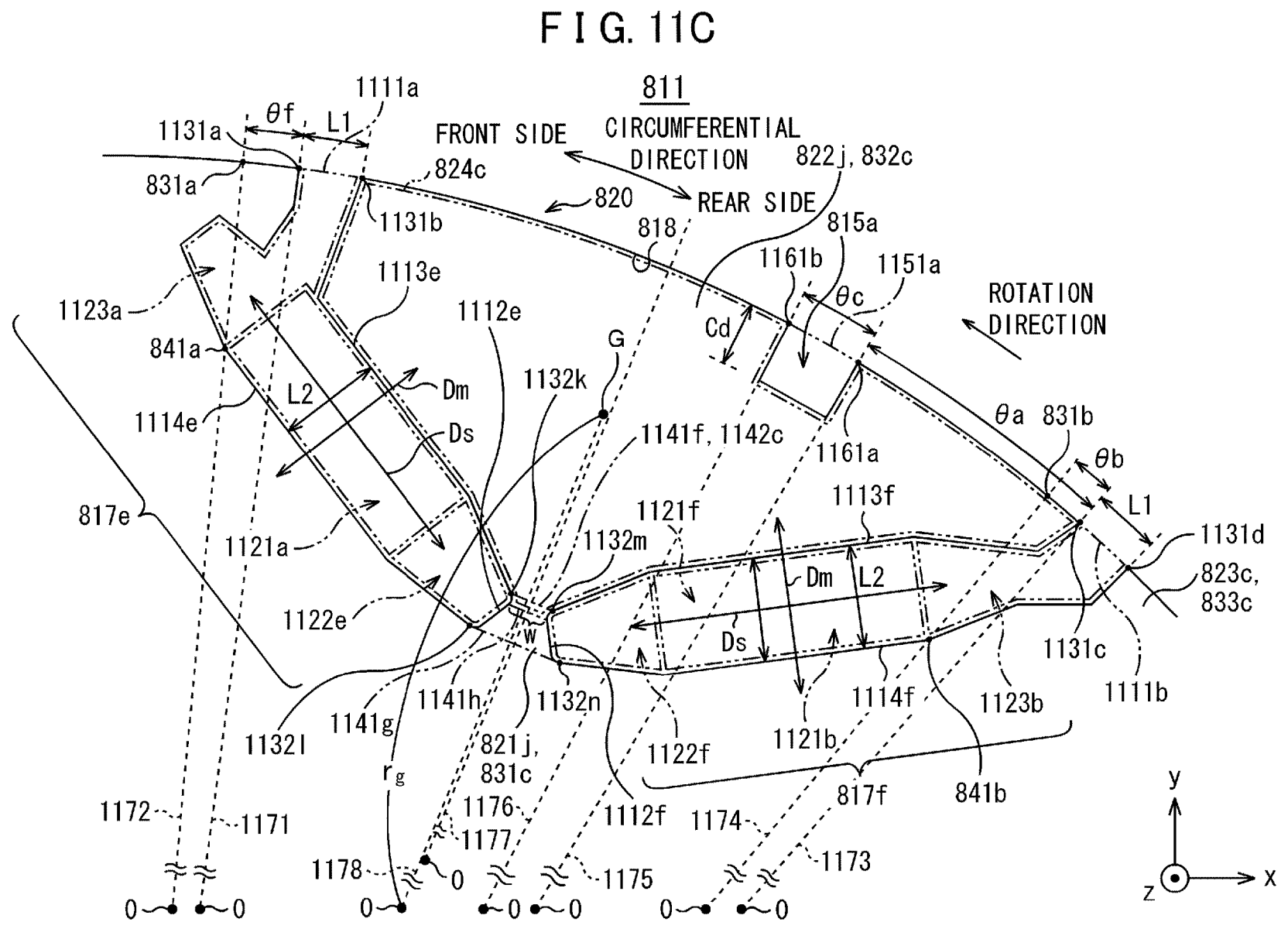

FIG. 11A is a view enlarging and illustrating a part of the rotor core 811 illustrated in FIG. 10 (a view illustrating the rotor core cross section). FIG. 11B and FIG. 11C are modified examples with respect to FIG. 11A. One example of a configuration of the rotor core 811 of this embodiment will be explained in detail while referring to FIG. 10 and FIG. 11A to FIG. 11C. Incidentally, in FIG. 11A to FIG. 11C, to avoid making positions pointed by reference signs unclear, the illustration of hatching indicating cross sections is omitted.

In FIG. 10, in a region occupied by the rotor core 811, a region of the soft magnetic material (a region except for the hole 816, the magnet holes 817*a* to 817*b*) is a soft magnetic material portion 820. As illustrated in FIG. 10 and FIG. 11A, in the rotor core cross section, the magnet holes 817*a* to 817*b* through which the permanent magnets 812*a* to 812*b* are installed has first end portions 1111*a* to 1111*b*, second end portions 1112*a* to 1112*b*, third end portions 1113*a* to 1113*b*, and fourth end portions 1114*a* to 1114*b*. In the following, one example of the first end portions 1111*a* to 1111*b*, the second end portions 1112*a* to 1112*b*, the third end portions 1113*a* to 1113*b*, and the fourth end portions 1114*a* to 1114*b* will be explained.

First, the first end portions 1111*a* to 1111*b* will be explained. The first end portions 1111*a* to 1111*b* are end portions positioned on an outermost periphery side in spaces serving as the outer-peripheral-side flux barriers 813*a* to 813*b* included in the magnet holes 817*a* to 817*b*. The first end portions 1111*a* to 1111*b* are open end portions open in positions on the outer peripheral surface 818 of the rotor core 811 in the rotor core cross section. In the following explanation, this sometimes causes the first end portion 1111 to be also referred to as an open end portion 1011. In the following explanation, in the rotor core cross section, a bent or curved portion is referred to as a corner portion as necessary. However, a region different from the open end portion in the outer peripheral surface 818 of the rotor core 811 (an arc region in which a distance from the rotation axis line 0 is a radial length of the rotor 810) is set to be no corner portion.

In the rotor core cross section, when the bent portion of the magnet holes 817*a* to 817*b* is the corner portion, a position of the corner portion is set as the bent position. In the rotor core cross section, when the curved portion of the magnet holes 817*a* to 817*b* is the corner portion, a position of the corner portion is set as a position at a representative point of the curved portion (a portion having curvature). These details will be explained while referring to FIG. 11A to FIG. 11C to be described later. In the example illustrated in FIG. 11A, the first end portions 1111*a* and 1111*b* are regions along the circumferential direction from one to the other of the corner portions 1131*a* to 1131*b* and from one to the other of the corner portions 1131*c* to 1131*d*, at two positions on the outer peripheral surface 818 (outermost peripheral side) of the rotor core 811 of the 12 corner portions of each of the one magnet hole 817*a* and the one magnet hole 817*b*, in the rotor core cross section. Incidentally, the circumferential direction is a direction going around the outer peripheral surface 818 of the rotor 810 (the rotor core 811) (a direction parallel to and a direction antiparallel to the rotation direction of the rotor 810 (the rotor core 811)).

Too short a length L1 in the circumferential direction of the first end portions 1111*a* to 1111*b* makes a magnetic resistance in the first end portions 1111*a* to 1111*b* too small. As a result, an increase in a magnetic flux going over the magnet holes 817*a* to 817*b* in the circumferential direction causes the possibility of an increase in the reflux magnetic flux. On the other hand, too long a length L1 in the circumferential direction of the first end portions 1111*a* to 111*b* decreases outer side portions 822*a* to 822*h*, thereby causing the possibility of a decrease in the magnetic flux contributing to the torque of the rotor 810. The length L1 in the circumferential direction of the first end portions 1111*a* to 1111*b* is appropriately defined from such a viewpoint. The length L1 in the circumferential direction of the first end portions 1111*a* to 1111*b* only needs to be defined from within a range of not less than 0.1 Limes nor more than 1.0 Limes a length L2 in the magnetization direction Dm of the permanent magnets 812*a* to 812*b*, for example. Note that this embodiment exemplifies a case where the length in the magnetization direction Dm of the permanent magnets 812*a* to 812*b* is fixed. However, the length in the magnetization direction Dm of the permanent magnets 812*a* to 812*b* need not be fixed. When the length in the magnetization direction Dm of the permanent magnets 812*a* to 812*b* is not fixed, the length L1 in the circumferential direction of the first end portions 1111*a* to 1111*b* only needs to be defined with a representative value (for example, an average value) of the length L2 in the magnetization direction Dm of the permanent magnets 812*a* to 812*b* set as a length in the magnetization direction Dm of the permanent magnets 812*a* to 812*b*.

Further, lengths of the other regions of the magnet holes 817*a* to 817*b* in the rotor core cross section are also defined from the viewpoints of suppressing the reflux magnetic flux and securing a magnetic path and strength similarly to the length L1 in the circumferential direction of the first end portions 1111*a* to 1111*b*. For example, a minimum value of a length between two end portions, facing each other, of the magnet holes 817*a* to 817*b* in the rotor core cross section only needs to be defined from within the range of, for example, not less than 0.1 times nor more than 1.0 times the length in the magnetization direction Dm of the permanent magnets 812*a* to 812*b*.

As explained in the section of ((First finding)) of the section of (Circumstances), displacing the first end portions 1111*a* to 1111*b* which are the open end portions of the outer-peripheral-side flux barriers 813*a* to 813*b* to the rear side in the rotation direction (the side opposite to the rotation direction) of the rotor core 811 increases the torque of the rotor 810. In this embodiment for the purpose of achieving the above, as illustrated in FIG. 11A, in the rotor core cross section, positions of open-end front-side corner portions 1131*a*, 1131*c* of the first end portions 1111*a*, 1111*b* which are the open end portions are set to be on the rear side in the rotation direction of the rotor core 811 further than reference positions 831*a*, 831*b* relative to the magnet holes 817*a*, 817*b* having the first end portions 1111*a*, 1111*b* which are the open end portions. The open-end front-side corner portions 1131*a*, 1131*c* of the first end portions 1111*a*, 1111*b* are, of the corner portions of the first end portions 1111*a*, 1111*b*, the corner portions on the front side in the rotation direction of the rotor core 811 in the rotor core cross section.

Here, the reference positions 831*a*, 831*b* relative to the magnet holes 817*a*, 817*b* having the first end portions 1111*a*, 1111*b* which are the open end portions are at positions at intersection points of straight lines 1172, 1174 passing through permanent-magnet reference end portions 841*a*, 841*b* which are one of end portions of the permanent magnet 812*a* and one of end portions of the permanent magnet 812*b*, which are installed through the magnet holes 817*a*, 817*b*, and the rotation axis line 0, and, the outer peripheral surface 818 of the rotor core 811, in the rotor core cross section, as illustrated in FIG. 11A. The permanent-magnet reference end portions 841*a*, 841*b* in the magnet holes 817*a*, 817*b* having the first end portions 1111*a*, 1111*b* which are the open end portions are, of the end portions of the permanent magnets 812*a*, 812*b* installed through the magnet holes 817*a*, 817*b*, each the end portion included in the one permanent magnet 812*a* or the one permanent magnet 812*b* at a position closest to each of the open end portions (the first end portion 1111*a* or 1111*b*). The permanent-magnet reference end portions 841*a*, 841*b* in the magnet holes 817*a*, 817*b* having the first end portions 1111*a*, 1111*b* which are the open end portions are each the end portion at a position at the farthest distance in the circumferential direction from a straight line 1177 passing through the central position in the circumferential direction of the region of one pole (magnetic pole) (of the rotor) including the permanent magnet 812*a* or 812*b* (region surrounded by dotted lines in FIG. 3), and the rotation axis line 0 (the origin 0), in the rotor core cross section, of the end portions of the one permanent magnet 812*a* or the one permanent magnet 812*b* at the position closest to the open end portion. Here, the distance in the circumferential direction from the straight line 1177 is a distance defined on the side, of the front side and the rear side in the rotation direction of the rotor core 811, in which this open end portion is present. As illustrated in FIG. 11A, the permanent-magnet reference end portion 841*a* in the magnet hole 817*a* having the first end portion 1111*a* which is the open end portion is, of the end portions of the permanent magnet 812*a*, the end portion at the position at the farthest distance in the circumferential direction from the straight line 1177 on the front side on the first end portion 1111*a* side further than the straight line 1177. Further, the permanent-magnet reference end portion 841*b* of the magnet hole 817*b* having the first end portion 1111*b* which is the open end portion is, of the end portions of the permanent magnet 812*b*, the end portion at the position at the farthest distance in the circumferential direction from the straight line 1177 on the rear side on the first end portion 1111*b* side further than the straight line 1177.

Note that for the convenience of notation, although FIG. 11A illustrates a plurality of the rotation axis lines 0, the actual rotation axis line 0 is one in number as illustrated in FIG. 8 to FIG. 10 (the rotation axis lines 0 illustrated in FIG. 11A are superposed at one position). This is also the same as FIG. 11B and FIG. 11C to be described later. In this embodiment, the magnet holes 817*a*, 817*b* are respectively present on the front side and the rear side in the rotation direction of the rotor core 811 relative to the straight line 1177. Accordingly, relative to the straight line 1177, the permanent-magnet reference end portions 841*a*, 814*b* are each present on only one of the front side and the rear side in the rotation direction of the rotor core 811. In contrast with this, for example, it is assumed that the magnet holes 817*a* to 817*b* are disposed to straddle the straight line 1177, and both the outer-peripheral-side flux barriers 113*a* and 114*a*, and, the outer-peripheral-side flux barriers 113*b* and 114*b*, each two of which are formed on both sides in the left-right direction Ds of each of the permanent magnets 812*a* to 812*b* installed through the magnet holes 817*a* to 817*b*, have the open end portions in the outer peripheral surface 818 of the rotor core 811. In this case, the permanent-magnet reference end portions 841*a*, 841*b* are each present in the rotation direction of the rotor core 811 relative to the straight line 1177 in the rotor core cross section.

In the examples illustrated in FIG. 11A to FIG. 11C, the central position in the circumferential direction of the region of one pole of the rotor is defined as a position of the midpoint of a virtual straight line connecting the permanent-magnet reference end portions 841*a* and 841*b*, for example. The straight line passing through this central position and the rotation axis line 0 (the origin 0) is set as the straight line 1177.

In the following explanation, the open-end front-side corner portions 1131*a*, 1131*c* are respectively referred to as a front-side open-end front-side corner portion, a rear-side open-end front-side corner portion as necessary. Further, in the following explanation, the open end portion 1111*a* of the front-side magnet hole 817*a* and the open end portion 1111*b* of the rear-side magnet hole 817*b* are respectively referred to as the front-side open end portion 1111*a* and the rear-side open end portion 1111*b* as necessary.

The front-side open-end front-side corner portion 1131*a* is, of the two corner portions 1131*a* to 1131*b* in the circumferential direction of the rotor core 811 of the front-side open end portion 1111*a* which is the open end portion of a space 1123*a* included in the front-side magnet hole 817*a* and serving as the outer-peripheral-side flux barrier, the corner portion 1131*a* on the front side in the rotation direction of the rotor core 811.

The rear-side open-end front-side corner portion 1131*c* is, of the two corner portions 1131*c* to 1131*d* in the circumferential direction of the rotor core 811 of the rear-side open end portion 1111*b* which is the open end portion of a space 1123*b* included in the rear-side magnet hole 817*b* and serving as the outer-peripheral-side flux barrier, the corner portion 1131*c* on the front side in the rotation direction of the rotor core 811.

Further, in the rotor core cross section, the permanent-magnet reference end portions 841*a* to 841*b* have the front-side permanent magnet end portion 841*a* and the rear-side permanent magnet end portion 841*b*. The front-side permanent magnet end portion 841*a* is, of the end portions of the permanent magnets 812*a* to 812*b* installed through the front-side magnet hole 817*a*, the end portion at a position on the foremost side in the rotation direction. The rear-side permanent magnet end portion 841*b* is, of the end portions of the permanent magnet 812*b* installed through the rear-side magnet hole 817*b*, the end portion at a position on the rearmost side in the rotation direction.

Further, in the rotor core cross section, the reference positions 831*a* to 831*b* have the front-side reference position 831*a*. The reference position 831*a* is a position at an intersection point of the straight line 1172 passing through the front-side permanent magnet end portion 841*a* and the rotation axis line 0, and the outer peripheral surface 818 of the rotor core 811.

Further, in the rotor core cross section, the reference positions 831*a* to 831*b* have the rear-side reference position 831*b*. The rear-side reference position 831*b* is a position at an intersection point of the straight line 1174 passing through the rear-side permanent magnet end portion 841*b* and the rotation axis line 0, and the outer peripheral surface 818 of the rotor core 811.

Here, from the viewpoint of certainly improving the torque of the rotor 810, positions of the open-end front-side corner portions (the front-side open-end front-side corner portion 1131*a* and the rear-side open-end front-side corner portion 1131*c*) are preferably defined in the following manner.

The number (piece) of slots in the stator core 121 installed in the position opposite apart from the outer peripheral surface 818 of the rotor core 811 is set as $N_{slot}$. Further, a reference-position movement angle θa (rad) which is an angle around the rotation axis line 0 from the reference positions 831*a* to 831*b* is set as $2\pi/N_{slot}$. In the example illustrated in FIG. 8, $N_{slot}$ as the number (piece) of slots in the stator core 121 is 24, and thus the reference-position movement angle θa is 2π/24 (rad)=15(°).

In the rotor core cross section, an angle θf formed by a straight line 1171 and the straight line 1172 is preferably set to not less than θa/24 nor more than 15θa/24, and more preferably set within a range of θa/3±θa/24. The straight line 1171 is a straight line passing through the front-side open-end front-side corner portion 1131*a* and the rotation axis line 0 in the rotor core cross section. The front-side open-end front-side corner portion 1131*a* is, of the open-end front-side corner portions 1131*a*, 1131*c*, the corner portion positioned on the front side in the rotation direction further than the center in the circumferential direction in the same pole in the rotor core cross section. The straight line 1172 is the straight line passing through the reference position 831*a* relative to the magnet hole 817*a* having the open end portion 1111*a* with the front-side open-end front-side corner portion 1131*a* set as one of corner portions, and the rotation axis line 0, in the rotor core cross section. In the following explanation, the angle θf is referred to as the outer-peripheral-side flux barrier movement angel θf on the front side as necessary.

Further, in the rotor core cross section, an angle θb formed by a straight line 1173 and the straight line 1174 is preferably set to not less than θa/24 nor more than θa/8, and more preferably set within a range of θa/12±θa/24. The straight line 1173 is a straight line passing through the rear-side open-end front-side corner portion 1131*c* and the rotation axis line 0 in the rotor core cross section. The rear-side open-end front-side corner portion 1131*c* is, of the open-end front-side corner portions 1131*a*, 1131*c*, the corner portion positioned on the rear side in the rotation direction further than the center in the circumferential direction in the same pole. The straight line 1174 is the straight line passing through the reference position 831*b* relative to the magnet hole 817*b* having the open end portion 1111*b* with the rear-side open-end front-side corner portion 1131*c* set as one of corner portions, and the rotation axis line 0, in the rotor core cross section. In the following explanation, the angle θb is referred to as the movement angle θb of the outer-peripheral-side flux barrier on the rear side as necessary.

Further, as explained in the section of ((Second finding)) in the section of (Circumstances), providing the recess portion 815*a* in the position facing the teeth 123*a*, 123*b* with a higher magnetic flux density than the lowest magnetic flux density in the region of the outer peripheral surface 818 of the rotor core 811 increases the torque of the rotor 810. To further enhance the effect of increasing the torque of the rotor 810, the entire region of the recess portion 815*a* preferably faces the teeth 123*a*, 123*b* with this magnetic flux density. However, a partial region of the recess portion 815_a_ may be face the teeth 123_a_, 123_b_ with this magnetic flux density. Further, from the viewpoint of certainly improving the torque of the rotor 810, the recess portion 815_a_ is preferably defined as follows.

As illustrated in FIG. 11A, in the rotor core cross section, the reference-position movement angle θa (rad) which is the angle around the rotation axis line 0 from the rear-side reference positions 831_b_ is set as $2\pi/N_{slot}$. The rear-side reference position 831_b_ is a position at an intersection point of the straight line 1174 passing through the rear-side permanent magnet end portion 841_b_ and the rotation axis line 0, and the outer peripheral surface 818 of the rotor core 811 in the rotor core cross section. The rear-side permanent magnet end portion 841_b_ is, of the end portions of the permanent magnets 812_a_ to 812_b_ installed in the same pole, the end portion positioned on the rearmost side in the circumferential direction. In the example illustrated in FIG. 8 as previously described, $N_{slot}$ as the number (piece) of slots in the stator core 121 is 24. Accordingly, the reference-position movement angle θa is 2π/24 (rad)=15(°).

First, in the rotor core cross section, an angle formed by a straight line 1175 and the straight line 1173 is preferably set as Ga. The straight line 1175 is a straight line passing through a recess rear-side corner portion 1161_a_ and the rotation axis line 0 in the rotor core cross section. The recess rear-side corner portion 1161_a_ is, of two corner portions 1161_a_ to 1161_b_ in an open end portion 1151_a_ of the recess portion 815_a_, a corner portion positioned on the rear side in the rotation direction, in the rotor core cross section. The straight line 1173 is the straight line passing through the rear-side open-end front-side corner portion 1131_c_ and the rotation axis line 0 in the rotor core cross section. The rear-side open-end front-side corner portion 1131_c_ is positioned on the rear side in the rotation direction further than the recess portion 815_a_ in the same pole as a pole in which the recess portion 815_a_ is installed.

Further, in the rotor core cross section, an angle θc formed by a straight line 1176 and the straight line 1175 is preferably set to not less than θa/8 nor more than 25θa/24θa, and more preferably set within a range of 3θa/4±θa/12. The straight line 1176 is a straight line passing through a recess front-side corner portion 1161_b_ and the rotation axis line 0 in the rotor core cross section. The recess front-side corner portion 1161_b_ is, of the two corner portions 1161_a_ to 1161_b_ in the open end portion 1151_a_ of the recess portion 815_a_, the corner portion on the front side in the rotation direction, in the rotor core cross section. The straight line 1175 is the straight line passing through the recess rear-side corner portion 1161_a_ and the rotation axis line 0 in the rotor core cross section. In the following explanation, the angle θc is referred to as the recess opening angle θc as necessary.

Further, a maximum value Cd of a depth of the recess portion 815_a_ is preferably set within a range of not less than 0.01 times nor more than 0.1 times a diameter of the rotor core 811, and preferably set within a range of not less than 0.04 times nor more than 0.07 times the diameter of the rotor core 811. In the following explanation, the maximum value Cd of the depth of the recess portion 815_a_ is referred to as the maximum recess-depth value Cd as necessary.

Further, a shape of the recess portion 815_a_ is not limited. FIG. 11A exemplifies a case where a planar shape (a shape of the rotor core cross section) of the recess portion 815_a_ is a quadrangle having a relationship of a line symmetry with a straight line passing through a position at the center of gravity of the recess portion 815_a_, and the rotation axis line 0 of the rotor core 811 set as a symmetry axis. However, the planar shape of the recess portion 815_a_ may be a shape having no symmetry. Further, the planar shape of the recess portion 815_a_ may be a triangle or a polygon having sides equal to or more than sides of a pentagon. Further, the corner portion of the recess portion 815_a_ may have curvature.

Next, the second end portions 1112_a_ to 1112_b_ will be explained. The second end portions 1112_a_ to 1112_b_ are end portions positioned on the inner peripheral side in the left-right direction Ds of the magnet holes 817_a_ to 817_b_. The second end portions 1112_a_ to 1112_b_ coincide with end portions of the inter-magnet flux barriers 814_a_ to 814_b_, and are closed. That is, the magnet holes 817_a_ to 817_b_ have such shapes as to form spaces serving as flux barriers extending along the rotation axis line 0 between the permanent magnet 812_a_ and the second end portion 1112_a_ and between the permanent magnet 812_b_ and the second end portion 1112_b_ with the permanent magnets 812_a_ to 812_b_ installed therethrough.

In the example illustrated in FIG. 11A, the second end portions 1112_a_ to 1112_b_ are regions along contours of the magnet holes 817_a_ to 817_b_ from one to the other of the two corner portions 1132_a_ to 1132_b_ and from one to the other of the two corner portions 1132_c_ to 1132_d_ of the magnet holes 817_a_ to 817_b_ through which the permanent magnets 812_a_ to 812_b_ are installed in the rotor core cross section. The corner portions 1132_a_ to 1132_b_ and the corner portions 1132_c_ to 1132_d_ forming the second end portions 1112_a_ to 1112_b_ are defined by the designer of the IPMSM 800 in such a manner that the magnet holes 817_a_ and 817_b_ face each other with the inter-magnet bridge portion 821 interposed therebetween. In the example illustrated in FIG. 11A, the second end portions 1112_a_ to 1112_b_ include positions at both ends of a straight line connecting the respective second end portions 1112_a_ to 1112_b_ of the two magnet holes 817_a_ to 817_b_ facing each other with the inter-magnet bridge portion 821 interposed therebetween at the shortest distance in the rotor core cross section.

In the example illustrated in FIG. 11A, a region of the soft magnetic material on which stress is most concentrated while the rotor 810 (the rotor core 811) is rotating is included between the second end portions 1112_a_ and 1112_b_. In the example illustrated in FIG. 11A, the previously-described straight line connecting the second end portions 1112_a_ to 1112_b_ at the shortest distance is a straight line 1141_a_ connecting the corner portions 1132_a_, 1132_c_. In the example illustrated in FIG. 11A, the inter-magnet bridge portion 821_a_ is defined as a region of the soft magnetic material surrounded by the straight line 1141_a_ connecting the two corner portions 1132_a_, 1132_c_ and a straight line 1141_b_ connecting the two corner portions 1132_b_, 1132_d_, for example.

Note that FIG. 11A exemplifies a case where the entire region between the two magnet holes 817_a_ and 817_b_ is the region of the soft magnetic material. Accordingly, the straight line 1141_a_ connecting the respective second end portions 1112_a_ to 1112_b_ of the two magnet holes 817_a_ to 817_b_ at the shortest distance is the same as a straight line drawn to make a length of an overlap of the respective second end portions 1112_a_ to 1112_b_ with the region of the soft magnetic material shortest. On the other hand, a case where a flux barrier is formed in the region between the two magnet holes 817_a_ and 817_b_ is not necessarily as described above. This is because the straight line connecting the respective second end portions 1112_a_ to 1112_b_ of the two magnet holes 817_a_ to 817_b_ at the shortest distance sometimes overlaps with the flux barrier. As previously described, the region of the soft magnetic material on which stress is most concentrated while the rotor 810 (the rotor core 811) is rotating is included between the second end portions 1112*a* and 1112*b*. Further, the second end portions include positions at both ends of the straight line drawn to make the length of the overlap of the respective second end portions 1112*a* to 1112*b* with the region of the soft magnetic material shortest. This manner allows, regardless of whether or not the flux barrier is present in the region between the respective second end portions 1112*a* and 1112*b*, the region of the soft magnetic material on which stress is most concentrated while the rotor 810 (the rotor core 811) is rotating to be included between the second end portions 1112*a* and 1112*b*.

FIG. 11B is a view illustrating a first modified example of the configuration of the rotor core 811 (rotor core cross section).

In the example illustrated in FIG. 11B, for example, a region of the soft magnetic material surrounded by a straight line 1141*c* connecting two corner portions 1132*e*, 1132*h* and a straight line 1141*d* connecting two corner portions 1132*g*, 1132*j* is defined as a region of an inter-magnet bridge portion 821*i*. In this case, second end portions 1112*c*, 1112*d* are the regions along contours of magnet holes 817*c* to 817*d* from one to the other of the two corner portions 1132*e* and 1132*g* and from one to the other of the two corner portions 1132*h* and 1132*j* of the magnet holes 817*c*, 817*d* through which the permanent magnets 812*a*, 812*b* are installed.

Further, in FIG. 11B, in a different manner from the above, for example, a region of the soft magnetic material surrounded by a straight line 1141*c* connecting the two corner portions 1132*e*, 1132*h* and a straight line 1141*e* connecting two corner portions 1132*f*, 1132*i* may be defined as a region serving as an inter-magnet bridge portion. In this case, the second end portions 1112*c*, 1112*d* are the regions along contours of magnet holes 817 from one to the other of the two corner portions 1132*e* and 1132*f* and from one to the other of the two corner portions 1132*h* and 1132*i* of the magnet holes 817*c*, 817*d* through which the permanent magnets 812*a* to 812*b* are installed. Further, the second end portions 1112 may be regions along contours of the magnet holes 817*c*, 817*d* from one to the other of the two corner portions 1132*f* and 1132*g* and from one to the other of the two corner portions 1132*i* to 1132*j* of the magnet holes 817*c*, 817*d* through which the permanent magnets 812*a*, 812*b* are installed.

Note that in the example illustrated in FIG. 11B, positions at both ends of a straight line drawn so that a length of an overlap with the soft magnetic material composing the soft magnetic material portion 820 has the shortest distance are positions of the corner portions 1132*f*, 1132*i*. Accordingly, the second end portions 1112*c* to 1112*d* include the positions of the corner portions 1132*f*, 1132*i*.

The examples illustrated in FIG. 11A and FIG. 11B exemplify a case where the two corner portions 1132 defining the second end portions 1112 each have no curvature in the rotor core cross section. FIG. 11C is a view illustrating a second modified example of the configuration of the rotor core 811 (rotor core cross section). FIG. 11C exemplifies, with respect to FIG. 11A, a case where the corner portions 1132*a* to 1132*d* of the second end portions 1112*a* to 1112*b* are changed to corner portions 1132*k* to 1132*n* each having curvature.

When the corner portions 1132*k* to 1132*n* each have curvature, positions of the corner portions 1132*k* to 1132*n* are each set as a position of a representative point in a region having the curvature. The representative point of the corner portion is selected so that the inter-magnet bridge portion has the largest size, for example. For this manner, in the example illustrated in FIG. 11*c*, positions of black circles (●) indicating the corner portions 1132*k* to 1132*n* are the positions of the representative points of the corner portions 1132*k* to 1132*n*. The positions of the representative points of the corner portions 1132*k* to 1132*n* defined in this manner are used as the positions of the corner portions 1132*k* to 1132*n*. Note that the representative point of the corner portion need not necessarily be selected so that the inter-magnet bridge portion has the largest size. For example, the center position of a region forming the corner portion may be selected as the representative point of the corner portion. In the example illustrated in FIG. 11C, the second end portions 1112*e*, 1112*f* are regions along contours of magnet holes 817*e*, 817*f* from one to the other of the two corner portions 1132*k* and 11321 and from one to the other of the two corner portions 1132*m* to 1132*n* of the magnet holes 817*e*, 817*f* through which the permanent magnets 812*a*, 812*b* are installed. Alternatively, the representative point of the corner portion may be selected so that the inter-magnet bridge portion has the smallest size.

Note that in the example illustrated in FIG. 11C, positions at both ends of a straight line drawn so that a length of an overlap with the soft magnetic material composing the soft magnetic material portion 820 has the shortest distance are positions at both ends of a straight line 1141*h*. Accordingly, the second end portions 1112*e* to 1112*f* include the positions at both ends of the straight line 1141*h*.

Further, when the corner portion of the first end portion 1111 has curvature, a representative point of a region having the curvature only needs to be set as a position of the corner portion of the first end portion 1111. The representative point of the corner portion of the first end portion 1111 is set at a position on the outer peripheral surface 818 of the rotor core 811 so that the first end portion 1111 has the largest size, for example. However, this need not necessarily be adopted. For example, the center position of the region having the curvature may be set as the representative point of the corner portion of the first end portion 1111.

Back to the explanation of FIG. 11A, the third end portions 1113*a* to 1113*b* will be explained. The third end portions 1113*a* to 1113*b* are end portions positioned on the outer peripheral side in the magnetization direction Dm of the permanent magnets 812*a* to 812*b*. The outer peripheral side in the magnetization direction Dm of the permanent magnets 812*a* to 812*b* is a side close to the outer peripheral surface 818 of the rotor core 811. In the example illustrated in FIG. 11A, the third end portions 1113*a*, 1113*b* are regions along contours of the magnet holes 817*a*, 817*b* from the corner portions 1131*b*, 1131*c* positioned on inner sides, of the two corner portions 1131*a* to 1131*b* and the two corner portions 1131*c* to 1131*d* defining the first end portions 1111*a*, 1111*b*, to the corner portions 1132*a*, 1132*c* positioned on the outer peripheral side in the magnetization direction Dm of the permanent magnets 812*a*, 812*b*, of the two corner portions 1132*a* to 1132*b* and the two corner portions 1132*c* to 1132*d* defining the second end portions 1112*a*, 1112*b*. The inner side is a side close to the central position in the circumferential direction of the region of one pole of the rotor. In the example illustrated in FIG. 11B, third end portions 1113*c*, 1113*d* are regions along contours of the magnet holes 817*c*, 817*d* from the corner portions 1131*b*, 1131*c* defining the first end portions 11111 to the corner portions 1132*e*, 1132*h* defining the second end portions 1112, for example. In the example illustrated in FIG. 11C, third end portions 1113*e*, 1113*f* are regions along contours of the magnet holes 817*e*, 817*f* from the corner portions 1131*b*, 1131*c* defining the first end portions 1111 to the corner portions 1132*k*, 1132*m* defining the second end portions 1112.

Back to the explanation of FIG. 11A, the fourth end portions 1114*a* to 1114*b* will be explained. The fourth end portions 1114*a* to 1114*b* are end portions positioned on the inner peripheral side in the magnetization direction Dm of the permanent magnets 812*a*, 812*b*. In the example illustrated in FIG. 11A, the fourth end portions 1114*a*, 1114*b* are regions along contours of the magnet holes 817*a*, 817*b* from the corner portions 1131*a*, 1131*d* positioned on outer sides, of the two corner portions 1131*a* to 1131*b* and the two corner portions 1131*c* to 1131*d* defining the first end portions 1111*a*, 1111*b*, to the corner portions 1132*b*, 1132*d* positioned on the inner peripheral side in the magnetization direction Dm of the permanent magnets 812*a*, 812*b*, of the two corner portions 1132*a* to 1132*b* and the two corner portions 1132*c* to 1132*d* defining the second end portions 1112*a*, 1112*b*. The outer side is a side close to an end in the circumferential direction of the region of one pole of the rotor. In the example illustrated in FIG. 11B, fourth end portions 1114*c*, 1114*d* are regions along contours of the magnet holes 817*c*, 817*d* from the corner portions 1131*a*, 1131*d* defining the first end portions 1111 to the corner portions 1132*g*, 1132*j* defining the second end portions 1112*c*, 1112*d*, for example. In the example illustrated in FIG. 11C, fourth end portions 1114*e*, 1114*f* are regions along contours of the magnet holes 817*e*, 817*f* from the corner portions 1131*a*, 1131*d* defining the first end portions 1111 to the corner portions 11321, 1132*n* defining the second end portions 1112.

In FIG. 11A to FIG. 11*c*, each two of the magnet holes 817*a* to 817*b*, 817*c* to 817*d*, 817*e* to 817*f* through which the permanent magnets 812*a* to 812*b* are installed have spaces 1121*a* to 1121*b* in which the permanent magnets 812*a* to 812*b* are installed. Further, the magnet holes 817*a* to 817*b*, 817*c* to 817*d*, 817*e* to 817*f* through each two of which the permanent magnets 812*a* to 812*b* are installed have spaces 1122*a* to 1122*b*, 1122*c* to 1122*d*, 1122*e* to 1122*f* serving as the inter-magnet flux barriers between the spaces 1121*a* and 1121*b* in which the permanent magnets 812*a* to 812*b* are installed, and each two of second end portions 1112*a* to 1112*b*, 1112*c* to 1112*d*, 1112*e* to 1112*f*. Further, each two of the magnet holes 817*a* to 817*b*, 817*c* to 817*d*, 817*e* to 817*f* through which the permanent magnets 812*a* to 812*b* are installed have spaces 1123*a* to 1123*b*, each serving as the outer-peripheral-side flux barriers 813*a* to 813*b* illustrated in FIG. 9 between the spaces 1121*a* and 1121*b* in which the permanent magnets are installed and the first end portions 1111*a* to 1111*b*.

In the following explanation, the spaces 1121*a* to 1121*b* in which the permanent magnets 812*a* to 812*b* are installed, the spaces 1122*a* to 1122*b*, 1122*c* to 1122*d*, 1122*e* to 1122*f* serving as the inter-magnet flux barriers, and the spaces 1123*a* to 1123*b* serving as the outer-peripheral-side flux barriers are respectively referred to as the magnet installation spaces 1121*a* to 1121*b*, the inter-magnet flux barrier spaces 1122*a* to 1122*b*, 1122*c* to 1122*d*, 1122*e* to 1122*f*, and the outer-peripheral-side flux barrier spaces 1123*a* to 1123*b* as necessary. The magnet installation spaces 1121*a* to 1121*b*, the inter-magnet flux barrier spaces 1122*a* to 1122*b*, 1122*c* to 1122*d*, 1122*e* to 1122*f*, and the outer-peripheral-side flux barrier spaces 1123*a* to 1123*b* will be explained.

In the front-side magnet hole 817*a*, the outer-peripheral-side flux barrier space 1123*a* is one example of the space serving as a front-side flux barrier. In the rear-side magnet hole 817*b*, the outer-peripheral-side flux barrier space 1123*b* is one example of the space serving as a rear-side flux barrier. Further, in the front-side magnet hole 817*a*, the inter-magnet flux barrier space 1122*a* is one example of the space serving as a rear-side flux barrier. In the rear-side magnet hole 817*b*, the inter-magnet flux barrier space 1122*b* is one example of the space serving as a front-side flux barrier. That is, in the front-side magnet hole 817*a* and the rear-side magnet hole 817*b*, the spaces serving as the front-side flux barriers (the outer-peripheral-side flux barrier space 1123*a*, the inter-magnet flux barrier space 1122*b*) are positioned on the front side in the rotation direction further than the spaces serving as the rear-side flux barriers (the inter-magnet flux barrier space 1122*a*, the outer-peripheral-side flux barrier space 1123*b*).

More specifically, the outer-peripheral-side flux barrier space 1123*a* included in the front-side magnet hole 817*a* is on the front side in the rotation direction further than the inter-magnet flux barrier space 1122*a* included in the front-side magnet hole 817*a*, and on the outer peripheral side of the rotor core 811 further than the inter-magnet flux barrier space 1122*a* included in the front-side magnet hole 817*a*. Further, the outer-peripheral-side flux barrier space 1123*b* included in the rear-side magnet hole 817*b* is on the rear side in the rotation direction further than the inter-magnet flux barrier space 1122*b* included in the rear-side magnet hole 817*b*, and on the outer peripheral side of the rotor core 811 further than the inter-magnet flux barrier space 1122*b* included in the rear-side magnet hole 817*b*. Further, the outer-peripheral-side flux barrier space 1123*a* included in the front-side magnet hole 817*a* and the outer-peripheral-side flux barrier space 1123*b* included in the rear-side magnet hole 817*b* have the first end portions 1111*a* to 1111*b* which are the open end portions. Both of the outer-peripheral-side flux barrier spaces 1123*a*, 1123*b* preferably have the open end portions (the first end portions 1111*a* to 1111*b*) in this manner. However, only one of the outer-peripheral-side flux barrier spaces 1123*a*, 1123*b* may have the open end portion (the first end portion 1111).

In the rotor core cross sections illustrated in FIG. 11A to FIG. 11C, the length L2, in a width direction which is a direction along the magnetization direction Dm of the permanent magnets 812*a* to 812*b*, of the magnet installation spaces 1121*a* to 1121*b*, is equal to a length corresponding to a length in the magnetization direction Dm of the permanent magnets 812*a* to 812*b* and almost fixed. The length L2 in the width direction of the magnet installation spaces 1121*a* to 1121*b* may be the same as the length in the magnetization direction Dm of the permanent magnets 812*a* to 812*b*, or may be (slightly) longer than the length in the magnetization direction Dm of the permanent magnets 812*a* to 812*b* for easy installation of the permanent magnets 812*a* to 812*b* through the magnet holes 817*a* to 817*b*. Note that this embodiment exemplifies a case where the length in the magnetization direction Dm of the permanent magnets 812*a* to 812*b* is fixed. However, the length in the magnetization direction Dm of the permanent magnets 812*a* to 812*b* need not necessarily be fixed. When the length in the magnetization direction Dm of the permanent magnets 812*a* to 812*b* is not fixed, the length in the width direction of the magnet installation spaces 1121*a* to 1121*b* may be equal to the length corresponding to the length in the magnetization direction Dm of the permanent magnets 812*a* to 812*b*. In this case, the length in the width direction of the magnet installation spaces 1121*a* to 1121*b* is not fixed.

When the permanent magnets 812*a* to 812*b* are installed, at least a part of the region of the magnet installation spaces 1121*a* to 1121*b* is occupied by the permanent magnets 812*a* to 812*b*, thereby serving as no space. The inter-magnet flux barrier spaces 1122*a* to 1122*b* correspond to the inter-magnet flux barriers 814*a* to 814*b* illustrated in FIG. 9, and remain spaces even though the permanent magnets 812*a* to 812*b* are installed. The outer-peripheral-side flux barrier spaces 1123*a* to 1123*b* correspond to the outer-peripheral-side flux barriers 813*a* to 813*b* illustrated in FIG. 9, and remain spaces even though the permanent magnets 812*a* to 812*b* are installed. Note that when a nonmagnetic material is installed in the inter-magnet flux barrier spaces 1122*a* to 1122*f* and the outer-peripheral-side flux barrier spaces 1123*a* to 1123*b*, at least a part of a region of the inter-magnet flux barrier spaces 1122*a* to 1122*f* and the outer-peripheral-side flux barrier spaces 1123*a* to 1123*b* is occupied by the nonmagnetic material.

Next, one example of a configuration of the soft magnetic material portion 820 will be explained while referring to FIG. 10 and FIG. 11A to FIG. 11C. Note that here, FIG. 11B exemplifies a case where the corner portions 1132*e*, 1132*g* are two corner portions of the second end portion 1112*c*, and the corner portions 1132*h*, 1132*j* are two corner portions of the second end portion 1112*d*.

In FIG. 10, the soft magnetic material portion 820 has the inter-magnet bridge portions 821*a* to 821*h*, the outer side portions 822*a* to 822*h*, and an inner side portion 823*a*.

The inter-magnet bridge portions 821*a* to 821*h* are each a region where the soft magnetic material is present in a bridge outer edge portion. In the example illustrated in FIG. 10 and FIG. 11A, the bridge outer edge portion is a region surrounded by the straight line connecting the corner portions 1132*a*, 1132*c* on the outer peripheral side of the second end portions 1112*a* to 1112*b* of the two magnet holes 817*a* to 817*b* through which the permanent magnets 812*a* to 812*b* are installed in the same pole (refer to a two-dot chain line connecting the ends on the outer peripheral side of the second end portions 1112*a* to 1112*b* in FIG. 10), the straight line connecting the corner portions 1132*b*, 1132*d* on the inner peripheral side of the second end portions 1112*a* to 1112*b* of the two magnet holes 817*a* to 817*b* (refer to a two-dot chain line connecting the ends on the inner peripheral side of the second end portions 1112*a* to 1112*b* in FIG. 10), and the second end portions 1112*a* to 1112*b* of the two magnet holes 817*a* to 817*b*. In FIG. 10, this embodiment exemplifies a case where only the soft magnetic material is present in the bridge outer edge portion 831*a*. The presence of only the soft magnetic material means that a region except for the soft magnetic material, such as the flux barrier, is not included. Accordingly, in this embodiment, the inter-magnet bridge portion 821*a* coincides with the bridge outer edge portion 831*a*. Note that in FIG. 10 and FIG. 11A, the bridge outer edge portion 831*a* corresponds to the region between the second end portions 1112*a* and 1112*b* of the two magnet holes 817*a* to 817*b* through which the permanent magnets 812*a* to 812*b* are installed in the same pole. Further, the region between the second end portions 1112*a* and 1112*b* of the two magnet holes 817*a* to 817*b* through which the permanent magnets 812*a* to 812*b* are installed in the same pole may include the region except for the soft magnetic material, such as the flux barrier. In this case, the inter-magnet bridge portion 821*a* is a region eliminating the region except for the soft magnetic material from the bridge outer edge portion 831*a*. Further, the number of the inter-magnet bridge portions 821*a* to 821*h* is equal to the number of poles of the rotor 810 (eight in this embodiment).

Specifically in the example illustrated in FIG. 11A, the bridge outer edge portion 831*a* is a region surrounded by the straight line 1141*a* connecting the corner portions 1132*a*, 1132*c* on the outer peripheral side of the second end portions 1112*a* to 1112*b* of the magnet holes 817*a* to 817*b*, the straight line 1141*b* connecting the corner portions 1132*b*, 1132*d* on the inner peripheral side of the second end portions 1112*a* to 1112*b* of the two magnet holes 817*a* to 817*b*, and the second end portions 1112*a* to 1112*b* of the two magnet holes 817*a* to 817*b*. The inter-magnet bridge portion 821*a* coincides with the bridge outer edge portion 831*a*. FIG. 10 and FIG. 11A illustrate the reference signs 821*a* and 831*a* side by side, which means this.

Further, in the examples illustrated in FIG. 11B and FIG. 11C, the bridge outer edge portions are defined as follows.

In the example illustrated in FIG. 11B, the bridge outer edge portion 831*b* is a region surrounded by the straight line 1141*c* connecting the corner portions 1132*e*, 1132*h* on the outer peripheral side of the second end portions 1112*c* to 1112*d* of the magnet holes 817*a* to 817*b*, the straight line 1141*d* connecting the corner portions 1132*g*, 1132*j* on the inner peripheral side of the second end portions 1112*c* to 1112*d* of the two magnet holes 817*a* to 817*b*, and the second end portions 1112*c* to 1112*d* of the two magnet holes 817*a* to 817*b*. The inter-magnet bridge portion 821*i* coincides with the bridge outer edge portion 831*b*. FIG. 11B illustrates the reference signs 821*i* and 831*b* side by side, which means this.

In the example illustrated in FIG. 11C, the bridge outer edge portion 831*c* is a region surrounded by the straight line 1141*f* connecting the corner portions 1132*k*, 1132*m* on the outer peripheral side of the second end portions 1112*e* to 1112*f* of the magnet holes 817*a* to 817*b*, the straight line 1141*g* connecting the corner portions 11321, 1132*n* on the inner peripheral side of the second end portions 1112*e* to 1112*f* of the two magnet holes 817*a* to 817*b*, and the second end portions 1112*e* to 1112*f* of the two magnet holes 817*a* to 817*b*. The inter-magnet bridge portion 821*j* coincides with the bridge outer edge portion 831*c*. FIG. 11C illustrates the reference signs 821*j* and 831*c* side by side, which means this.

The outer side portion 822*a* is a region where the soft magnetic material is present in an outer-side outer edge portion. The outer-side outer edge portion is a region coupled to the inter-magnet bridge portion 821*a* on the outer peripheral side of the inter-magnet bridge portion 821*a*. In the examples illustrated in FIG. 10 and FIG. 11A, the outer-side outer edge portion is a region surrounded by the third end portions 1113*a* to 1113*b* of the two magnet holes 817*a* to 817*b* through which the permanent magnets 812*a* to 812*b* are installed and the outer peripheral surface 818 of the rotor core 811. In FIG. 10, this embodiment exemplifies a case where only the soft magnetic material is present in the outer-side outer edge portion 832*a* (the region except for the soft magnetic material, such as the flux barrier, is not included). Accordingly, the outer side portion 822*a* coincides with the outer-side outer edge portion 832*a*. However, the outer-side outer edge portion 832*a* may include the region except for the soft magnetic material, such as the flux barrier. In this case, the outer side portion 822*a* is a region eliminating the region except for the soft magnetic material from the outer-side outer edge portion 832*a*. Further, the number of the outer side portions 822*a* to 822*h* is equal to the number of poles of the rotor 810 (eight in this embodiment).

Specifically in the example illustrated in FIG. 11A, the outer-side outer edge portion 832*a* is a region surrounded by the straight line 1141*a* connecting the corner portions 1132*a*, 1132*c* on the outer peripheral side of the second end portions 1112*a* to 1112*b* of the magnet holes 817*a* to 817*b*, the third end portions 1113*a* to 1113*b* of the two magnet holes 817*a* to 817*b*, and the outer peripheral surface 818 of the rotor core 811. The outer side portion 822*a* coincides with the outer-side outer edge portion 832*a*. FIG. 10 and FIG. 11A illustrate the reference signs 822*a* and 832*a* side by side, which means this.

Further, in the examples illustrated in FIG. 11B and FIG. 11C, the outer-side outer edge portions are defined as follows.

In the example illustrated in FIG. 11B, the outer-side outer edge portion 832*b* is a region surrounded by the straight line 1141*c* connecting the corner portions 1132*e*, 1132*h* on the outer peripheral side of the second end portions 1112*c* to 1112*d* of the magnet holes 817*c* to 817*d*, the third end portions 1113*c* to 1113*d* of the two magnet holes 817*c* to 817*d*, and the outer peripheral surface 818 of the rotor core 811. The outer side portion 822*i* coincides with the outer-side outer edge portion 832*b*. FIG. 11B illustrates the reference signs 822*i* and 832*b* side by side, which means this.

In the example illustrated in FIG. 11C, the outer-side outer edge portion 832*c* is a region surrounded by the straight line 1141*f* connecting the corner portions 1132*k*, 1132*m* on the outer peripheral side of the second end portions 1112*e* to 1112*f* of the magnet holes 817*e* to 817*f*, the third end portions 1113*e* to 1113*f* of the two magnet holes 817*e* to 817*f*, and the outer peripheral surface 818 of the rotor core 811. The outer side portion 822*j* coincides with the outer-side outer edge portion 832*c*. FIG. 11C illustrates the reference signs 822*j* and 832*c* side by side, which means this.

The inner side portion 823*a* is a region where the soft magnetic material is present in an inner-side outer edge portion. The inner-side outer edge portion is a region of the soft magnetic material coupled to the inter-magnet bridge portion 821*a* on the inner peripheral side of the inter-magnet bridge portion 821*a*. In the examples illustrated in FIG. 10 and FIG. 11A, the inner-side outer edge portion is a region surrounded by the fourth end portions 1114*a* to 1114*b* of the two magnet holes 817*a* to 817*b* through which the permanent magnets 812*a* to 812*b* are installed, the outer peripheral surface 818 of the rotor core 811, and the inner peripheral surface 819 of the rotor core 811. In FIG. 10, this embodiment exemplifies a case where only the soft magnetic material is present in the inner-side outer edge portion 833*a*. The presence of only the soft magnetic material means that the region except for the soft magnetic material, such as the flux barrier, is not included. Accordingly, the inner side portion 823*a* coincides with the inner-side outer edge portion 833*a*. However, the inner-side outer edge portion 833*a* may include the region except for the soft magnetic material, such as the flux barrier. In this case, the inner side portion 823*a* is a region eliminating the region except for the soft magnetic material from the inner-side outer edge portion 833*a*. Further, in the example illustrated in FIG. 10, the inner side portion 823*a* is one in number. Note that the inner side portion 823*a* need not necessarily be surrounded by the outer peripheral surface 818 of the rotor core 811. For example, when the rotor core 811 is formed in such a manner that the soft magnetic material is absent between the outer-peripheral-side flux barriers 813*a* to 813*b* (outer-peripheral-side flux barrier spaces 1123*a* to 1123*b*) of the poles adjacent to each other, the inner side portion 823*a* is not surrounded by the outer peripheral surface 818 of the rotor core 811.

Specifically in the example illustrated in FIG. 11A, the inner-side outer edge portion 833*a* is a region surrounded by the straight line 1141*b* connecting the corner portions 1132*b*, 1132*d* on the inner peripheral side of the second end portions 1112*a* to 1112*b* of the two magnet holes 817*a* to 817*b* through which the permanent magnets 812*a* to 812*b* are installed, the fourth end portions 1114*a* to 1114*b* of the two magnet holes 817*a* to 817*b*, the outer peripheral surface 818 of the rotor core 811, and the inner peripheral surface 819 of the rotor core 811. The inner side portion 823*a* coincides with the inner-side outer edge portion 833*a*. FIGS. 10 and 11A illustrate the reference signs 823*a* and 833*a* side by side, which means this.

Further, in the examples illustrated in FIG. 11B and FIG. 11C, the inner-side outer edge portions are defined as follows.

In the example illustrated in FIG. 11B, an inner-side outer edge portion 833*b* is a region surrounded by the straight line 1141*d* connecting the corner portions 1132*g*, 1132*j* on the inner peripheral side of the second end portions 1112*c* to 1112*d* of the two magnet holes 817*c* to 817*d* through which the permanent magnets 812*a* to 812*b* are installed, the fourth end portions 1114*c* to 1114*d* of the two magnet holes 817*c* to 817*d*, the outer peripheral surface 818 of the rotor core 811, and the inner peripheral surface 819 of the rotor core 811. An inner side portion 823*b* coincides with the inner-side outer edge portion 833*b*. FIG. 11B illustrates the reference signs 823*b* and 833*b* side by side, which means this.

In the example illustrated in FIG. 11C, an inner-side outer edge portion 833*c* is a region surrounded by the straight line 1141*g* connecting the corner portions 11321, 1132*n* on the inner peripheral side of the second end portions 1112*e* to 1112*f* of the two magnet holes 817*e* to 817*f* through which the permanent magnets 812*a* to 812*b* are installed, the fourth end portions 1114*e* to 1114*f* of the two magnet holes 817*e* to 817*f*, the outer peripheral surface 818 of the rotor core 811, and the inner peripheral surface 819 of the rotor core 811. An inner side portion 823*c* coincides with the inner-side outer edge portion 833*c*. FIG. 11C illustrates the reference signs 823*c* and 833*c* side by side, which means this.

Next, widths w of the inter-magnet bridge portions 821 will be explained. The widths w of the inter-magnet bridge portions 821 are indicated by lengths, of portions overlapping with the soft magnetic material, of bridge-width specified lines 1142*a* to 1142*c* in the rotor core cross section. As illustrated in FIG. 11A to FIG. 11C, the bridge-width specified lines 1142*a* to 1142*c* are each a straight line connecting each two of the second end portions 1112*a* to 1112*b*, 1112*c* to 1112*d*, 1112*e* to 1112*f* of the magnet holes 817*a* to 8176, 817*c* to 817*d*, 817*e* to 817*f*, through each two of which the permanent magnets 812*a* to 812*b* are installed, in such a manner as to make the length of the overlap with the soft magnetic material shortest.

Specifically in the example illustrated in FIG. 11A, the straight line connecting the second end portions 1112*a* to 1112*b* of the two magnet holes 817*a* to 817*b* through which the permanent magnets 812*a* to 812*b* are installed in such a manner as to make the length of the overlap with the soft magnetic material shortest is the straight line 1142*a*, and coincides with the previously-described straight line 1141*a*. FIG. 11A illustrates the reference signs 1141*a* and 1142*a* side by side, which means this. In this case, the width w of the inter-magnet bridge portion 821*a* is the length, of the portion overlapping with the soft magnetic material, of the bridge-width specified line 1142*a*, in the rotor core cross section. In the example illustrated in FIG. 11A, the entire bridge-width specified line 1142*a* overlaps with the soft magnetic substance material. Accordingly, the width w of the inter-magnet bridge portion 821*a* is equal to the length of the bridge-width specified line 1142*a*. A hole is formed through the inter-magnet bridge portion, and thus when a part of the bridge-width specified line overlaps with the soft magnetic material, the width w of the inter-magnet bridge portion is a length, of the portion overlapping with the soft magnetic material, of the bridge-width specified line. Note that the length, of the portion overlapping with the soft magnetic material, of the bridge-width specified line is a length obtained by subtracting a length, of the portion not overlapping with the soft magnetic material, of the bridge-width specified line from the length of the bridge-width specified line.

In the example illustrated in FIG. 11B, the straight line connecting the second end portions 1112*c* to 1112*d* of the two magnet holes 817*c* to 817*d* through which the permanent magnets 812*a* to 812*b* are installed in such a manner as to make the length of the overlap with the soft magnetic material shortest is the straight line 1142*b*, and coincides with the previously-described straight line 1141*e*. FIG. 11B illustrates the reference signs 1141*e* and 1142*b* side by side, which means this. Accordingly, the bridge-width specified line is the straight line 1142*b*. In this case, the width w of the inter-magnet bridge portion 821*i* is the length, of the portion overlapping with the soft magnetic material, of the bridge-width specified line 1142*b* in the rotor core cross section. Also in the example illustrated in FIG. 11B, the entire bridge-width specified line 1142*b* overlaps with the soft magnetic substance material. Accordingly, the width w of the inter-magnet bridge portion 821*i* is equal to the length of the bridge-width specified line 1142*b*.

In the example illustrated in FIG. 11C, the straight line connecting the second end portions 1112*e* to 1112*f* of the two magnet holes 817*e* to 817*f* through which the permanent magnets 812*a* to 812*b* are installed in such a manner as to make the length of the overlap with the soft magnetic material shortest is the straight line 1142*c*, and coincides with the previously-described straight line 1141*f*. FIG. 11C illustrates the reference signs 1141*f* and 1142*c* side by side, which means this. Accordingly, the bridge-width specified line is the straight line 1142*c*. In this case, the width w of the inter-magnet bridge portion 821*j* is the length, of the portion overlapping with the soft magnetic material, of the bridge-width specified line 1142*c*, in the rotor core cross section. Also in the example illustrated in FIG. 11C, the entire bridge-width specified line 1142*c* overlaps with the soft magnetic substance material. Accordingly, the width w of the inter-magnet bridge portion 821*j* is equal to the length of the bridge-width specified line 1142*c*.

The widths w of the inter-magnet bridge portions 821 defined in such a manner as described above are each preferably 0.02 times or less the diameter of the rotor core 811. When the widths w of the inter-magnet bridge portions 821 each exceed 0.02 times the diameter of the rotor core 811, an increase in a magnetic flux passing through the inter-magnet bridge portions 821 increases a reflux magnetic flux included in the magnetic flux passing through the inter-magnet bridge portions 821. Consequently, the effect of the increase in torque of the rotor 810 caused by the magnetic fluxes becoming no reflux magnetic flux (refer to the magnetic fluxes ϕ13, ϕ14 illustrated in FIG. 5B) decreases.

Further, the widths w of the inter-magnet bridge portions 821 each preferably exceed a length $w_{min}$ defined by the following formula (1).

$$w_{min} = \rho \times S \times r_g \times \omega \div Ys \quad (1)$$

Here, ρ is a density (kg/m$^3$) of the soft magnetic material composing the soft magnetic material portion 820. ρ is defined in advance by specifications of the IPMSM 800, for example. Ys is a yield stress (Pa) at room temperature of the soft magnetic material composing the soft magnetic material portion 820.

The yield stress (Ys) is defined in advance by specifications of the soft magnetic material, for example. The yield stress (Ys) may be a measured value. When the measured value is used as the yield stress (Ys), the value may be measured as follows, for example. First, a JIS No. 5 test piece is picked as a tensile test piece from a central portion in a sheet thickness direction of the soft magnetic material. Then, the yield stress (Ys) is measured by performing a tensile test on the tensile test piece based on the description of JIS-Z-2241:2011. At this time, a rolling direction of the tensile test piece is set as a tensile direction. In detail, when an upper yield point and a lower yield point described in JIS-Z-2241:2011 are measured by the tensile test, the yield stress (Ys) may be set as the upper yield point. On the other hand, in a case of a material in which a yield phenomenon does not clearly occur by the tensile test, the yield stress (Ys) may be set as the 0.2% proof stress measured by the offset method described in JIS-Z-2241:2011.

S is an area (m$^2$) in the rotor core cross section of each of external force influence portions 824 to be described later (refer to 824*a* to 824*c* illustrated in FIG. 11A to FIG. 11C). $r_g$ is a distance (m) in the radial direction from the center of rotation (the rotation axis line 0) of the rotor 810 (the rotor core 811) to a position of a center of gravity G in the rotor core cross section of each of the external force influence portions 824 (refer to a straight line 1178 connecting the center of gravity G in the rotor core cross section of each of the external force influence portions 824 and the rotation axis line 0 in FIG. 11A to FIG. 11C). The position of the center of gravity G is defined based on a definition of the center of gravity as a point at which a resultant force of gravity acting on portions of the external force influence portion 824 is exerted. Incidentally, for the convenience of explanation and notation, FIG. 11A to FIG. 11C illustrate the general positions of the center of gravity G of the external force influence portions 824*a* to 824*c*. ω is an angular speed (rad/sec) of the rotor 810 at the time of rotation at a maximum rotation speed. The maximum rotation speed of the rotor 810 is an upper limit value of a rotation speed of the rotor 810 allowable in the IPMSM 800, and is defined in advance by the specifications of the IPMSM 800.

When the widths w of the inter-magnet bridge portions 821 are too large, the torque decreases, and thus the widths w are each preferably set to 3.0 times or less the length $w_{min}$ defined by the formula (1).

Here, the external force influence portion 824 is a region of the soft magnetic material surrounded by the third end portions 1113 of the two magnet holes 817*a* to 817*b* through which the permanent magnets 812*a* to 812*b* are installed in the same pole, the outer peripheral surface 818 of the rotor core 811 (the soft magnetic material portion 820), and the bridge-width specified line 1142.

In the example illustrated in FIG. 11A, the external force influence portion 824*a* is the region of the soft magnetic material surrounded by the third end portions 1113*a* to 1113*b* of the two magnet holes 817*a* to 817*b* through which the permanent magnets 812*a* to 812*b* are installed, the outer peripheral surface 818 of the rotor core 811, and the bridge-width specified line 1142*a*.

In the example illustrated in FIG. 11B, the external force influence portion 824*b* is a region of the soft magnetic material surrounded by the third end portions 1113*c* to 1113*d* of the two magnet holes 817*c* to 817*d* through which the permanent magnets 812*a* to 812*b* are installed, the outer peripheral surface 818 of the rotor core 811, and the bridge-width specified line 1142*b*.

In the example illustrated in FIG. 11C, the external force influence portion 824*c* is a region of the soft magnetic material surrounded by the third end portions 1113*e* to 1113*f* of the two magnet holes 817*e* to 817*f* through which the permanent magnets 812*a* to 812*b* are installed, the outer peripheral surface 818 of the rotor core 811, and the bridge-width specified line 1142*c*.

Note that the number of the external force influence portions 824 included in the one rotor 810 is equal to the number of poles of the rotor 810 (eight in this embodiment). S in the formula (1) is not the total value of the areas in the rotor core cross section of the eight external force influence portions 824, but the area in the rotor core cross section of the one external force influence portion 824.

In the rotor core 811, the regions each of on which stress is most concentrated while the rotor 810 (the rotor core 811) is rotating are regions of the soft magnetic material in the positions overlapping with the bridge-width specified lines 1142*a* to 1142*c*. In the following explanation, the regions are each referred to as a stress concentration region as necessary. When the widths w of the inter-magnet bridge portions 821 are each equal to $w_{min}$ in the formula (1), the stress produced in the stress concentration regions while the rotor 810 (the rotor core 811) is rotating at the maximum rotation speed are each (theoretically) equal to the yield stress of the soft magnetic material. Consequently, to suppress a fracture of the stress concentration regions while the rotor 810 (the rotor core 811) is rotating at the maximum rotation speed, the widths w of the inter-magnet bridge portions 821 each preferably exceed $w_{min}$ in the formula (1).

Calculation Example

Next, a calculation example will be explained. In this calculation example, a calculation was made by performing the electromagnetic field analysis based on a finite element method on a magnetic flux density vector, an eddy current vector, and torque in a minute region (mesh) of each of rotor cores when the IPMSM in which the two permanent magnets were disposed in a V-shape per one pole as illustrated in FIG. 8 was operated (rotated) in accordance with electromagnetic field analysis conditions including excitation conditions. Note that the torque was set to be Maxwell stress. Further, a stress vector in the minute region (mesh) of each of the rotor cores when the IPMSM was operated (rotated) in accordance with stress analysis conditions including physical property values of a Young's modulus, a Poisson's ratio, and the like was calculated by performing stress analysis based on the finite element method. The methods of the electromagnetic field analysis and the stress analysis based on the finite element method are general methods, and thus the detailed explanation thereof is omitted here. Note that in each calculation example, conditions except for the flux barrier and the recess portion of the rotor core are the same conditions including the electromagnetic field analysis conditions. In this calculation example, as the electromagnetic field analysis conditions, a residual magnetic flux density of the permanent magnet was set to 0.4 T. Further, an exciting current flowing through the stator coil was set as a three-phase alternating current whose peak value is 20 A and frequency is 50 Hz. Further, a lead angle was set to 30 In addition, any of diameters of the rotor cores is 27 mm. Further, the number of slots of the stator core are 24.

First, as explained in the section of ((First finding)) in the section of (Circumstances), Table 1 presents the result of examining the effect of setting positions of the open-end front-side corner portions 1131*a*, 1131*c* on the rear side in the rotation direction of the rotor core 111 further than the reference positions 831*a*, 831*b* in the rotor core cross section.

TABLE 1

| NUMBER | θf | θb | RECESS PORTION | INCREASE AND DECREASE IN TORQUE | REMARKS |
|---|---|---|---|---|---|
| 1 | REFERENCE POSITION | REFERENCE POSITION | ABSENCE | +0% | — |
| 2 | 0.625° | REFERENCE POSITION | ABSENCE | +3.6% | INVENTION EXAMPLE |
| 3 | 1.25° | REFERENCE POSITION | ABSENCE | +5.6% | INVENTION EXAMPLE |
| 4 | 1.875° | REFERENCE POSITION | ABSENCE | +8.3% | INVENTION EXAMPLE |
| 5 | 2.5° | REFERENCE POSITION | ABSENCE | +9.4% | INVENTION EXAMPLE |
| 6 | 3.125° | REFERENCE POSITION | ABSENCE | +10.4% | INVENTION EXAMPLE |
| 7 | 3.75° | REFERENCE POSITION | ABSENCE | +12.7% | INVENTION EXAMPLE |
| 8 | 4.325° | REFERENCE POSITION | ABSENCE | +13.6% | INVENTION EXAMPLE |
| 9 | 5.0° | REFERENCE POSITION | ABSENCE | +13.7% | INVENTION EXAMPLE |
| 10 | 5.625° | REFERENCE POSITION | ABSENCE | +13.2% | INVENTION EXAMPLE |
| 11 | 6.25° | REFERENCE POSITION | ABSENCE | +12.8% | INVENTION EXAMPLE |
| 12 | 6.875° | REFERENCE POSITION | ABSENCE | +11.4% | INVENTION EXAMPLE |
| 13 | 7.5° | REFERENCE POSITION | ABSENCE | +9.8% | INVENTION EXAMPLE |
| 14 | 8.125° | REFERENCE POSITION | ABSENCE | +8.3% | INVENTION EXAMPLE |

TABLE 1-continued

| NUMBER | θf | θb | RECESS PORTION | INCREASE AND DECREASE IN TORQUE | REMARKS |
|---|---|---|---|---|---|
| 15 | 8.75° | REFERENCE POSITION | ABSENCE | +6.2% | INVENTION EXAMPLE |
| 16 | 9.375° | REFERENCE POSITION | ABSENCE | +2. 0% | INVENTION EXAMPLE |
| 17 | 10° | REFERENCE POSITION | ABSENCE | −3.4% | COMPARATIVE EXAMPLE |
| 18 | REFERENCE POSITION | 0.625° | ABSENCE | +1.3% | INVENTION EXAMPLE |
| 19 | REFERENCE POSITION | 1.25° | ABSENCE | +5.6% | INVENTION EXAMPLE |
| 20 | REFERENCE POSITION | 1.875° | ABSENCE | +1.5% | INVENTION EXAMPLE |
| 21 | REFERENCE POSITION | 2.5° | ABSENCE | +0.3% | COMPARATIVE EXAMPLE |
| 22 | REFERENCE POSITION | 3.125° | ABSENCE | −0.6% | COMPARATIVE EXAMPLE |
| 23 | 5.0° | 1.25° | ABSENCE | +15.4% | INVENTION EXAMPLE |
| 24 | 5.0° | 1.25° | PRESENCE | +16.5% | INVENTION EXAMPLE |

Table 1 presents, in a section of θf, the movement angle θf (°) of the outer-peripheral-side flux barrier on the front side illustrated in FIG. 11A. Further, Table 1 presents, in a section of Ob, the movement angle θb (°) of the outer-peripheral-side flux barrier on the rear side illustrated in FIG. 11A. Further, in Table 1, the reference position indicates that the movement angle θf of the outer-peripheral-side flux barrier on the front side and the movement angle θb of the outer-peripheral-side flux barrier on the rear side are each 0°. Further, Table 1 presents the presence/absence of the recess portion in a section of the recess portion.

As defined in this embodiment, the movement angle θf of the outer-peripheral-side flux barrier on the front side and the movement angle θb of the outer-peripheral-side flux barrier on the rear side are each an angle formed by the two straight lines (for example, the straight lines 1171, 1172), and thus take on values of 0 or more. Note that for example, the polar coordinate system is defined in such a manner that the positive direction of the argument θ is the same direction as the rotation direction of the rotor, and the movement angle θf of the outer-peripheral-side flux barrier on the front side and the movement angle θb of the outer-peripheral-side flux barrier on the rear side are indicated in the polar coordinate system. In this case, the movement angles θf, Ob are each a negative value, which indicates positioning on the negative direction side relative to the reference position (the rear side in the rotation direction). A case of the recess opening angle θc is also the same as the above.

A section of increase and decrease in torque presents values each expressing, as a percentage, an increase and an decrease relative to the torque of the rotor when the movement angle θf of the outer-peripheral-side flux barrier on the front side and the movement angle Gb of the outer-peripheral-side flux barrier on the rear side are each 0°. Accordingly, a larger value in the section of the increase and decrease in torque indicates a larger torque of the rotor than the torque of the rotor when the movement angle θf of the outer-peripheral-side flux barrier on the front side and the movement angle θb of the outer-peripheral-side flux barrier on the rear side are each 0°.

Figure 12A:
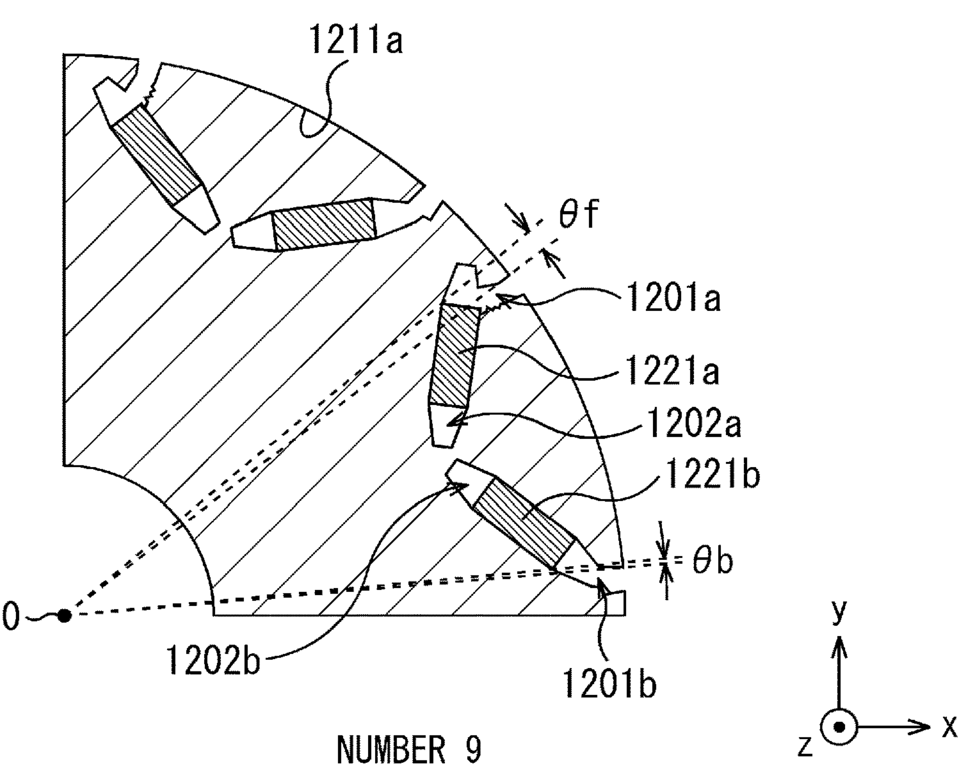
FIG. 12A is a view illustrating a first example of a configuration of a rotor targeted for being analyzed.
Figure 12B:
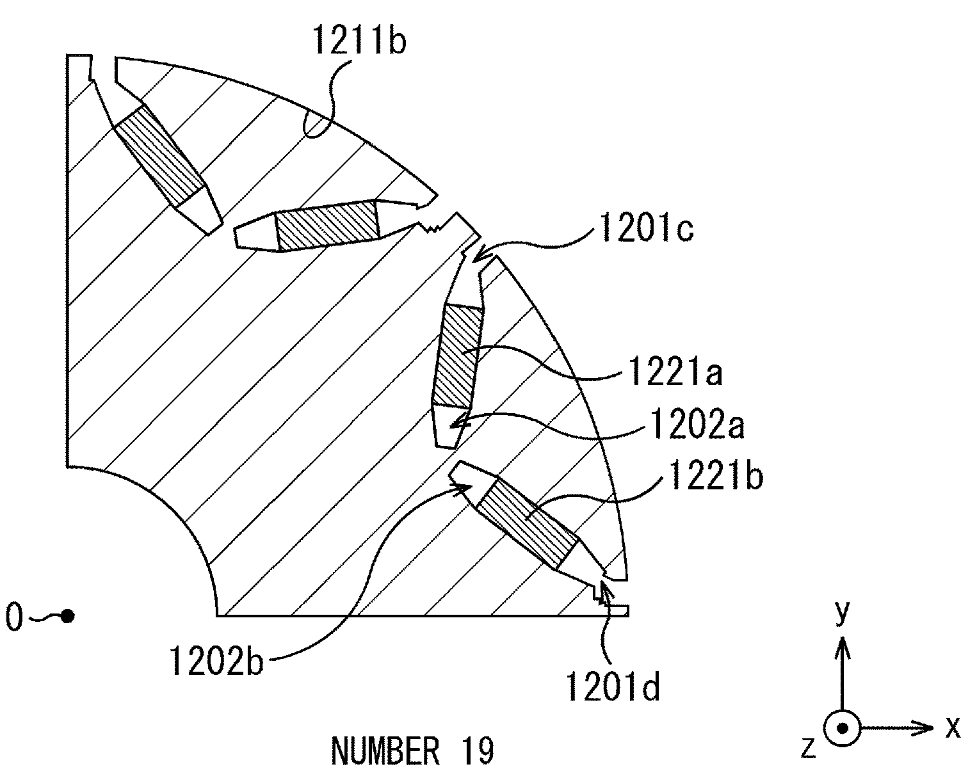
FIG. 12B is a view illustrating a second example of a configuration of a rotor targeted for being analyzed.

FIG. 12A, FIG. 12B are views illustrating configurations of rotors (rotor cross sections) targeted for being analyzed in the numbers 9, 19 in Table 1, respectively. FIG. 12C, FIG. 12D are views illustrating configurations of rotors (rotor cross sections) targeted for being analyzed in the numbers 23, 24 in Table 1, respectively. FIG. 12A to FIG. 12D also each illustrate one region of four regions obtained by dividing the cross section cut perpendicularly to the rotation axis line 0 of the IPMSM into quarters (a region forming two poles of the rotor in the region of the IPMSM) similarly to FIG. 1. Note that the electromagnetic field analysis of only this one region results in the electromagnetic field analysis of the entire rotor cross section by using the rotational symmetry of the IPMSM. Further, as previously described, also in FIG. 12A to FIG. 12D, similarly to FIG. 1 or the like, reference signs are given to only a section forming one pole of the rotor, and reference signs in a section forming the other poles of the rotor are omitted.

In FIG. 12A to FIG. 12D, as explained in this embodiment, the outer-peripheral-side flux barriers 1201*a* to 1201*e* reach the outer peripheral surfaces 1211*a* to 1211*d* of the rotor cores to be open in the rotor core cross sections. Further, inter-magnet flux barriers 1202*a* to 1202*b* are not coupled, and the soft magnetic material (inter-magnet bridge portion) is present between the inter-magnet flux barriers 1202*a* and 1202*b*.

In this calculation example as previously described, the number of slots $N_{slot}$ in the stator core is 24. Accordingly, the reference-position movement angle θa is π/12 rad=15° (θa (rad)=$2\pi/N_{slot}$). As explained in this embodiment, the movement angle θf of the outer-peripheral-side flux barrier on the front side is preferably set to not less than θa/24 nor more than 15θa/24, and more preferably set within the range of θa/3±θa/24. In this calculation example, the movement angle θf of the outer-peripheral-side flux barrier on the front side is preferably set to not less than 0.625° nor more than 9.375°, and more preferably set within a range of 5±0.625°.

In Table 1, the numbers 2 to 16 in each of which the movement angle θf of the outer-peripheral-side flux barrier on the front side is not less than 0.625° nor more than 9.375° demonstrate that indicating positive values as the increase and decrease in torque allows the improvement in the torque of the rotors. Further, the numbers 8 to 10 in each of which the movement angle θf of the outer-peripheral-side flux barrier on the front side is within the range of 5±0.625° demonstrate that the torque of the rotors can be further improved. In particular, the number 9 in which the movement angle θf of the outer-peripheral-side flux barrier on the front side is 5° of the center value within the range of 5±0.625° indicates the maximum value as the value of the increase and decrease in torque. On the other hand, the number 17 in which the movement angle θf of the outer-peripheral-side flux barrier on the front side exceeds 9.3750 demonstrates that indicating a negative value as the increase and decrease in torque fails to improve the torque of the rotor.

Further, the movement angle θb of the outer-peripheral-side flux barrier on the rear side is preferably set to not less than θa/24 nor more than θa/8, and preferably set within the range of θa/12±θa/24. In this calculation example, the movement angle θb of the outer-peripheral-side flux barrier on the rear side is preferably set to not less than 0.625° nor more than 1.875°, and preferably set within a range of 1.25±0.625°.

In Table 1, the numbers 18 to 21 in each of which the movement angle θb of the outer-peripheral-side flux barrier on the rear side is not less than 0.625° nor more than 1.875° demonstrate that indicating positive values as the increase and decrease in torque allows the improvement in the torque of the rotors. Further, the numbers 18 to 20 in each of which the movement angle θb of the outer-peripheral-side flux barrier on the rear side is within the range of 1.25±0.625° demonstrate that the torque of the rotors can be further improved. In particular, the number 19 in which the movement angle θb of the outer-peripheral-side flux barrier on the rear side is 1.25° of the center value within the range of 1.25±0.625° indicates the maximum value as the value of the increase and decrease in torque. On the other hand, the numbers 21, 22 in each of which the movement angle θb of the outer-peripheral-side flux barrier on the rear side exceeds 1.8750 demonstrate that indicating approximately 0 or a negative value as the increase and decrease in torque fails to improve the torque of the rotors.

The above results of the numbers 2 to 22 in Table 1 reveal that even though only one or the other of the movement angle θf of the outer-peripheral-side flux barrier on the front side and the movement angle Gb of the flux barrier on the rear side is in the ranges explained in this embodiment, the torque of the rotors can be improved.

However, in Table 1, the number 23 in which both the movement angle θf of the outer-peripheral-side flux barrier on the front side defined as indicated in the number 9 and the movement angle Gb of the flux barrier on the rear side as indicated in the number 19 are set within the ranges defined in this embodiment demonstrates that a value of the increase and decrease in torque is larger than those in the numbers 2 to 16, 18 to 20, which allows further improvement in the torque of the rotor.

Further, as explained in this embodiment, the recess opening angle θc is preferably set to not less than θa/8 nor more than 25θa/24θa, and more preferably set within the range of 3θa/4±θa/12. In this calculation example, the reference-position movement angle θa is 2π/24 (rad)=) 15(°). Accordingly, the recess opening angle θc is preferably set to not less than 1.975° nor more than 15.625°, and preferably set within a range of 11.25°±1.25°. Further, the maximum recess-depth value Cd is preferably set within the range of not less than 0.01 times nor more than 0.1 times the diameter of the rotor core. In this calculation example as previously described, any of the diameters of the rotor cores is 27 mm. The number 24 presented in Table 1 is the same as the number 27 in Table 2 to be described later. The recess opening angle θc of a recess portion 1242*a* illustrated in FIG. 12D is 3.125°. Further, the maximum recess-depth value Cd of the recess portion 1242*a* illustrated in FIG. 12D is 0.05 times the diameter of the rotor core.

In Table 1, the number 24 indicates the result under the same conditions as those in the number 23 except to provide the above recess portion 1242*a*. A comparison between the numbers 23 and 24 demonstrates that providing the recess portion 1242*a* having the recess opening angle θc and the maximum recess-depth value Cd in the ranges explained in this embodiment allows further improvement in the torque of the rotor.

Next, as explained in the section of ((Second finding)) in the section of (Circumstances), Table 2 presents the result of examining the effect of providing the recess portion 815*a* in the position facing the teeth 123*a*, 123*b* with a higher magnetic flux density than the lowest magnetic flux density in the region of the outer peripheral surface 818 of the rotor core 811.

TABLE 2

| NUMBER | θf | θb | θc | Cd[mm] | INCREASE AND DECREASE IN TORQUE | REMARKS |
|---|---|---|---|---|---|---|
| 23 | 5.0° | 1.25° | 0 | 0 | +15.4% | INVENTION EXAMPLE |
| 25 | 5.0° | 1.25° | 1.25° | ROTOR DIAMETER*0.05 | +15.4% | INVENTION EXAMPLE |
| 26 | 5.0° | 1.25° | 1.875° | ROTOR DIAMETER*0.05 | +15.8% | INVENTION EXAMPLE |
| 27(=24) | 5.0° | 1.25° | 3.125° | ROTOR DIAMETER*0.05 | +16.5% | INVENTION EXAMPLE |
| 28 | 5.0° | 1.25° | 5.0° | ROTOR DIAMETER*0.05 | +17.8% | INVENTION EXAMPLE |
| 29 | 5.0° | 1.25° | 10.0° | ROTOR DIAMETER*0.05 | +22.4% | INVENTION EXAMPLE |
| 30 | 5.0° | 1.25° | 11.25 | ROTOR DIAMETER*0.05 | +22.7% | INVENTION EXAMPLE |
| 31 | 5.0° | 1.25° | 15.0 | ROTOR DIAMETER*0.05 | +18.0% | INVENTION EXAMPLE |
| 32 | 5.0° | 1.25° | 15.625 | ROTOR DIAMETER*0.05 | +16.6% | INVENTION EXAMPLE |
| 33 | 5.0° | 1.25° | 16.25 | ROTOR DIAMETER*0.05 | +15.0% | INVENTION EXAMPLE |

TABLE 2-continued

| NUMBER | θf | θb | θc | Cd[mm] | INCREASE AND DECREASE IN TORQUE | REMARKS |
|---|---|---|---|---|---|---|
| 34 | 5.0° | 1.25° | 11.25 | ROTOR DIAMETER*0.01 | +18.6% | INVENTION EXAMPLE |
| 35 | 5.0° | 1.25° | 11.25 | ROTOR DIAMETER*0.04 | +22.0% | INVENTION EXAMPLE |
| 36 | 5.0° | 1.25° | 11.25 | ROTOR DIAMETER*0.06 | +22.9% | INVENTION EXAMPLE |
| 37 | 5.0° | 1.25° | 11.25 | ROTOR DIAMETER*0.07 | +22.7% | INVENTION EXAMPLE |
| 38 | 5.0° | 1.25° | 11.25 | ROTOR DIAMETER*0.1 | +17.6% | INVENTION EXAMPLE |
| 39 | 5.0° | 1.25° | 11.25 | ROTOR DIAMETER*0.11 | +15.4% | INVENTION EXAMPLE |

Table 2 presents the recess opening angle θc and the maximum recess-depth value Cd illustrated in FIG. 11A in a section of θc and a section of Cd, respectively. In Table 2, a rotor diameter*numerical value is a value obtained by multiplying this numerical value by the diameter of the rotor core. The notation other than those in Table 2 is the same as that in Table 1. Incidentally, Table 2 presents the number 23 presented in Table 1 again.

Figure 12E:
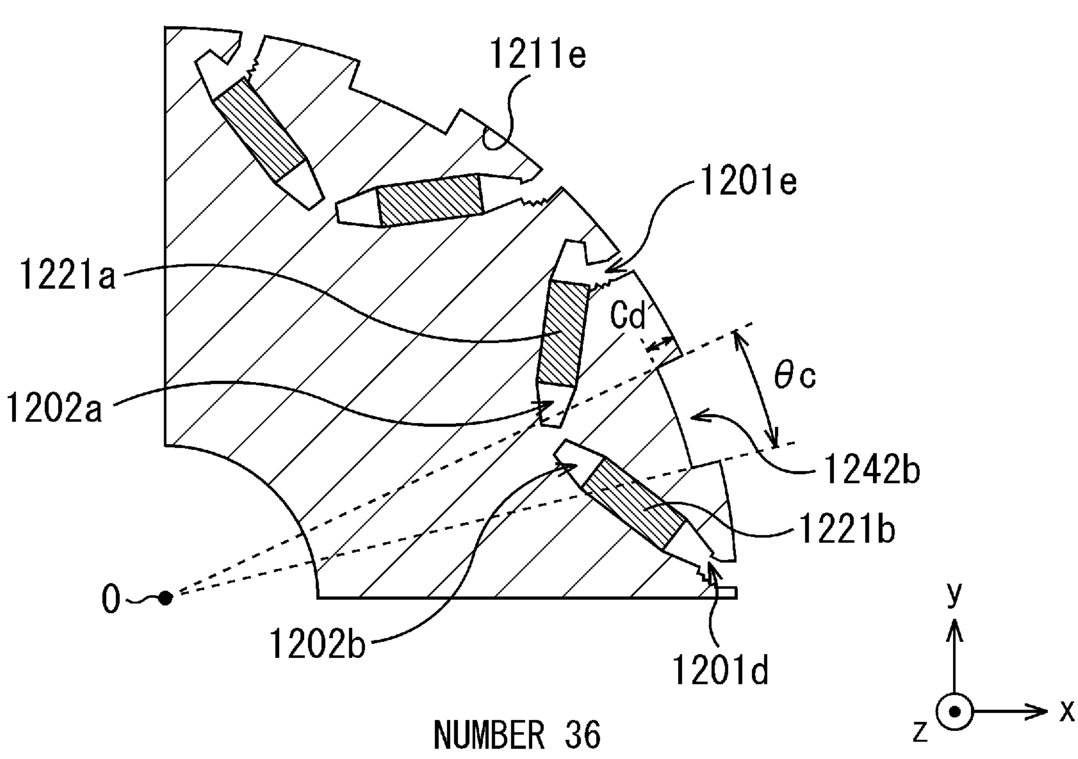
FIG. 12E is a view illustrating a fifth example of a configuration of a rotor targeted for being analyzed.

FIG. 12E is a view illustrating a configuration of a rotor (rotor cross section) targeted for being analyzed in the number 36 in Table 2. Further, FIG. 12D is the view illustrating the configuration of the rotor (rotor cross section) targeted for being analyzed in the number 27 in Table 2 (the number 24 in Table 1) as previously described. The number 36 in Table 2 is different in the recess opening angle θc between the recess portions 1242*a* and 1242*b* from the number 27 in Table 2 (the number 24 in Table 1).

In this calculation example as previously described, the recess opening angle θc is preferably set to not less than 1.975° nor more than 15.625°, and more preferably set within the range of 11.25°±1.25°. Further, the maximum recess-depth value Cd is preferably set within the range of not less than 0.01 times nor more than 0.1 times the diameter of the rotor core.

In Table 2, a comparison between the number 23 and the number 25 reveals that the recess opening angle θc of less than 1.975° as in the number 25 fails to contribute to the improvement in the torque of the rotor even though the recess portion is provided. Similarly, a comparison between the number 23 and the number 33 reveals that the recess opening angle θc of more than 15.625° as in the number 33 fails to contribute to the improvement in the torque of the rotor even though the recess portion is provided. Further, a comparison between the number 23 and the number 39 reveals that the maximum recess-depth value Cd of more than 0.1 times the diameter of the rotor core as in the number 39 fails to contribute to the improvement in the torque of the rotor even though the recess portion is provided.

On the other hand, in the numbers 26 to 32, 34 to 38 in each of which the recess opening angle θc is not less than 1.975° nor more than 15.625° and the maximum recess-depth value Cd is not less than 0.01 times nor more than 0.1 times the diameter of the rotor core, values of the increase and decrease in torque become larger than that in the number 23. Accordingly, the numbers 26 to 32, 34 to 38 demonstrate that the torque of the rotors can be further improved as compared with the number 23.

Further, the numbers 29 to 30 in each of which the recess opening angle θc is within the range of 11.25°±1.25° demonstrate that the torque of the rotors can be further improved. In particular, the number 30 in which the recess opening angle θc is 11.25° of the center value within the range of 11.25°±1.25° indicates the maximum value as the value of the increase and decrease in torque. Further, the numbers 35 to 37 in each of which the maximum recess-depth value Cd is within the range of not less than 0.04 times nor more than 0.07 times the diameter of the rotor core demonstrate that the torque of the rotors can be further improved. In particular, the number 36 in which the maximum recess-depth value Cd indicates a value near the center within the range of not less than 0.04 times nor more than 0.07 times the diameter of the rotor core indicates the maximum value as the value of the increase and decrease in torque.

Further, in Table 2, for example, a comparison between the number 23 and the number 36 reveals that even though the movement angle θf of the outer-peripheral-side flux barrier on the front side and the movement angle θb of the flux barrier on the rear side are not set in the ranges explained in this embodiment, setting the recess opening angle θc and the maximum recess-depth value Cd in the ranges explained in this embodiment allows the improvement in the torque of the rotor.

The above reveals that as long as any of the movement angle θf of the outer-peripheral-side flux barrier on the front side, the movement angle θb of the flux barrier on the rear side, and, the recess opening angle θc and the maximum recess-depth value Cd is/are set in the ranges explained in this embodiment, the others need not be in the ranges explained in this embodiment.

Next, as explained in the section of ((third finding)) in the section of (Circumstances), Table 3 presents the result of examining the effect of actively providing the inter-magnet bridge portion 821 and extending the outer-peripheral-side flux barriers 813 to the outer peripheral surface 818 of the rotor core 811 to be opened.

TABLE 3

| NUMBER | TORQUE [Nm] | |
|---|---|---|
| 40 | 0.62 | FIG. 12F |
| 41 | 0.37 | FIG. 12G |
| 42 | 0.55 | FIG. 12H |
| 43 | 0.48 | FIG. 12I |

FIG. 12F to FIG. 12I are views illustrating configurations of rotors (rotor cross sections) targeted for being analyzed in the numbers 40 to 43 in Table 3. Note that here, to examine only the effect in the section of ((Third finding)), the movement angle θf of the outer-peripheral-side flux barrier on the front side and the movement angle θb of the flux barrier on the rear side are not in the ranges explained in this embodiment.

In FIG. 12F, outer-peripheral-side flux barriers 1201*f* to 1201*g* reach an outer peripheral surface 1211*f* of the rotor core to be open in the rotor core cross section. Further, the inter-magnet flux barriers 1202*a* to 1202*b* are not coupled, and the soft magnetic material (an inter-magnet bridge portion 1232*a*) is present between the inter-magnet flux barriers 1202*a* and 1202*b*. In the example illustrated in FIG. 12F, a width w of the inter-magnet bridge portion is 0.3 mm. Further, in the example illustrated in FIG. 12F, $w_{min}$ in the formula (1) is 0.075 mm.

A shape and a size of each of the inter-magnet flux barriers 1202*a* to 1202*b* illustrated in FIG. 12G are the same as a shape and a size of each of the inter-magnet flux barriers 1202*a* to 1202*b* of the rotor illustrated in FIG. 12F. Accordingly, a shape and a size of the inter-magnet bridge portion 1232*a* of the rotor illustrated in FIG. 12G are the same as a shape and a size of the inter-magnet bridge portion 1232*a* of the rotor illustrated in FIG. 12F. Further, a shape and a size of each of outer-peripheral-side flux barriers 1201*h* to 1201*i* are the same as the shape and the size of each of the inter-magnet flux barriers 1202*a* to 1202*b*, illustrated in FIG. 12G. In FIG. 12G, the outer-peripheral-side flux barriers 1201*h* to 1201*i* and the inter-magnet flux barriers 1202*a* to 1202*b* are disposed in such a manner that a width of the outer-peripheral-side bridge portion and a width of the inter-magnet bridge portion are roughly equal. Further, the outer-peripheral-side flux barriers 1201*h* to 1201*i* illustrated in FIG. 12G do not reach the outer peripheral surface 1211*g* of the rotor core, and are not open in the rotor core cross section.

In this calculation example, the width of the outer-peripheral-side bridge portion is indicated by a length in a direction perpendicular to a direction in which a magnetic flux passing through this inter-magnet bridge portion flows in the rotor core cross section. The width of the inter-magnet bridge portion is the shortest length in this length in this inter-magnet bridge portion (the length in the direction perpendicular to the direction in which the magnetic flux flows).

In FIG. 12H, the soft magnetic material (an inter-magnet bridge portion 1232*b*) is present between permanent magnets 1221*a* and 1221*b* (inter-magnet flux barriers 1202*d* and 1202*e*). A shape and a size of each of outer-peripheral-side flux barriers 1201*j* to 1201*k* are the same as a shape and a size of the inter-magnet flux barrier 1202*d* to 1202*e*, illustrated in FIG. 12H. Further, in FIG. 12H, the outer-peripheral-side flux barriers 1201*j* to 1201*k* and the inter-magnet flux barriers 1202*d* to 1202*e* are disposed in such a manner that a width of each of outer-peripheral-side bridge portions 1231*c* to 1231*d* and a width of the inter-magnet bridge portion 1232*b* are roughly equal. Further, the width of each of the outer-peripheral-side bridge portions 1231*c* to 1231*d* and the width of the inter-magnet bridge portion 1232*b*, illustrated in FIG. 12H, are shorter than the width of each of the outer-peripheral-side bridge portions 1231*a* to 1231*b* and the width of the inter-magnet bridge portion 1232*a*, illustrated in FIG. 12G, respectively.

As previously described while referring to FIG. 11A to FIG. 11C, the width of the inter-magnet bridge portion is indicated by the length, of the portion overlapping with the soft magnetic material, of the bridge-width specified line in the rotor core cross section. The bridge-width specified line is the straight line connecting the second end portions of the two magnet holes through which the permanent magnets are installed in such a manner as to make the length of the overlap with the soft magnetic material shortest. As previously described while referring to FIG. 11B and FIG. 11C, the second end portions include the positions at both ends of the straight line drawn so that the length of the overlap with the soft magnetic material composing the soft magnetic material portion has the shortest distance. Accordingly, in the example illustrated in FIG. 12H, a length of a straight line connecting a region between the inter-magnet flux barriers 1202*d* and 1202*e* at the shortest distance is the width of the inter-magnetic pole bridge portion.

Further, the outer-peripheral-side flux barriers 1201*j* to 1201*k* illustrated in FIG. 12H do not reach an outer peripheral surface 1211*h* of the rotor core, and are not open in the rotor core cross section. Further, the inter-magnet flux barriers 1202*d* to 1202*e* illustrated in FIG. 12H are not coupled. Accordingly, the soft magnetic material (inter-magnet bridge portion) is present between the inter-magnet flux barriers 1202 (1202*d* to 1202*e*).

The shape and the size of each of the outer-peripheral-side flux barriers 1201*h* to 1201*i* illustrated in FIG. 12I are the same as the shape and the size of each of the outer-peripheral-side flux barriers 1201*h* to 1201*i* of the rotor illustrated in FIG. 12G. Accordingly, the shape and the size of each of the outer-peripheral-side bridge portions 1231*a* to 1231*b* illustrated in FIG. 12I are the same as the shape and the size of each of the outer-peripheral-side bridge portions 1231*a* to 1231*b* of the rotor illustrated in FIG. 12G. Further, in FIG. 12I, a flux barrier on the inner peripheral side in the left-right direction Ds further than the permanent magnets 1221*a* to 1221*b* (an inter-magnet flux barrier 1202*f*) is one in number.

Table 3 reveals that setting the width of each of the outer-peripheral-side bridge portions 1231*a* to 1231*b* and the width of the inter-magnet bridge portion 1232*a* to be the same as the width of the inter-magnet bridge portion 1132*a* illustrated in FIG. 12F and to be larger than the inter-magnet bridge portion 1232*b* illustrated in FIG. 12H, as illustrated in FIG. 12G, further decreases the torque of the rotor than the case of setting the width of each of the outer-peripheral-side bridge portions 1231*c* to 1231*d* and the width of the inter-magnet bridge portion 1232*b* to be smaller as illustrated in FIG. 12H. Further, providing the outer-peripheral-side bridge portions 1231*a* to 1231*b* and eliminating the inter-magnet bridge portion as illustrated in FIG. 12I causes the torque of the rotor to increase more than the case of providing the outer-peripheral-side bridge portions 1231*a* to 1231*b* and the inter-magnet bridge portion 1232*a* as illustrated in FIG. 12G and setting the width of the inter-magnet bridge portion 1232*a* to be the same as the width of the inter-magnet bridge portion 1232*a* illustrated in FIG. 12F and to be larger than the inter-magnet bridge portion 1232*b* illustrated in FIG. 12H. However, eliminating the inter-magnet bridge portion as illustrated in FIG. 12I demonstrates that the torque of the rotor further decreases than the case of providing the outer-peripheral-side bridge portions 1231*c* to 1231*d* and the inter-magnet bridge portion 1232*b* as illustrated in FIG. 12H and setting the width of each of the outer-peripheral-side bridge portions 1231*c* to 1231*d* and the width of the inter-magnet bridge portion 1232*b* to be smaller than the width of each of the outer-peripheral-side bridge portions 1231*a* to 1231*b* and the width of the inter-magnet bridge portion 1232*a*, illustrated in FIG. 12G. Further, providing the inter-magnet bridge portion 1232*a* without providing the outer-peripheral-side bridge portion as illustrated in FIG. 12F demonstrates that the torque of the rotor increases more than the case of providing the outer-peripheral-side bridge portions 1231*a* to 1231*b* and the inter-magnet bridge portion 1232*a* as illustrated in FIG. 12G and a case of setting the width of each of the outer-peripheral-side bridge portions 1231*c* to 1231*d* and the inter-magnet bridge portion 1232*b* to be smaller than the width of each of the outer-peripheral-side bridge portions 1231*a* to 1231*b* and the width of the inter-magnet bridge portion 1232*a* illustrated in FIG. 12G, as illustrated in FIG. 12H. That is, as illustrated in FIG. 12F, the case of providing the inter-magnet bridge portion 1232*a* and extending the outer-peripheral-side flux barriers 1201*f* to 1201*g* to the outer peripheral surface of the rotor core to be opened demonstrates the highest torque of the rotor.

Table 4 presents calculation results of stresses of the rotor illustrated in FIG. 12F and the rotor illustrated in FIG. 12H. Values presented in Table 4 are values calculated as follows. First, the maximum stress value of calculated values of stresses applied to the rotor core during rotation at rotation speeds indicated in a section of a rotation speed is set as the maximum value of the stresses applied to the rotor core during the rotation at the rotation speeds. Further, the maximum value of the stresses applied to the rotor core during the rotation at the rotation speeds is normalized (made non-dimensional) by setting the maximum value of stresses applied to the rotor core of this rotor while the rotor illustrated in FIG. 12H is rotating at 20000 rpm as 100. Table 4 presents the values normalized in this manner in sections thereof.

TABLE 4

| ROTATION SPEED [rpm] | FIG. 12F | FIG. 12H |
|---|---|---|
| 1000 | 0.17 | 0.25 |
| 3000 | 1.55 | 2.25 |
| 5000 | 4.32 | 6.25 |
| 10000 | 17.2 | 25.0 |
| 15000 | 38.8 | 56.3 |
| 20000 | 69.0 | 100 |

As presented in Table 3, a torque of the rotor illustrated in FIG. 12G and a torque of the rotor illustrated in FIG. 12I are smaller than torques of the rotors illustrated in FIG. 12F and FIG. 12H. Accordingly, the rotors illustrated in FIG. 12F and FIG. 12H also have an electromagnetic advantage over the rotor illustrated in FIG. 12I. Thus, from the mechanical viewpoint, the rotor illustrated in FIG. 12F and the rotor illustrated in FIG. 12H are compared using Table 4. The width of the inter-magnet bridge portion 1231*a* illustrated in FIG. 12F and the sum of the widths of the outer-peripheral-side bridge portions 1231*c* to 1231*d* and the inter-magnet bridge portion 1232*b* illustrated in FIG. 12H are roughly the same. However, as presented in Table 4, the rotor illustrated in FIG. 12F is lower in the maximum value of the stress applied to the rotor core than the rotor illustrated in FIG. 12H. Accordingly, the rotor illustrated in FIG. 12F demonstrates that a proof stress against centrifugal force can be further improved than that of the rotor illustrated in FIG. 12H.

As described above, the rotor (rotor core) illustrated in FIG. 12F is said to have a shape with mechanical and electromagnetic advantages as compared with the rotors (rotor cores) illustrated in FIG. 12G to FIG. 12I.

SUMMARY

In this embodiment as described above, in the rotor core cross section, the positions of the open-end front-side corner portions 1131*a*, 1131*c* are on the rear side in the rotation direction of the rotor core 811 further than the reference positions 831*a* to 831*b*. Here, the open-end front-side corner portions 1131*a*, 1131*e* are the corner portions on the front side in the rotation direction of the rotor core 811, of the two corner portions 1131*a* to 1131*b* and the two corner portions 1131*c* to 1131*d* in the circumferential direction of the rotor core 811, of at least one of the open end portions 1111*a* to 1111*b* which are provided in the same pole, in the rotor core cross section. Further, the reference positions 831*a*, 831*b* are the reference positions relative to the magnet holes 817*a*, 817*b* having the open end portions 1111*a*, 1111*b*, respectively. Accordingly, the torque of the rotor 810 can be increased.

Further, in this embodiment, the position of the front-side open-end front-side corner portion 1131*a* of the front-side open end portion 1111*a* is on the rear side in the rotation direction of the rotor core 811 further than the reference position 831*a* relative to the magnet hole 817*a* having the front-side open end portion 1111*a*. Further, the position of the rear-side open-end front-side corner portion 1131*b* of the rear-side open end portion 1111*b* is on the rear side in the rotation direction of the rotor core 811 further than the reference position 831*b* relative to the magnet hole 817*b* having the rear-side open end portion 1111*b*. Accordingly, the torque of the rotor 810 in which the permanent magnets 812*a* to 812*b* are disposed in a so-called V-shape can be increased.

Further, in this embodiment, the movement angle θf of the outer-peripheral-side flux barrier on the front side is set to not less than θa/24 nor more than 15θa/24 (θa is the reference-position movement angle). Accordingly, the torque of the rotor 810 can be surely increased.

Further, in this embodiment, the movement angle θb of the outer-peripheral-side flux barrier on the rear side is set to not less than θa/24 nor more than θa/8. Accordingly, the torque of the rotor 810 can be surely increased.

Further, in this embodiment, the length L1, in the circumferential direction of the rotor core 811, of the open end portions 1111*a* to 1111*b*, is set to not less than 0.1 times nor more than 1.0 times the length L2 in the magnetization direction Dm of the permanent magnets 812*a* to 812*b*. Accordingly, the reflux magnetic flux can be surely suppressed.

Further, in this embodiment, the recess portion 815*a* is provided in the position opposite apart from the teeth 123*a*, 123*b* of the stator core 121 installed in the position opposite apart from the outer peripheral surface 818 of the rotor core 811. The teeth 123*a*, 123*b* are the teeth different from the teeth 123*b*, 123*d* having the lowest magnetic flux density of the teeth 123*a* to 123*d*. Accordingly, the torque of the rotor 810 can be further increased.

Further, in this embodiment, in the rotor core cross section, the recess opening angle θc is set to not less than θa/8 nor more than 25θa/24θa (Ga is the reference-position movement angle). Accordingly, the torque of the rotor 810 can be surely increased.

Further, in this embodiment, the maximum recess-depth value Cd is set within the range of not less than 0.01 times nor more than 0.1 times the diameter of the rotor core 811. Accordingly, the torque of the rotor 810 can be surely increased.

Further, in this embodiment, the rotor core 811 has a plurality of magnet holes per one pole. Further, the plurality of magnet holes include the two permanent magnets 817*a* to 817*b* respectively having the first end portions 1111*a* to 1111*b* positioned on the outer peripheral side in the left-right direction $D_S$ and the second end portions 1112_a_ to 1112_b_ positioned on the inner peripheral side further than the first end portions 1111_a_ to 1111_b_ in the left-right direction $D_S$ per the one pole. The soft magnetic material portion 820 has the inter-magnet bridge portion 821_a_ between the respective second end portions 1112_a_ and 1112_b_ of the two magnet holes 817_a_ to 817_b_. The second end portions 1112_a_ to 1112_b_ of the two magnet holes 817_a_ to 817_b_ coincide with the end portions of the inter-magnet flux barrier spaces 1122_a_ to 1122_b_, and are closed. On the other hand, the first end portions 1111_a_ to 1111_b_ of the two magnet holes 817_a_ to 817_b_ are opened. Accordingly, the torque of the IPMSM 800 can be more increased.

Further, in this embodiment, the width w of the inter-magnet bridge portion 821_a_ is set to 0.02 times or less the diameter of the rotor core 811. Accordingly, the width w of the inter-magnet bridge portion 821_a_ can be further reduced. Thus, the reflux magnetic flux included in the magnetic flux passing through the inter-magnet bridge portion 821_a_ can be further reduced. This allows an increase in the magnetic flux contributing to the torque of the rotor 810 (the magnetic flux becoming no reflux magnetic flux).

Further, in this embodiment, the width w of the inter-magnet bridge portion 821_a_ exceeds $w_{min}$ in the formula (1). Accordingly, the occurrence of the fracture with the inter-magnet bridge portion 821_a_ as a starting point due to the stress produced by the rotation of the rotor 810 (the rotor core 811) can be suppressed.

Further, in this embodiment, setting the region between the second end portions 1112_a_ and 11112_b_ of the two magnet holes 817_a_ to 817_b_ through which the permanent magnets 812_a_ to 812_b_ are installed in the same pole as the region of the soft magnetic material prevents the presence of the space serving as the flux barrier. Accordingly, as long as the region between the second end portions 1112_a_ and 1112_b_ has the same size, the bridge portion included in the region between the second end portions 1112_a_ and 1112_b_ (the inter-magnet bridge portion 821_a_) can be increased more than the case of the presence of the region serving as the flux barrier in the region between the second end portions 1112_a_ and 1112_b_. Thus, the size of the region between the second end portions 1112_a_ and 1112_b_ can be set to be a required minimum size. This allows a reduction in the size of the region per one pole of the rotor 810 (the rotor core 811, for example.

Further, in this embodiment, the residual magnetic flux density at room temperature of the permanent magnets 812_a_ to 812_b_ is set to 0.8 T or less. Accordingly, the reflux magnetic flux included in the magnetic flux passing through the inter-magnet bridge portion 821_a_ can be further reduced. Thus, the magnetic flux contributing to the torque of the rotor 810 (the magnetic flux becoming no reflux magnetic flux) can be increased. Further, setting the residual magnetic flux density at room temperature of the permanent magnets 812_a_ to 812_b_ to 0.4 T or less allows a further reduction in the reflux magnetic flux included in the magnetic flux passing through the inter-magnet bridge portion 821_a_. Thus, the magnetic flux contributing to the torque of the rotor 810 (the magnetic flux becoming no reflux magnetic flux) can be more increased.

Further, in this embodiment, the permanent magnet containing no rare earth as the permanent magnets 812_a_ to 812_b_ is used. Accordingly, without using limitedly available materials, the torque of the rotor 810 can be increased.

Modified Example

This embodiment exemplified a case of providing the two permanent magnets 812_a_ to 812_b_ per one pole. However, the number of permanent magnets per one pole may be one or may be three or more.

However, when the number of permanent magnets is three or more, the following manner is preferable. That is, in the region between the end portions on the outer peripheral surface side of the rotor core (the third end portions 1113 in the example illustrated in FIG. 11A), of end portions in the magnetization direction Dm of the permanent magnets installed through the magnet holes having the outer-peripheral-side flux barriers required to define the movement angle θf of the outer-peripheral-side flux barrier on the front side and the movement angle θb of the flux barrier on the rear side, and the outer peripheral surface of the rotor core, no permanent magnet is preferably installed. This is because this manner allows the torque of the rotor to be surely improved with the movement angle θf of the outer-peripheral-side flux barrier on the front side and the movement angle θb of the flux barrier on the rear side set in the ranges explained in this embodiment.

Further, when the one permanent magnet is installed per one pole, in the magnet hole through which this permanent magnet is installed, the spaces serving as the flux barriers on both sides in the left-right direction Ds of this permanent magnet serve as the front-side flux barrier and the rear-side flux barrier. In this case, both or one of the front-side flux barrier and the rear-side flux barrier have/has the open end portions or the open end portion.

Further, this embodiment exemplified the IPMSM as a permanent magnet-embedded rotary electric machine. However, the permanent magnet-embedded rotary electric machine is not limited to the IPMSM. For example, the permanent magnet-embedded rotary electric machine may be an IPMSG (Interior Permanent Magnet Synchronous Generator).

It should be noted that the above explained embodiments of the present invention merely illustrate concrete examples of implementing the present invention, and the technical scope of the present invention is not to be construed in a restrictive manner by these embodiments. That is, the present invention may be implemented in various forms without departing from the technical spirit or main features thereof.

Note that the disclosures of the above embodiment are as follows, for example.

[Disclosure 1]

A rotor core includes a soft magnetic material portion formed using a soft magnetic material, and having at least one magnet hole per one pole, wherein:

the magnet hole has, relative to a permanent magnet installed through the magnet hole, a space serving as a front-side flux barrier and a space serving as a rear-side flux barrier on both sides in a left-right direction perpendicular to a magnetization direction of the permanent magnet and a direction parallel to a rotation axis line serving as the center of rotation;

the space serving as at least one flux barrier, of the space serving as the front-side flux barrier and the space serving as the rear-side flux barrier, has an open end portion opened in an outer peripheral surface of the rotor core;

in a cross section perpendicular to the rotation axis line, the front-side flux barrier is on a front side in a rotation direction of the rotor core than the rear-side flux barrier;

in the cross section, a position of an open-end front-side corner portion of at least one of the open end portions provided in the same pole of a rotor is on a rear side in a rotation direction of the rotor core further than a reference position relative to the magnet hole having the open end portion;

in the cross section, the open-end front-side corner portion is a corner portion on a front side in the rotation direction of the rotor core, of two corner portions in a circumferential direction of the rotor core, of at least one of the open end portions provided in the same pole of the rotor;

in the cross section, the reference position relative to the magnet hole having the open end portion is a position at an intersection point of a straight line passing through a permanent-magnet reference end portion which is one of end portions of the permanent magnet at a position closest to the open end portion, in the permanent magnet installed through the magnet hole, and the rotation axis line, and, the outer peripheral surface of the rotor core; and in the cross section, the permanent-magnet reference end portion of the permanent magnet at the position closest to the open end portion is, of end portions of the permanent magnet, an end portion at a position at the farthest distance in the circumferential direction from a straight line passing through a central position in the circumferential direction of a region of one pole including the permanent magnet, and the rotation axis line, and the distance in the circumferential direction from a straight line passing through the central position in the circumferential direction of the region of one pole including the permanent magnet, at the position closest to the open end portion, and the rotation axis line is a distance defined on a side, of the front side and the rear side in the rotation direction of the rotor core, in which the open end portion is present.

[Disclosure 2]

The rotor core according to disclosure 1, wherein in the cross section, positions of the open-end front-side corner portions of all the open end portions provided in the same pole of the rotor are each on the rear side in the rotation direction of the rotor core further than the reference position relative to the magnet hole having the open end portion.

[Disclosure 3]

The rotor core according to disclosure 1 or 2, wherein:

the rotor core has a plurality of magnet holes per one pole;

the plurality of magnet holes have a front-side magnet hole positioned on the front side in the rotation direction, and a rear-side magnet hole positioned on the rear side in the rotation direction;

the space serving as the front-side flux barrier included in the front-side magnet hole is an outer-peripheral-side flux barrier on the front side in the rotation direction and on an outer peripheral side of the rotor core further than the space serving as the rear-side flux barrier included in the front-side magnet hole;

the space serving as the rear-side flux barrier included in the rear-side magnet hole is an outer-peripheral-side flux barrier on the rear side in the rotation direction and on the outer peripheral side of the rotor core further than the space serving as the front-side flux barrier included in the rear-side magnet hole;

the space serving as at least one flux barrier, of the space serving as the front-side flux barrier included in the front-side magnet hole and the space serving as the rear-side flux barrier included in the rear-side magnet hole, has the open end portion;

in the cross section, the open-end front-side corner portion has at least one of a front-side open-end front-side corner portion and a rear-side open-end front-side corner portion;

in the cross section, the front-side open-end front-side corner portion is, of two corner portions in the circumferential direction of the rotor core of a front-side open end portion, a corner portion on the front side in the rotation direction;

in the cross section, the front-side open end portion is the open end portion of the space serving as the front-side flux barrier included in the front-side magnet hole;

in the cross section, the rear-side open-end front-side corner portion is, of two corner portions in the circumferential direction of the rotor core of a rear-side open end portion, a corner portion on the front side in the rotation direction;

in the cross section, the rear-side open-end portion is the open end portion of the space serving as the rear-side flux barrier included in the rear-side magnet hole;

in the cross section, the permanent-magnet reference end portion has at least one of a front-side permanent magnet end portion and a rear-side permanent magnet end portion;

in the cross section, the front-side permanent magnet end portion is, of the end portions of the permanent magnet installed through the front-side magnet hole, the end portion at a position on the foremost side in the rotation direction;

in the cross section, the rear-side permanent magnet end portion is, of the end portions of the permanent magnet installed through the rear-side magnet hole, the end portion at a position on the rearmost side in the rotation direction;

in the cross section, the reference position has at least one of a front-side reference position and a rear-side reference position;

in the cross section, the front-side reference position is the position at an intersection point of a straight line passing through the front-side permanent magnet end portion and the rotation axis line, and the outer peripheral surface of the rotor core; and in the core cross section, the rear-side reference position is the position at an intersection point of a straight line passing through the rear-side permanent magnet end portion and the rotation axis line, and the outer peripheral surface of the rotor core.

[Disclosure 4]

The rotor core according to disclosure 3, wherein:

the open-end front-side corner portion has the front-side open-end front-side corner portion and the rear-side open-end front-side corner portion;

the permanent-magnet reference end portion has the front-side permanent magnet end portion and the rear-side permanent magnet end portion;

the reference position has the front-side reference position and the rear-side reference position; and the space serving as the front-side flux barrier included in the front-side magnet hole and the space serving as the rear-side flux barrier included in the rear-side magnet hole each have the open end portion.

[Disclosure 5]

The rotor core according to any one of disclosures 1 to 4, wherein:

in the cross section, an angle formed by a straight line passing through the open-end front-side corner portion positioned on the front side in the rotation direction further than the center in the circumferential direction in the same pole, of the open-end front-side corner portions, and the rotation axis line, and, a straight line passing through the reference position relative to the magnet hole having the open end portion with the open-end front-side corner portion set as one of corner portions, and the rotation axis line is not less than θa/24 nor more than 15θa/24;

θa is a movement angle (rad) which is an angle around the rotation axis line from the reference position;

θa is calculated by $2\pi/N_{slot}$; and $N_{slot}$ is the number (piece) of slots in a stator core installed in a position opposite apart from the outer peripheral surface of the rotor core.

[Disclosure 6]

The rotor core according to any one of disclosures 1 to 5, wherein:

in the cross section, an angle formed by a straight line passing through the open-end front-side corner portion positioned on the rear side in the rotation direction further than the center in the circumferential direction in the same pole, of the open-end front-side corner portions, and the rotation axis line, and, a straight line passing through the reference position relative to the magnet hole having the open end portion with the open-end front-side corner portion set as one of corner portions, and the rotation axis line is not less than θa/24 nor more than θa/8;

θa is a movement angle (rad) which is the angle around the rotation axis line from the reference position;

θa is calculated by $2/N_{slot}$; and $N_{slot}$ is the number (piece) of slots in the stator core installed in the position opposite apart the outer peripheral surface of the rotor core.

[Disclosure 7]

The rotor core according to any one of disclosures 1 to 6, wherein a length in the circumferential direction of the open end portion is not less than 0.1 times nor more than 1.0 times a length in the magnetization direction of the permanent magnet installed through the magnet hole having the open end portion.

[Disclosure 8]

The rotor core according to any one of disclosures 1 to 7, wherein:

the soft magnetic material portion further has a recess portion having an open end portion opened in the outer peripheral surface of the rotor core as a recess portion different from the space serving as the flux barrier; and the recess portion is in a position opposite apart from teeth different from teeth having the lowest magnetic flux density of teeth of the stator core installed in the position opposite apart from the outer peripheral surface of the rotor core.

[Disclosure 9]

The rotor core according to disclosure 8, wherein:

in the cross section, an angle formed by a straight line passing through a recess rear-side corner portion which is, of two corner portions in the open end portion of the recess portion, a corner portion on the rear side in the rotation direction, and the rotation axis line, and, a straight line passing through the open-end front-side corner portion positioned on the rear side in the rotation direction further than the recess portion in the same pole as a pole in which the recess portion is provided, and the rotation axis line is θa;

an angle formed by a straight line passing through a recess front-side corner portion which is, of the two corner portions in the open end portion of the recess portion, the corner portion on the front side in the rotation direction, and the rotation axis line, and, a straight line passing through the recess rear-side corner portion and the rotation axis line is not less than θa/8 nor more than 25θa/24θa;

θa is the movement angle (rad) which is the angle around the rotation axis line from a rear-side reference position which is the position at an intersection point of a straight line passing through a rear-side permanent magnet end portion and the rotation axis line, and the outer peripheral surface of the rotor core, in the cross section;

the rear-side permanent magnet end portion is, of the end portions of the permanent magnet installed in the same pole, the end portion positioned on the rearmost side in the circumferential direction;

θa is calculated by $2\pi/N_{slot}$; and $N_{slot}$ is the number (piece) of slots in the stator core installed in the position opposite apart from the outer peripheral surface of the rotor core.

[Disclosure 10]

The rotor core according to disclosure 8 or 9, wherein a maximum value of a depth of the recess portion is within a range of not less than 0.01 times nor more than 0.1 times a diameter of the rotor core.

[Disclosure 11]

The rotor core according to any one of disclosures 1 to 10, wherein:

the rotor core has a plurality of magnet holes per one pole;

the plurality of magnet holes have a front-side magnet hole positioned on the front side in the rotation direction, and a rear-side magnet hole positioned on the rear side in the rotation direction;

the space serving as the front-side flux barrier included in the front-side magnet hole is on the front side in the rotation direction further than the space serving as the rear-side flux barrier included in the front-side magnet hole;

the space serving as the front-side flux barrier included in the rear-side magnet hole is on the front side in the rotation direction further than the space serving as the rear-side flux barrier included in the rear-side magnet hole;

the soft magnetic material portion has an inter-magnet bridge portion disposed in a region between the space serving as the rear-side flux barrier included in the front-side magnet hole and the space serving as the front-side flux barrier included in the rear-side magnet hole;

the front-side magnet hole has a first end portion serving as the open end portion on the front side in the rotation direction relative to the permanent magnet installed through the front-side magnet hole;

the front-side magnet hole has a second end portion on the rear side in the rotation direction relative to the permanent magnet installed through the front-side magnet hole;

the rear-side magnet hole has a first end portion serving as the open end portion on the rear side in the rotation direction relative to the permanent magnet installed through the rear-side magnet hole;

the rear-side magnet hole has a second end portion on the front side in the rotation direction relative to the permanent magnet installed through the rear-side magnet hole; and the second end portion of each of the front-side magnet hole and the rear-side magnet hole coincides with an end portion of the space serving as the flux barrier, and is closed.

[Disclosure 12]

The rotor core according to disclosure 11, wherein:

in the cross section, a length, of a portion overlapping with the soft magnetic material, of a bridge-width specified line is 0.02 times or less the diameter of the rotor core; and the bridge-width specified line is a straight line connecting the second end portions of the front-side magnet hole and the rear-side magnet hole to make a length of the overlap with the soft magnetic material shortest.

[Disclosure 13]

The rotor core according to disclosure 11 or 12, wherein:

in the cross section, each of a front-side magnet hole and the rear-side magnet hole further has a third end portion positioned on the outer peripheral side in the magnetization direction of the permanent magnet installed through each of the front-side magnet hole and the rear-side magnet hole, and a fourth end portion positioned on an inner peripheral side in the magnetization direction of the permanent magnet further than the third end portion;

in the cross section, a length, of a portion overlapping with the soft magnetic material, of a bridge-width specified line exceeds $w_{min}$, the bridge-width specified line is a straight line connecting the second end portions of the front-side magnet hole and the rear-side magnet hole to make a length of the overlap with the soft magnetic material shortest;

$w_{min}$ is calculated by $\rho \times S \times r_g \times \omega \div Ys$;

$\rho$ is a density (kg/$m^3$) of the soft magnetic material;

Ys is a yield stress (Pa) at room temperature of the soft magnetic material;

S is an area ($m^2$) of an external force influence portion;

the external force influence portion is a region of the soft magnetic material surrounded by the third end portion of the front-side magnet hole positioned at one end of the bridge-width specified line, the third end portion of the rear-side magnet hole positioned at the other end of the bridge-width specified line, an outer peripheral surface of the soft magnetic material portion, and the bridge-width specified line, in the cross section;

$r_g$ is a distance (m) in a radial direction between a position of the center of gravity of the external force influence portion and the center of the rotation in the cross section; and $\omega$ is an angular speed (rad/sec) of the rotor at the time of rotation at a maximum rotation speed.

[Disclosure 14]

A rotor core including a soft magnetic material portion formed using a soft magnetic material, and having at least one magnet hole per one pole, wherein:

the soft magnetic material portion has a recess portion in an outer peripheral surface;

the magnet hole has a first end portion and a second end portion in a left-right direction perpendicular to a magnetization direction of a permanent magnet installed through the magnet hole and a direction parallel to a rotation axis line serving as a center of rotation;

at least one end portion, of the first end portion and the second end portion, is an opened open end portion;

the recess portion is in a position different from the open end portion; and the recess portion is in a position opposite apart from teeth different from teeth having the lowest magnetic flux density of teeth of a stator core installed in a position opposite apart from the outer peripheral surface of the rotor core.

[Disclosure 15]

The rotor core according to disclosure 14, wherein:

in the cross section, an angle formed by a straight line passing through a recess rear-side corner portion which is, of two corner portions in an open end portion of the recess portion, a corner portion on a rear side in a rotation direction of the rotor core, and the rotation axis line, and, a straight line passing through an open-end front-side corner portion positioned on the rear side in the rotation direction further than the recess portion in the same pole as a pole in which the recess portion is provided, and the rotation axis line is $\theta a$;

in the cross section, the open-end front-side corner portion is a corner portion on a front side in the rotation direction of the rotor core, of two corner portions in a circumferential direction of the rotor core, of at least one of the open end portions installed in the same pole of a rotor;

an angle formed by a straight line passing through a recess front-side-corner portion which is, of the two corner portions in the open end portion of the recess portion, a corner portion on the front side in the rotation direction, and the rotation axis line, and, a straight line passing through the recess rear-side corner portion and the rotation axis line is not less than $\theta a/8$ nor more than $25\theta a/24\theta a$;

$\theta a$ is a movement angle (rad) which is an angle around the rotation axis line from a rear-side reference position which is a position at an intersection point of a straight line passing through a rear-side permanent magnet end portion and the rotation axis line, and the outer peripheral surface of the rotor core, in the cross section;

the rear-side permanent magnet end portion is, of end portions of the permanent magnet installed in the same pole, an end portion positioned on the rearmost side in the circumferential direction;

$\theta a$ is calculated by $2\pi/N_{slot}$; and $N_{slot}$ is the number (piece) of slots in the stator core installed in a position opposite apart from the outer peripheral surface of the rotor core.

[Disclosure 16]

The rotor core according to disclosure 14 or 15, wherein a maximum value of a depth of the recess portion is within a range of not less than 0.01 times nor more than 0.1 times a diameter of the rotor core.

[Disclosure 17]

A rotor includes:

the rotor core according to any one of disclosures 1 to 16; and a plurality of permanent magnets installed in the rotor core.

[Disclosure 18]

The rotor according to disclosure 17, wherein a residual magnetic flux density at room temperature of the permanent magnet is 0.8 T or less.

[Disclosure 19]

The rotor according to disclosure 17 or 18, wherein the permanent magnet contains no rare earth.

[Disclosure 20]

A rotary electric machine includes:

the rotor according to any one of disclosures 17 to 19; and a stator.

INDUSTRIAL APPLICABILITY

The present invention can be used for a rotary electric machine, for example.

The invention claimed is:

1. A rotor core comprising a soft magnetic material portion formed using a soft magnetic material, and having at least one magnet hole per one pole, wherein:

the magnet hole has, relative to a permanent magnet installed through the magnet hole, a space serving as a front-side flux barrier and a space serving as a rear-side flux barrier on both sides in a left-right direction perpendicular to a magnetization direction of the permanent magnet and a direction parallel to a rotation axis line serving as a center of rotation;

the space serving as at least one flux barrier, of the space serving as the front-side flux barrier and the space serving as the rear-side flux barrier, has an open end portion opened in an outer peripheral surface of the rotor core;

in a cross section perpendicular to the rotation axis line, the front-side flux barrier is on a front side in a rotation direction of the rotor core than the rear-side flux barrier;

in the cross section, a position of an open-end front-side corner portion of at least one of the open end portions provided in a same pole of a rotor is on a rear side in a rotation direction of the rotor core further than a reference position relative to the magnet hole having the open end portion;

in the cross section, the open-end front-side corner portion is a corner portion on a front side in the rotation direction of the rotor core, of two corner portions in a circumferential direction of the rotor core, of at least one of the open end portions provided in the same pole of the rotor;

in the cross section, the reference position relative to the magnet hole having the open end portion is a position at an intersection point of a straight line passing through a permanent-magnet reference end portion which is one of end portions of the permanent magnet at a position closest to the open end portion in the permanent magnet installed through the magnet hole, and the rotation axis line, and, the outer peripheral surface of the rotor core;

in the cross section, the permanent-magnet reference end portion of the permanent magnet at the position closest to the open end portion is, of end portions of the permanent magnet, an end at a position at a farthest distance in the circumferential direction from a straight line passing through a central position in the circumferential direction of a region of one pole including the permanent magnet, and the rotation axis line; and the distance in the circumferential direction from a straight line passing through the central position in the circumferential direction of the region in one pole including the permanent magnet at the position closest to the open end portion, and the rotation axis line is a distance defined on a side, of the front side and the rear side in the rotation direction of the rotor core, in which the open end portion is present.

2. The rotor core according to claim 1, wherein in the cross section, positions of the open-end front-side corner portions of all the open end portions provided in the same pole of the rotor are each on the rear side in the rotation direction of the rotor core further than the reference position relative to the magnet hole having the open end portion.

3. The rotor core according to claim 1, wherein:

the rotor core has a plurality of magnet holes per one pole;

the plurality of magnet holes have a front-side magnet hole positioned on the front side in the rotation direction, and a rear-side magnet hole positioned on the rear side in the rotation direction;

the space serving as the front-side flux barrier included in the front-side magnet hole is an outer-peripheral-side flux barrier on the front side in the rotation direction and on an outer peripheral side of the rotor core further than the space serving as the rear-side flux barrier included in the front-side magnet hole;

the space serving as the rear-side flux barrier included in the rear-side magnet hole is an outer-peripheral-side flux barrier on the rear side in the rotation direction and on the outer peripheral side of the rotor core further than the space serving as the front-side flux barrier included in the rear-side magnet hole;

the space serving as at least one flux barrier, of the space serving as the front-side flux barrier included in the front-side magnet hole and the space serving as the rear-side flux barrier included in the rear-side magnet hole, has the open end portion;

in the cross section, the open-end front-side corner portion has at least one of a front-side open-end front-side corner portion and a rear-side open-end front-side corner portion;

in the cross section, the front-side open-end front-side corner portion is, of two corner portions in the circumferential direction of the rotor core of a front-side open end portion, a corner portion on the front side in the rotation direction;

in the cross section, the front-side open end portion is the open end portion of the space serving as the front-side flux barrier included in the front-side magnet hole;

in the cross section, the rear-side open-end front-side corner portion is, of two corner portions in the circumferential direction of the rotor core of a rear-side open end portion, a corner portion on the front side in the rotation direction;

in the cross section, the rear-side open-end portion is the open end portion of the space serving as the rear-side flux barrier included in the rear-side magnet hole;

in the cross section, the permanent-magnet reference end portion has at least one of a front-side permanent magnet end portion and a rear-side permanent magnet end portion;

in the cross section, the front-side permanent magnet end portion is, of the end portions of the permanent magnet installed through the front-side magnet hole, the end portion at a position on a foremost side in the rotation direction;

in the cross section, the rear-side permanent magnet end portion is, of the end portions of the permanent magnet installed through the rear-side magnet hole, the end portion at a position on a rearmost side in the rotation direction;

in the cross section, the reference position has at least one of a front-side reference position and a rear-side reference position;

in the cross section, the front-side reference position is the position at an intersection point of a straight line passing through the front-side permanent magnet end portion and the rotation axis line, and the outer peripheral surface of the rotor core; and in the core cross section, the rear-side reference position is the position at an intersection point of a straight line passing through the rear-side permanent magnet end portion and the rotation axis line, and the outer peripheral surface of the rotor core.

4. The rotor core according to claim 2, wherein:

the rotor core has a plurality of magnet holes per one pole;

the plurality of magnet holes have a front-side magnet hole positioned on the front side in the rotation direction, and a rear-side magnet hole positioned on the rear side in the rotation direction;

the space serving as the front-side flux barrier included in the front-side magnet hole is an outer-peripheral-side flux barrier on the front side in the rotation direction and on an outer peripheral side of the rotor core further than the space serving as the rear-side flux barrier included in the front-side magnet hole;

the space serving as the rear-side flux barrier included in the rear-side magnet hole is an outer-peripheral-side flux barrier on the rear side in the rotation direction and on the outer peripheral side of the rotor core further than the space serving as the front-side flux barrier included in the rear-side magnet hole;

the space serving as at least one flux barrier, of the space serving as the front-side flux barrier included in the front-side magnet hole and the space serving as the rear-side flux barrier included in the rear-side magnet hole, has the open end portion;

in the cross section, the open-end front-side corner portion has at least one of a front-side open-end front-side corner portion and a rear-side open-end front-side corner portion;

in the cross section, the front-side open-end front-side corner portion is, of two corner portions in the circumferential direction of the rotor core of a front-side open end portion, a corner portion on the front side in the rotation direction;

in the cross section, the front-side open end portion is the open end portion of the space serving as the front-side flux barrier included in the front-side magnet hole;

in the cross section, the rear-side open-end front-side corner portion is, of two corner portions in the circumferential direction of the rotor core of a rear-side open end portion, a corner portion on the front side in the rotation direction;

in the cross section, the rear-side open-end portion is the open end portion of the space serving as the rear-side flux barrier included in the rear-side magnet hole;

in the cross section, the permanent-magnet reference end portion has at least one of a front-side permanent magnet end portion and a rear-side permanent magnet end portion;

in the cross section, the front-side permanent magnet end portion is, of the end portions of the permanent magnet installed through the front-side magnet hole, the end portion at a position on a foremost side in the rotation direction;

in the cross section, the rear-side permanent magnet end portion is, of the end portions of the permanent magnet installed through the rear-side magnet hole, the end portion at a position on a rearmost side in the rotation direction;

in the cross section, the reference position has at least one of a front-side reference position and a rear-side reference position;

in the cross section, the front-side reference position is the position at an intersection point of a straight line passing through the front-side permanent magnet end portion and the rotation axis line, and the outer peripheral surface of the rotor core; and in the core cross section, the rear-side reference position is the position at an intersection point of a straight line passing through the rear-side permanent magnet end portion and the rotation axis line, and the outer peripheral surface of the rotor core.

5. The rotor core according to claim 3, wherein:

the open-end front-side corner portion has the front-side open-end front-side corner portion and the rear-side open-end front-side corner portion;

the permanent-magnet reference end portion has the front-side permanent magnet end portion and the rear-side permanent magnet end portion;

the reference position has the front-side reference position and the rear-side reference position; and the space serving as the front-side flux barrier included in the front-side magnet hole and the space serving as the rear-side flux barrier included in the rear-side magnet hole each have the open end portion.

6. The rotor core according to claim 4, wherein:

the open-end front-side corner portion has the front-side open-end front-side corner portion and the rear-side open-end front-side corner portion;

the permanent-magnet reference end portion has the front-side permanent magnet end portion and the rear-side permanent magnet end portion;

the reference position has the front-side reference position and the rear-side reference position; and the space serving as the front-side flux barrier included in the front-side magnet hole and the space serving as the rear-side flux barrier included in the rear-side magnet hole each have the open end portion.

7. The rotor core according to claim 1, wherein:

in the cross section, an angle formed by a straight line passing through the open-end front-side corner portion positioned on the front side in the rotation direction further than a center in the circumferential direction in the same pole, of the open-end front-side corner portions, and the rotation axis line, and, a straight line passing through the reference position relative to the magnet hole having the open end portion with the open-end front-side corner portion set as one of corner portions, and the rotation axis line is not less than $\theta a/24$ nor more than $15\theta a/24$;

$\theta a$ is a movement angle (rad) which is an angle around the rotation axis line from the reference position;

$\theta a$ is calculated by $2\pi/N_{slot}$, and $N_{slot}$ is the number (piece) of slots in a stator core installed in a position opposite apart from the outer peripheral surface of the rotor core.

8. The rotor core according to claim 1, wherein:

in the cross section, an angle formed by a straight line passing through the open-end front-side corner portion positioned on the rear side in the rotation direction further than the center in the circumferential direction in the same pole, of the open-end front-side corner portions, and the rotation axis line, and, a straight line passing through the reference position relative to the magnet hole having the open end portion with the open-end front-side corner portion set as one of corner portions, and the rotation axis line is not less than $\theta a/24$ nor more than $\theta a/8$;

$\theta a$ is a movement angle (rad) which is the angle around the rotation axis line from the reference position;

$\theta a$ is calculated by $2\pi/N_{slot}$, and $N_{slot}$ is the number (piece) of slots in the stator core installed in the position opposite apart from the outer peripheral surface of the rotor core.

9. The rotor core according to claim 1, wherein a length in the circumferential direction of the open end portion is not less than 0.1 times nor more than 1.0 times a length in the magnetization direction of the permanent magnet installed through the magnet hole having the open end portion.

10. The rotor core according to claim 1, wherein:

the soft magnetic material portion further has a recess portion having an open end portion opened in the outer peripheral surface of the rotor core as a recess portion different from the space serving as the flux barrier; and the recess portion is in a position opposite apart from teeth different from teeth having a lowest magnetic flux density of teeth of the stator core installed in the position opposite apart from the outer peripheral surface of the rotor core.

11. The rotor core according to claim 10, wherein:

in the cross section, an angle formed by a straight line passing through a recess rear-side corner portion which is, of two corner portions in the open end portion of the recess portion, a corner portion on the rear side in the rotation direction, and the rotation axis line, and, a straight line passing through the open-end front-side corner portion positioned on the rear side in the rotation direction further than the recess portion in the same pole as a pole in which the recess portion is installed, and the rotation axis is $\theta a$;

an angle formed by a straight line passing through a recess front-side corner portion which is, of the two corner portions in the open end portion of the recess portion, the corner portion on the front side in the rotation direction, and the rotation axis line, and, a straight line passing through the recess rear-side corner portion and the rotation axis line is not less than $\theta a/8$ nor more than $25\theta a/24\theta a$;

$\theta a$ is the movement angle (rad) which is the angle around the rotation axis line from a rear-side reference position which is the position at an intersection point of a straight line passing through a rear-side permanent magnet end portion and the rotation axis line, and the outer peripheral surface of the rotor core, in the cross section;

the rear-side permanent magnet end portion is, of the end portions of the permanent magnet installed in the same pole, the end portion positioned on a rearmost side in the circumferential direction;

$\theta a$ is calculated by $2\times/N_{slot}$; and $N_{slot}$ is the number (piece) of slots in the stator core installed in the position opposite apart from the outer peripheral surface of the rotor core.

12. The rotor core according to claim 10, wherein a maximum value of a depth of the recess portion is within a range of not less than 0.01 times nor more than 0.1 times a diameter of the rotor core.

13. The rotor core according to claim 1, wherein the rotor core has a plurality of magnet holes per one pole;

the plurality of magnet holes have a front-side magnet hole positioned on the front side in the rotation direction, and a rear-side magnet hole positioned on the rear side in the rotation direction;

the space serving as the front-side flux barrier included in the front-side magnet hole is on the front side in the rotation direction further than the space serving as the rear-side flux barrier included in the front-side magnet hole;

the space serving as the front-side flux barrier included in the rear-side magnet hole is on the front side in the rotation direction further than the space serving as the rear-side flux barrier included in the rear-side magnet hole;

the soft magnetic material portion has an inter-magnet bridge portion disposed in a region between the space serving as the rear-side flux barrier included in the front-side magnet hole and the space serving as the front-side flux barrier included in the rear-side magnet hole;

the front-side magnet hole has a first end portion serving as the open end portion on the front side in the rotation direction relative to the permanent magnet installed through the front-side magnet hole;

the front-side magnet hole has a second end portion on the rear side in the rotation direction relative to the permanent magnet installed through the front-side magnet hole;

the rear-side magnet hole has a first end portion serving as the open end portion on the rear side in the rotation direction relative to the permanent magnet installed through the rear-side magnet hole;

the rear-side magnet hole has a second end portion on the front side in the rotation direction relative to the permanent magnet installed through the rear-side magnet hole; and the second end portion of each of the front-side magnet hole and the rear-side magnet hole coincides with an end portion of the space serving as the flux barrier, and is closed.

14. The rotor core according to claim 13, wherein:

in the cross section, a length, of a portion overlapping with the soft magnetic material, of a bridge-width specified line is 0.02 times or less the diameter of the rotor core; and the bridge-width specified line is a straight line connecting the second end portions of the front-side magnet hole and the rear-side magnet hole to make a length of the overlap with the soft magnetic material shortest.

15. The rotor core according to claim 13, wherein:

in the cross section, each of the front-side magnet hole and the rear-side magnet hole further has a third end portion positioned on the outer peripheral side in the magnetization direction of the permanent magnet installed through each of the front-side magnet hole and the rear-side magnet hole, and a fourth end portion positioned on an inner peripheral side in the magnetization direction of the permanent magnet further than the third end portion;

in the cross section, a length, of a portion overlapping with the soft magnetic material, of a bridge-width specified line exceeds $w_{min}$, the bridge-width specified line is a straight line connecting the second end portions of the front-side magnet hole and the rear-side magnet hole to make a length of the overlap with the soft magnetic material shortest;

$w_{min}$ is calculated by $p\times S\times r_g\times\omega=Ys$;

$\rho$ is a density ($kg/m^3$) of the soft magnetic material;

Ys is a yield stress (Pa) at room temperature of the soft magnetic material;

S is an area ($m^2$) of an external force influence portion;

the external force influence portion is a region of the soft magnetic material surrounded by the third end portion of the front-side magnet hole positioned at one end of the bridge-width specified line, the third end portion of the rear-side magnet hole positioned at the other end of the bridge-width specified line, an outer peripheral surface of the soft magnetic material portion, and the bridge-width specified line, in the cross section;

$r_g$ is a distance (m) in a radial direction between a position of a center of gravity of the external force influence portion and the center of the rotation in the cross section; and ω is an angular speed (rad/sec) of the rotor at a time of rotation at a maximum rotation speed.

16. A rotor comprising:

the rotor core according to claim 1; and a plurality of permanent magnets installed in the rotor core.

17. The rotor according to claim 16, wherein a residual magnetic flux density at room temperature of the permanent magnet is 0.8 T or less.

18. The rotor according to claim 16, wherein the permanent magnet contains no rare earth.

* * * * *